(12) United States Patent
Suzuki et al.

(10) Patent No.: US 8,984,103 B2
(45) Date of Patent: Mar. 17, 2015

(54) CALCULATION PROCESSING SYSTEM, PROGRAM CREATION METHOD, AND PROGRAM CREATION PROGRAM

(75) Inventors: Hideaki Suzuki, Koganei (JP); Hidefumi Sawai, Koganei (JP); Hiroyuki Ohsaki, Suita (JP)

(73) Assignee: National Institute of Information and Communications Technology (NIICT), Tokyo (JP)

( * ) Notice: Subject to any disclaimer, the term of this patent is extended or adjusted under 35 U.S.C. 154(b) by 343 days.

(21) Appl. No.: 13/125,540

(22) PCT Filed: Oct. 23, 2009

(86) PCT No.: PCT/JP2009/068271
§ 371 (c)(1),
(2), (4) Date: Apr. 21, 2011

(87) PCT Pub. No.: WO2010/047388
PCT Pub. Date: Apr. 29, 2010

(65) Prior Publication Data
US 2011/0202639 A1 Aug. 18, 2011

(30) Foreign Application Priority Data
Oct. 24, 2008 (JP) .................... 2008-274282

(51) Int. Cl.
*G06N 3/08* (2006.01)
*G06N 3/12* (2006.01)

(52) U.S. Cl.
CPC . *G06N 3/126* (2013.01); *G06N 3/08* (2013.01)
USPC ........... 709/220; 709/238; 709/249; 709/252; 370/254; 370/255

(58) Field of Classification Search
CPC .............. H04L 29/08072; H04L 29/06; H04L 29/0809; H04L 45/00; H04L 45/48
USPC ......... 709/201, 202, 203, 204, 217, 218, 219, 709/220, 238, 249, 252; 370/254, 255
See application file for complete search history.

(56) References Cited

U.S. PATENT DOCUMENTS 5,239,618 A * 8/1993 Yamaguchi et al. ............ 706/25
5,303,328 A * 4/1994 Masui et al. ..................... 706/25

(Continued)

FOREIGN PATENT DOCUMENTS

| JP | 8-272622 | 10/1996 |
| JP | 2001-101251 | 4/2001 |

OTHER PUBLICATIONS

Japanese Office Action with English translation issued in Japanese Application No. 2010-534850 issued on Nov. 26, 2013.

(Continued)

*Primary Examiner* — Un C Cho
*Assistant Examiner* — Natali N Pascual Peguero
(74) *Attorney, Agent, or Firm* — McDermott Will & Emery LLP

(57) ABSTRACT

A calculation processing apparatus includes a monitor, a CPU, a memory and a hard disk. The hard disk stores an initial program input from outside, a network creation program, a network modifying program, network information, node operation definition, and learning variables. The CPU executes the network creation program, and creates network information related to a network representing an algorithm structure of the initial program. Further, the CPU executes the network modifying program and modifies the network information based on the result of calculation by the network, using a learning algorithm.

18 Claims, 69 Drawing Sheets

(56) References Cited

U.S. PATENT DOCUMENTS

| | | | | |
|---|---|---|---|---|
| 5,319,738 | A | * | 6/1994 | Shima et al. ............... 706/34 |
| 5,349,646 | A | * | 9/1994 | Furuta et al. ............... 706/23 |
| 7,457,257 | B2 | * | 11/2008 | Tang et al. ............... 370/256 |
| 7,844,663 | B2 | * | 11/2010 | Boutboul ............... 709/204 |
| 8,069,229 | B2 | * | 11/2011 | Yellapragada et al. ....... 709/221 |
| 2002/0141342 | A1 | * | 10/2002 | Furman et al. ............... 370/235 |
| 2004/0213233 | A1 | * | 10/2004 | Hong et al. ............... 370/392 |

OTHER PUBLICATIONS

Mabu et al., "A Graph-Based Evolutionary Algorithm: Genetic Network Programming (GNP) and Its Extension Using Reinforcement Learning", Evolutionary Computation 15(3): pp. 369-398, (2007).

Tetsuya Sekioka et al., "A Proposal of an Improved Function Synthesis Algorithm Using Genetic Programming," The Transactions of the Institute of Electronics, Information and Communication Engineers, Apr. 25, 2000, vol. J83-D-I No. 4, pp. 407-417, with Partial English Translation.

Yoichi Muraoka, "Parallel Processing," Software Course 37, Sho-Sho-do, Apr. 10, 1986, p. 105, with Partial English Translation.

Edited by ATR Advanced Telecommunications Research Institute International, ATR Advanced Technology Series: Neural Network Applications, Ohm-sha, Jul. 20, 1995, pp. 20-21, with Partial English Translation.

Hitoshi Iba, "Genetic Programming," Tokyo Denki University Press, 1996, pp. 18-30, with Partial English Translation.

Campbell, A.T. et al., "A survey of programmable networks," Computer Communication Review 29(2), pp. 7-23, 1999.

Androutsellis-Theotokis, S. et al., "A Survey of Peer-to-Peer content distribution technologies," ACM Computing Surveys 36(4), pp. 335-371, 2004.

* cited by examiner

```
main (int argc, char *argv[ ])
{
    int i ;
    double x,y ;

sscanf(argv[1],"%f",&y);
    x = 0. 0 ;
    for ( i=0; i<2; i++ ) {
        x += y;
    } return(x);
}
```

FIG.5

```
main (argc, argv)
{
   char * * D.2536;
   char * D.2537;
   double y. 0;
   int D.2539;
   int i ;
   double x;
   double y;

D.2536 = argv + 4B;
   D.2537 = *D.2536;
   sscanf (D.2537, &"%f"[0], &y);
   x = 0. 0;
   i = 0;
   goto <D2534>;
<D2533>: ;
   y. 0 = y;
   x = x + y. 0;
   i = i + 1;
<D2534>: ;
   if (i <= 1)
     {
        goto <D2533>;
     }
   else
     {
        goto <D2535>;
     }
<D2535>: ;
   D.2539 = (int) x;
   return D.2539;
}
```

FIG.7
(A)
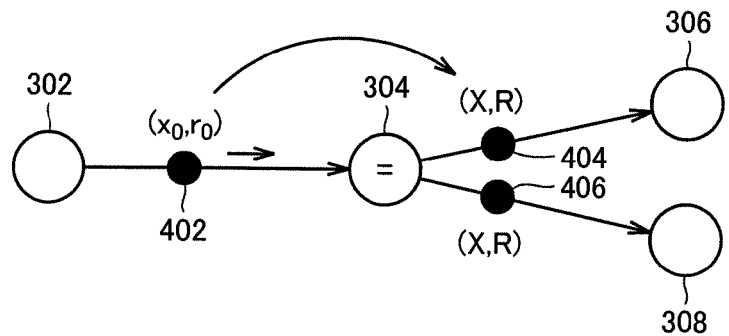
(B)
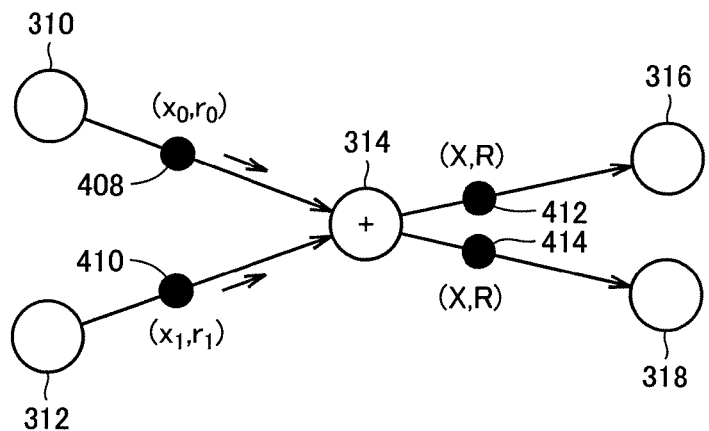
(C)
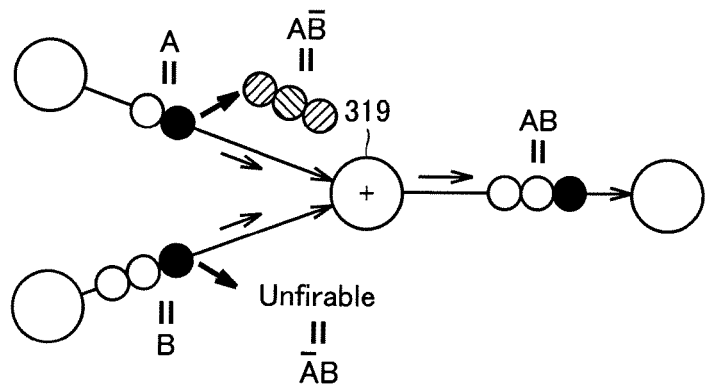

FIG.8

| Name | One-char. code | Input num. | Arithmetic/ Regulating | X | R |
|---|---|---|---|---|---|
| Start | S | 0 | R | — | 1 |
| Arithmetic const. | c | 1 | A | $(v)$ | $r_0$ |
| Regulating const. | C | 1 | R | $X_0=0, X_1=0$ | $R_0=(s)$, $R_1=1-(s)$ |
| Equal | = | 1 | A | $x_0$ | $r_0$ |
| Negative | n | 1 | A | $-x_0$ | $r_0$ |
| Inverse | i | 1 | A | $1/x_0$ | $r_0$ |
| Subtraction | – | 2 | A | $x_0-x_1$ | $Min(r_0,r_1)$ |
| Division | / | 2 | A | $x_0/x_1$ | $Min(r_0,r_1)$ |
| Less than | L | 2 | R | $X_0=0, X_1=0$ | $R_0=sig(\kappa(\beta_r)(x_0-x_1))\cdot Min(r_0,r_1)$ <br> $R_1=sig(\kappa(\beta_r)(x_1-x_0))\cdot Min(r_0,r_1)$ |
| Write | w | 1 | A/R | $X_1=x_0$ | $R_0=R_1=r_0$ |
| Read | r | 2 | A | $x_1$ | $Min(r_0,r_1)$ |
| Addition | + | 2+ | A | $\Sigma x_i$ | $Min(r_i)$ |
| Multiplication | * | 2+ | A | $\Pi x_i$ | $Min(r_i)$ |

FIG.9

| | | 134a |
|---|---|---|
| X | Operation code | |
| v, s, $\beta_r$ | Node variables | |
| $D_v$, $D_s$, $D_{\beta r}$ | Differential coefficients of E with respect to the node variables | |
| x[ ], r[ ] | Value sets produced by the firing at the node | |
| egs[ ] | NODE-TO-EDGE POINTER | |
| Out[ ] | OUTPUT INFORMATION (INFORMATION RELATED TO EDGE DIRECTION) | |
| idx[ ] | EDGE INDEX | |

| | | 134b |
|---|---|---|
| nd0 | POINTER TO START NODE | |
| nd1 | POINTER TO END NODE | |

| | | 134c |
|---|---|---|
| x, r | Value set | |
| lbl | Binary label vector | |
| $D_x$, $D_r$ | Differential coefficients of E with respect to the value set | |
| $\frac{\partial X}{\partial x}, \frac{\partial R}{\partial x}, \frac{\partial X}{\partial r}, \frac{\partial R}{\partial r}$ | Partial derivative of the child agent's value set with respect to this agent's value set | |
| $\frac{\partial X}{\partial s}, \frac{\partial R}{\partial s}, \frac{\partial X}{\partial \beta r}, \frac{\partial R}{\partial \beta r}$ | Partial derivative of the child agent's value set with respect to the output node's variables | |
| $\frac{\partial X}{\partial v}, \frac{\partial R}{\partial v}$ | | |
| ag_prnts[ ], ag_chldn[ ] | Pointers to parent/child agents | |
| eg | POINTER TO EDGE WHERE AGENT EXISTS | |

DELETED LABEL LIST — 134d

FIG.10

| $\eta$ | Learning Coefficient |
|---|---|
| $\eta_{1p}$ | Learning ratio by one-pass |
| t | Teaching value |
| E | Energy Error |
| $\mu, \nu$ | Coefficients in E |

~136

FIG.11
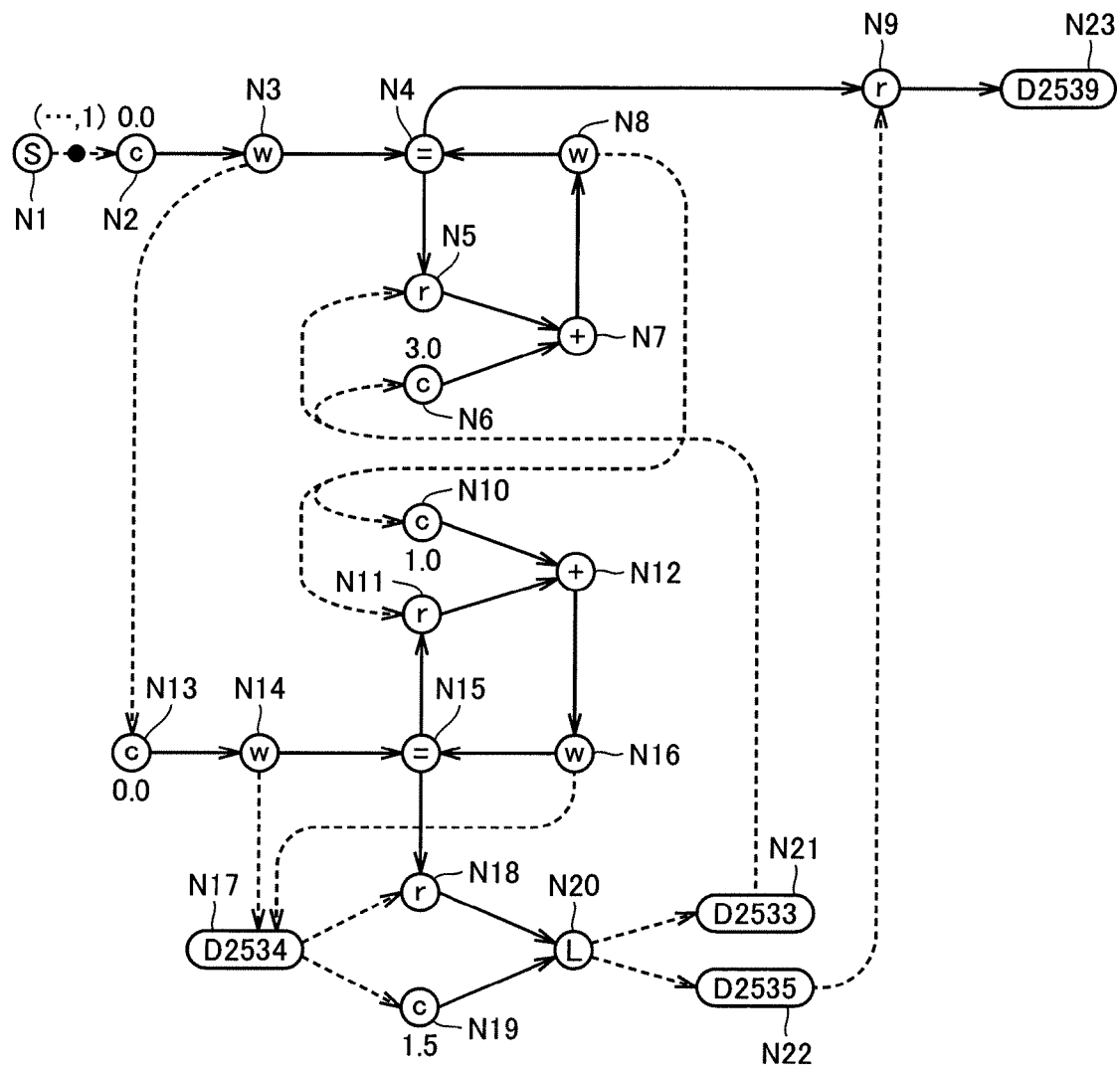
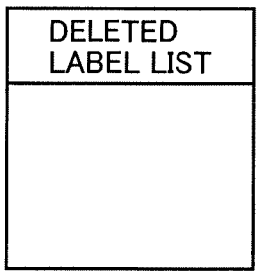

FIG.13
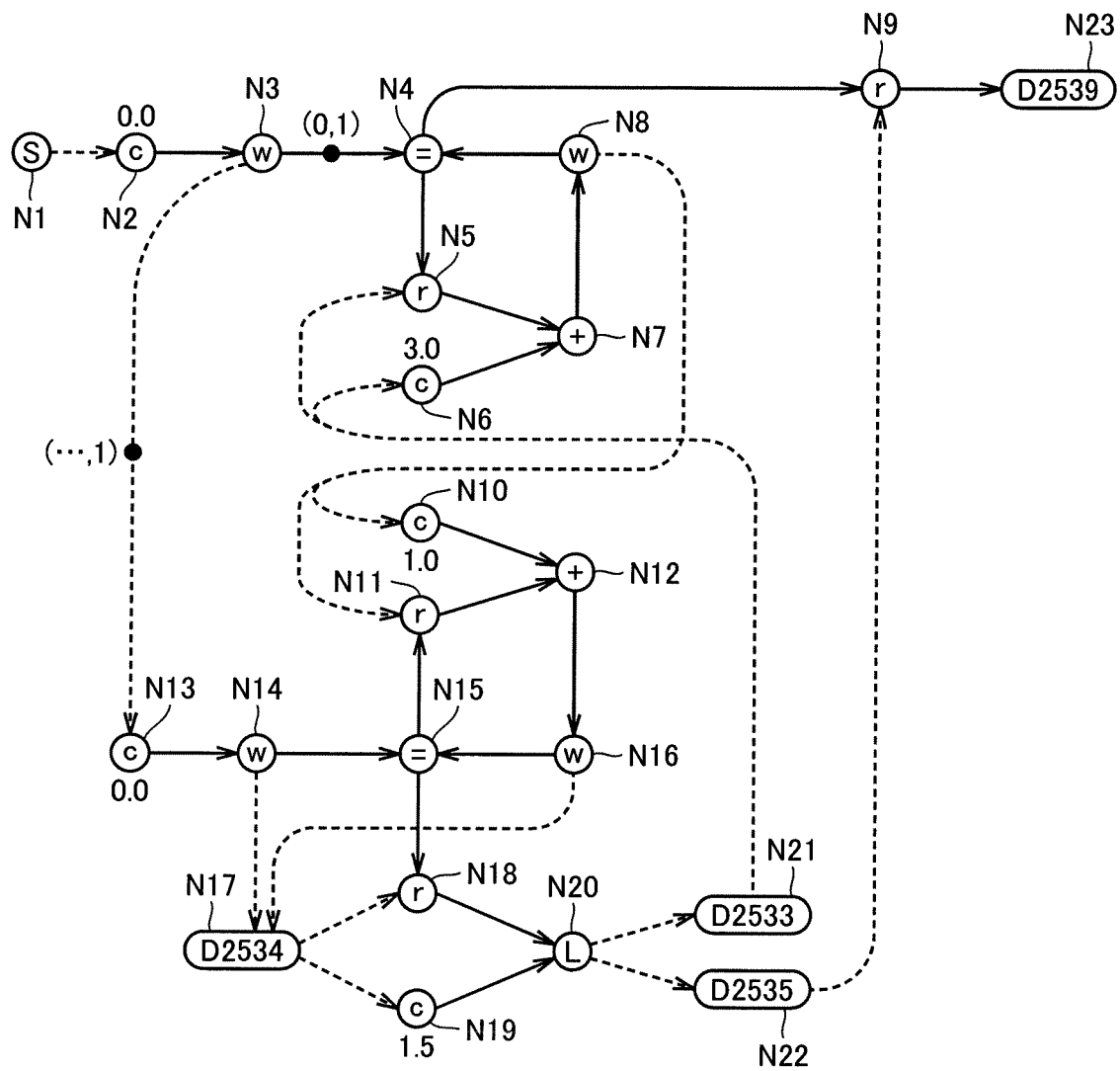
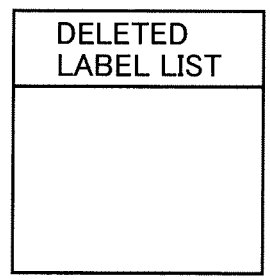

FIG.14
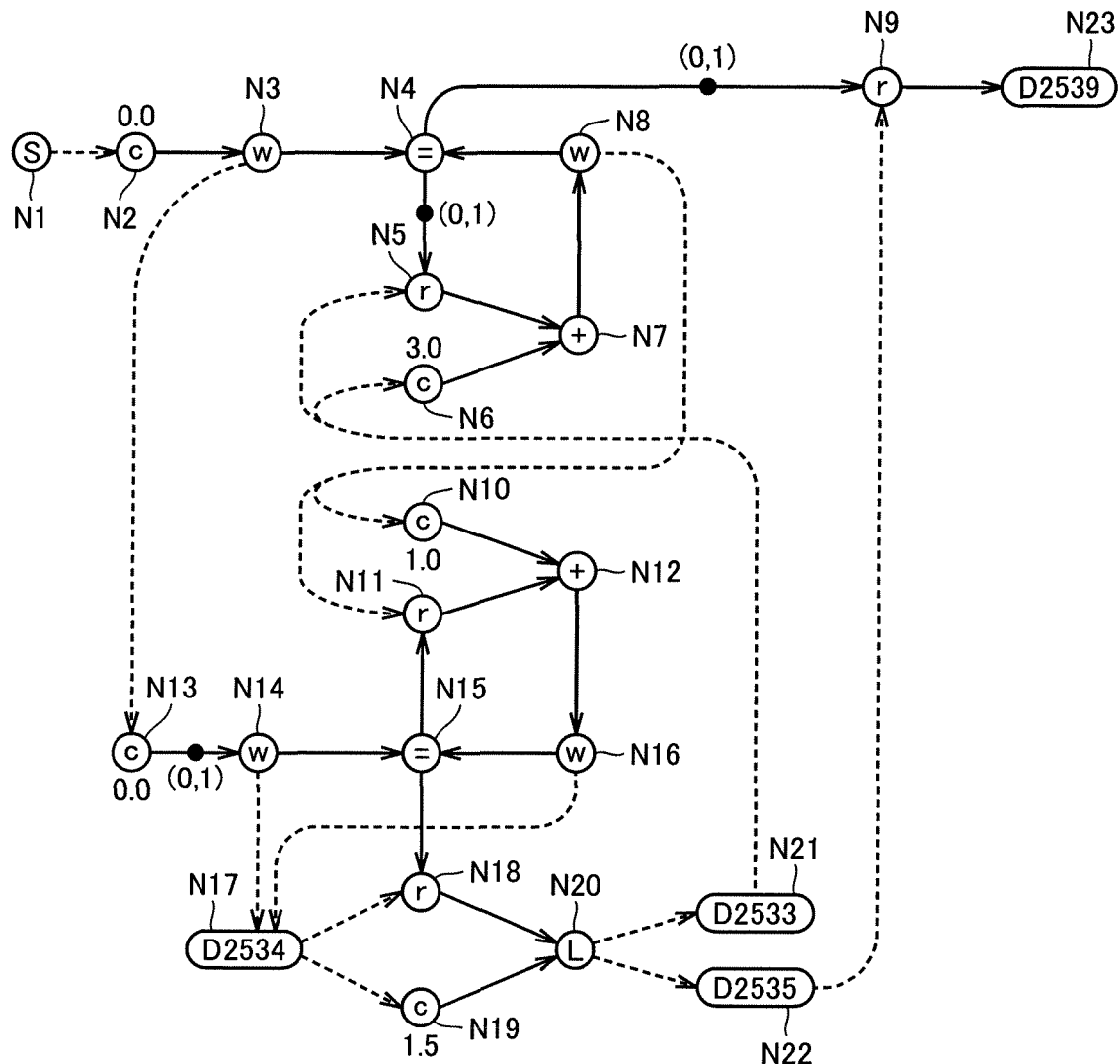

FIG.17
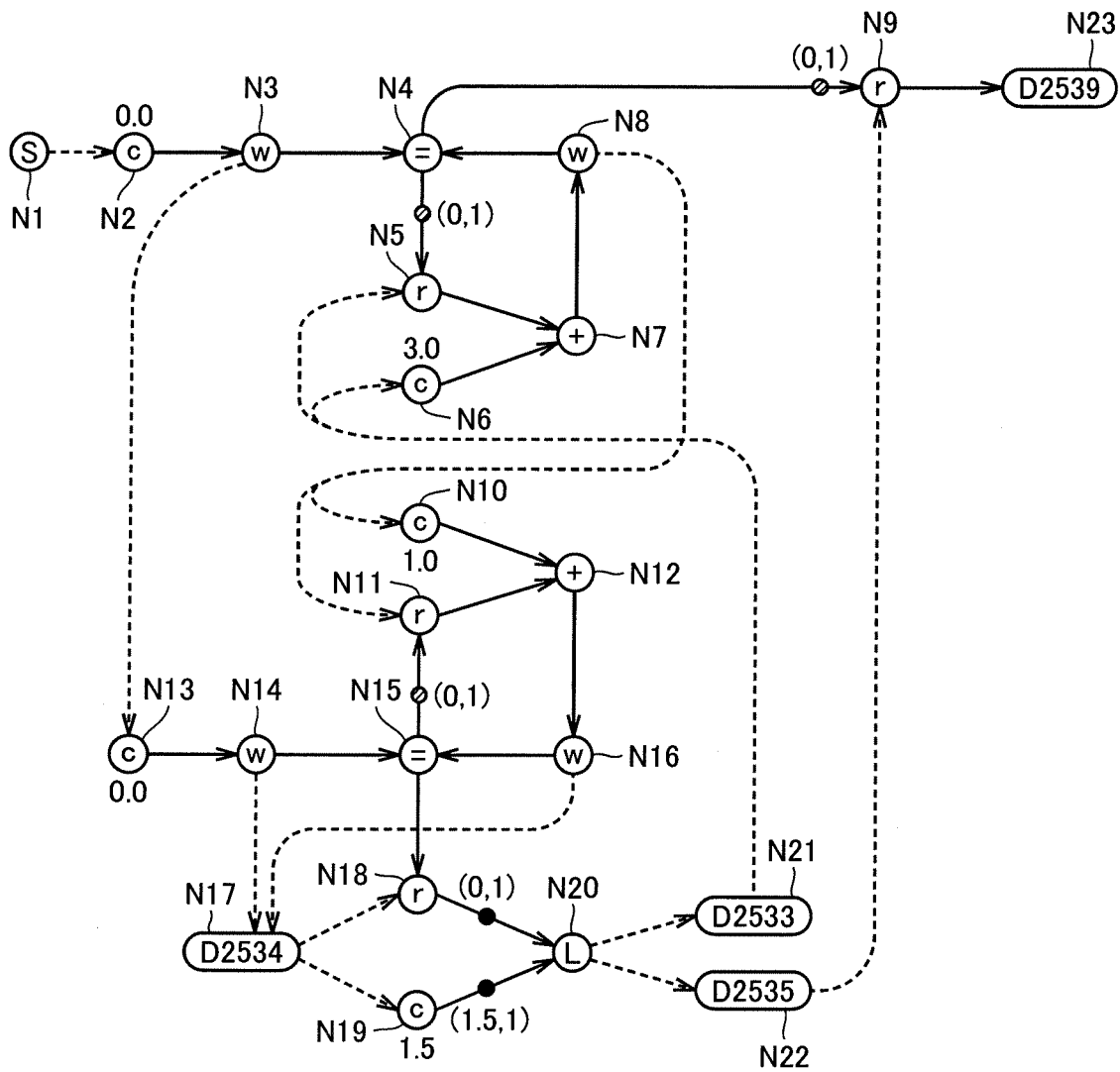
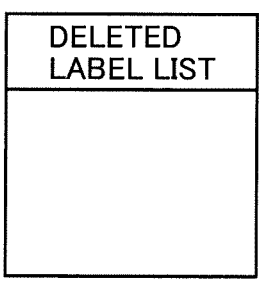

FIG.18
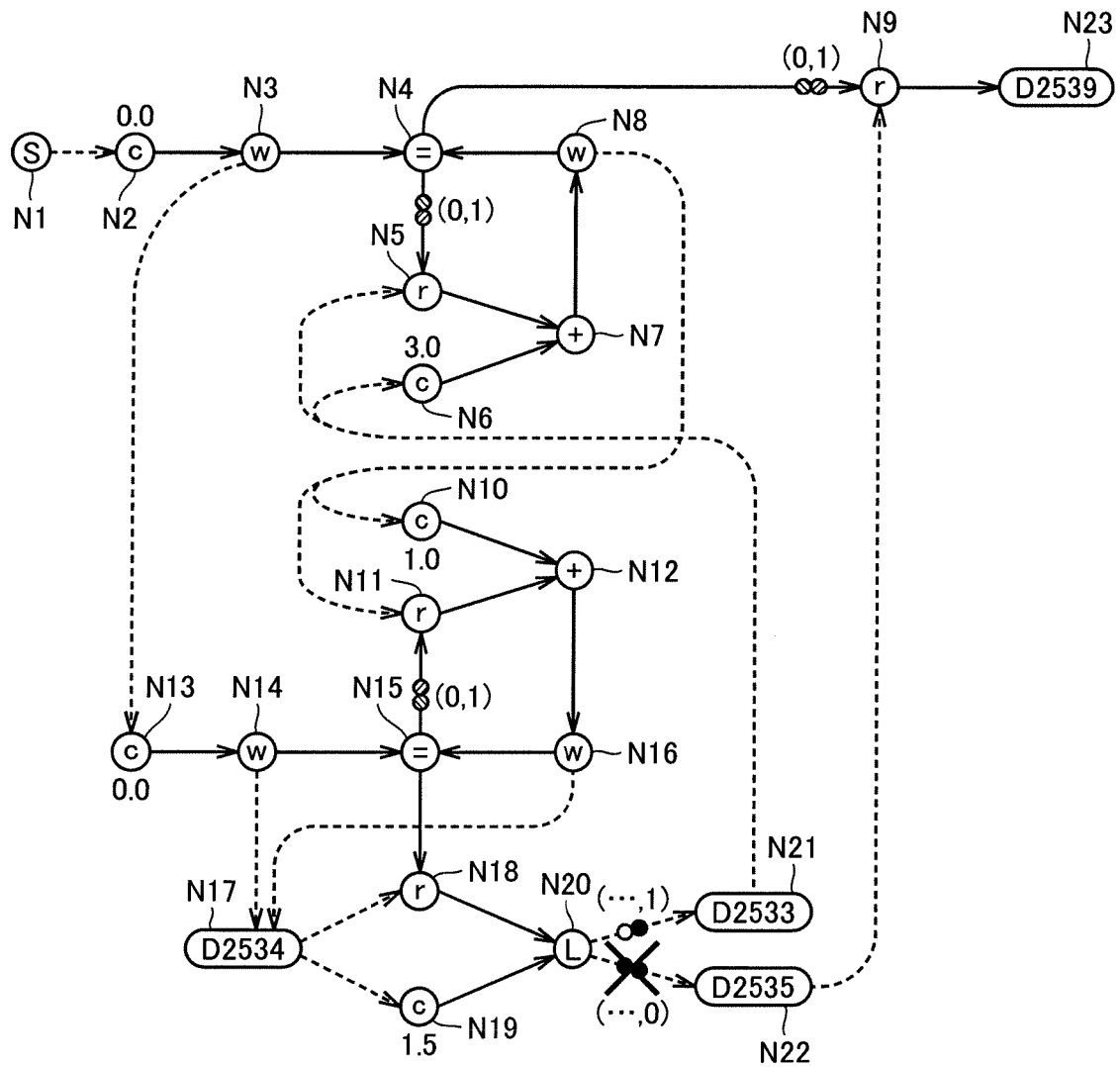
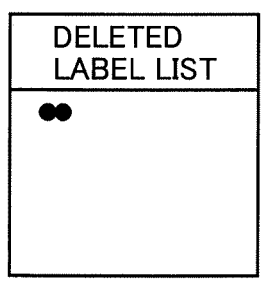

FIG.19
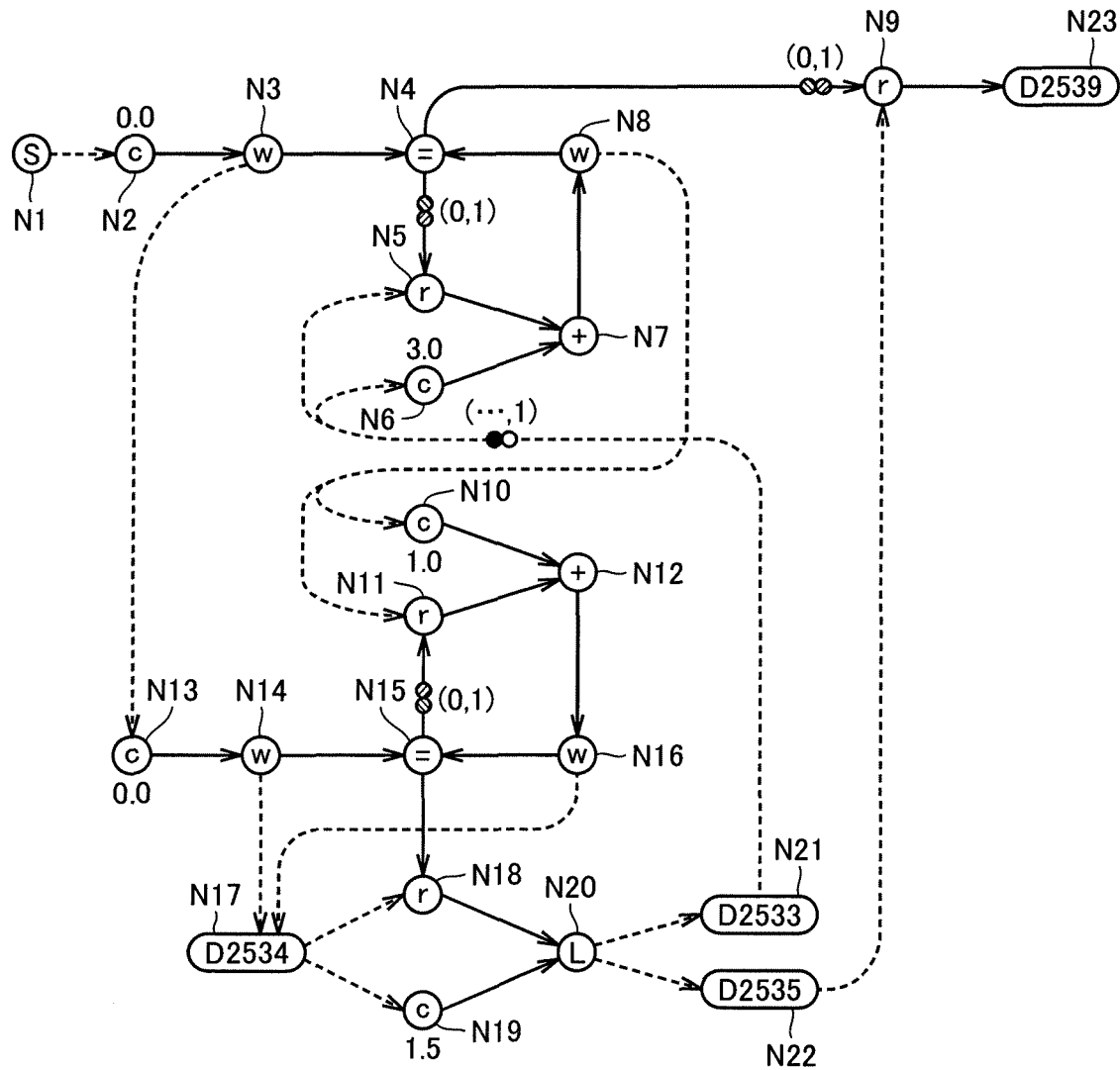
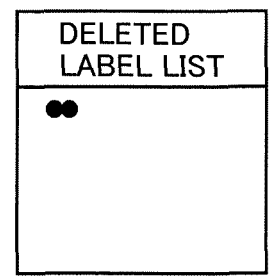
DELETED LABEL LIST

FIG.20
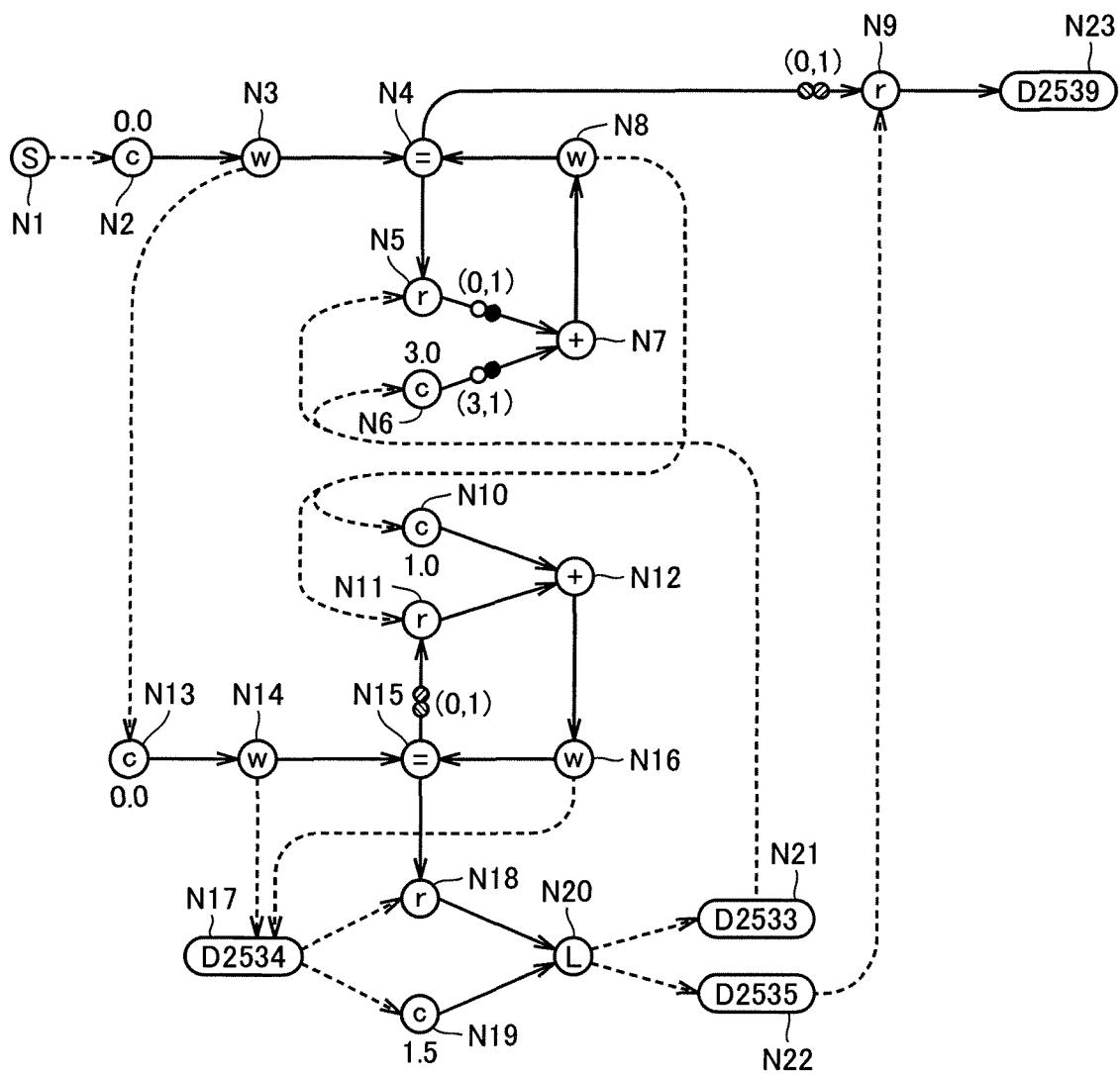
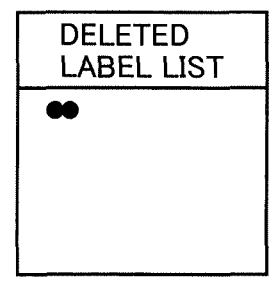

FIG.21
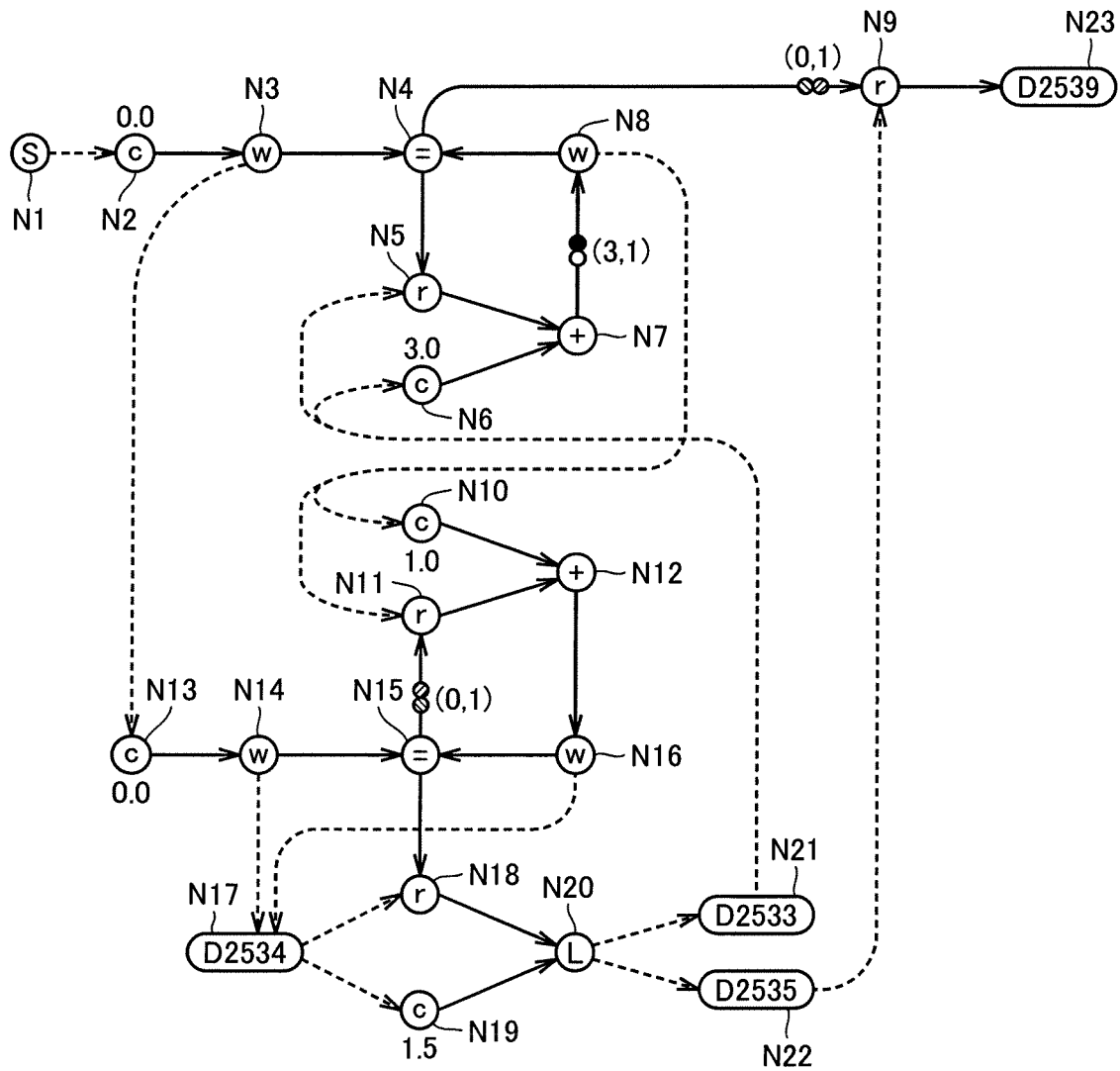
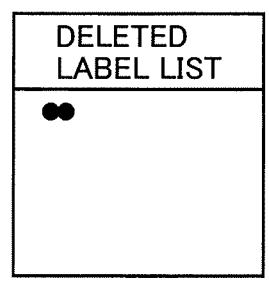
DELETED
LABEL LIST

FIG.23
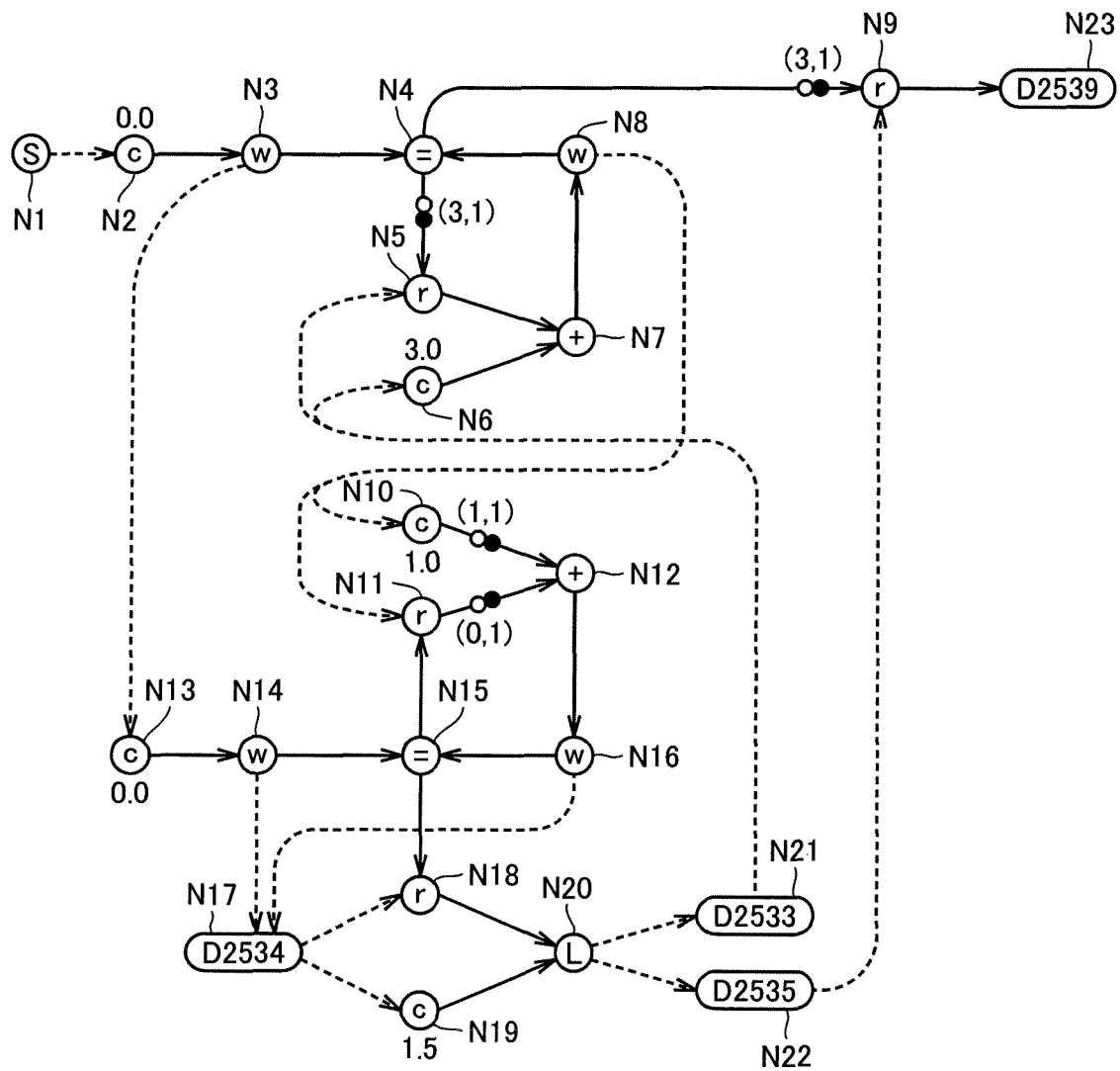
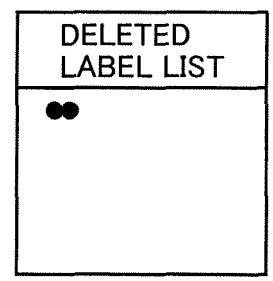

FIG.24
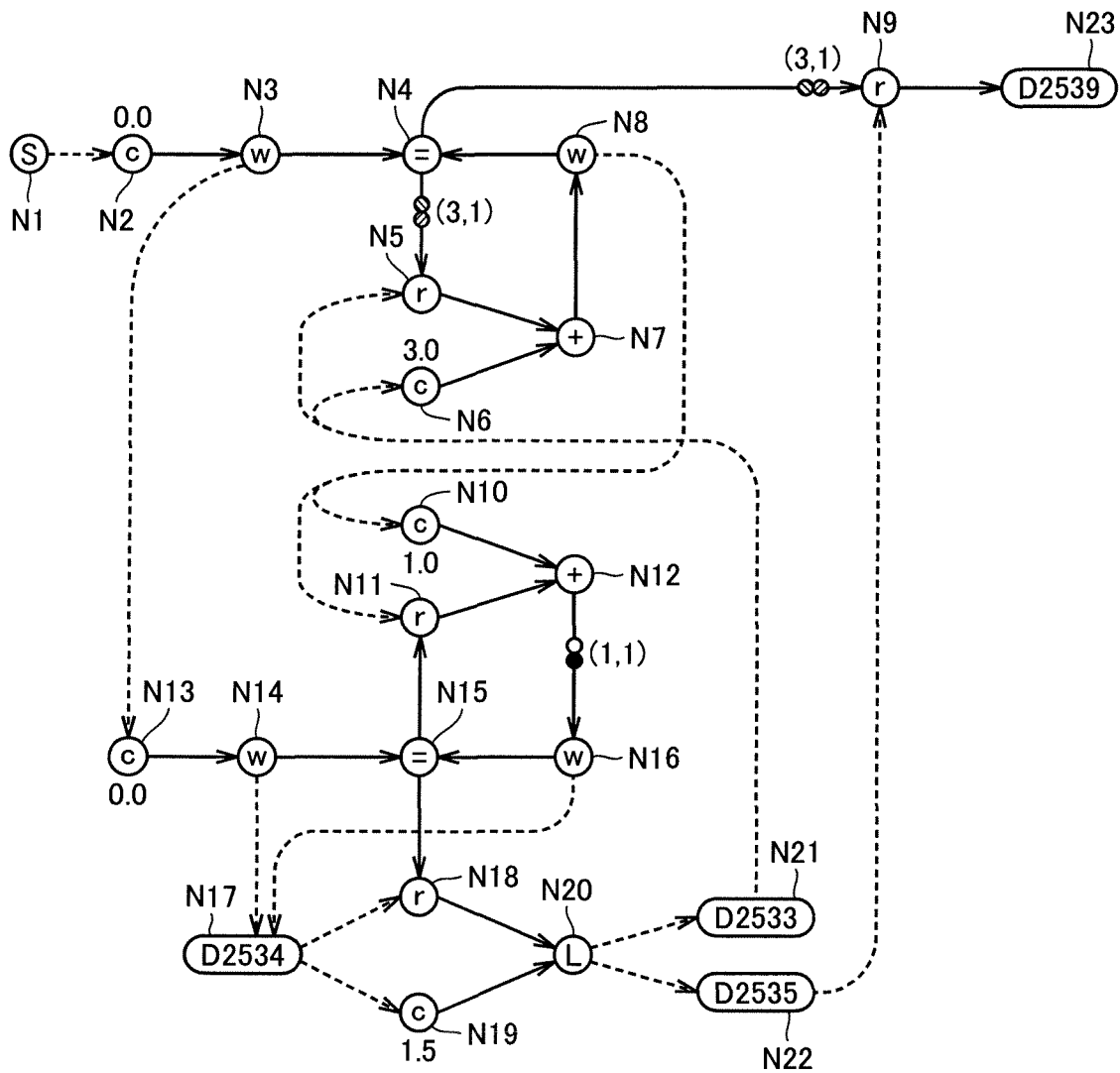
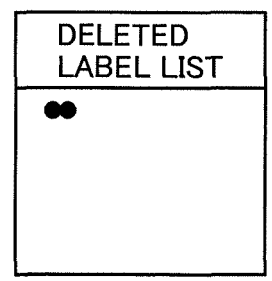

FIG.25
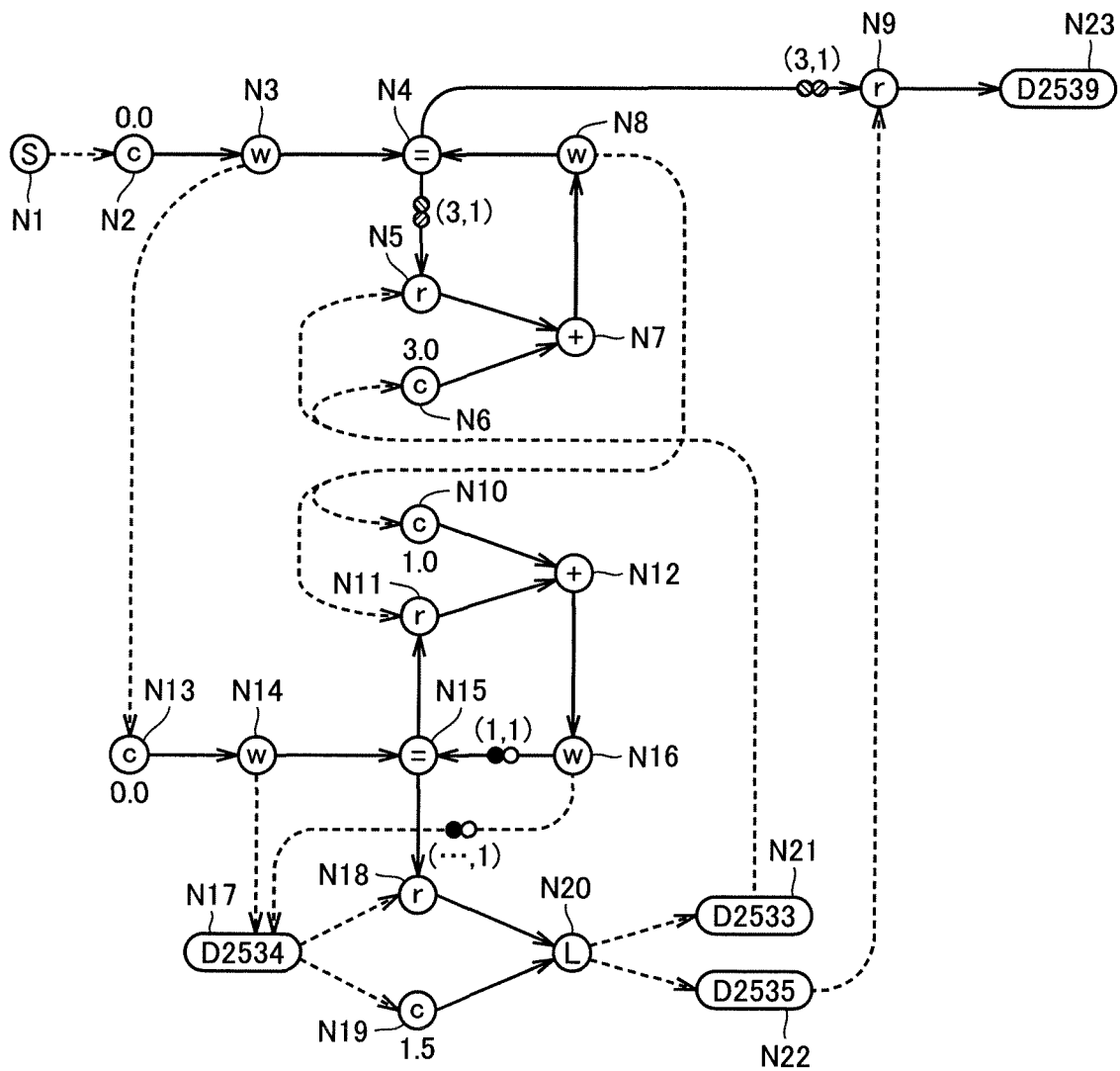
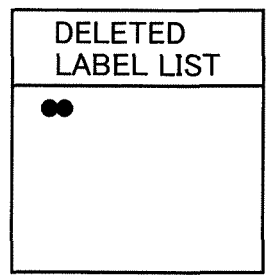

FIG.27
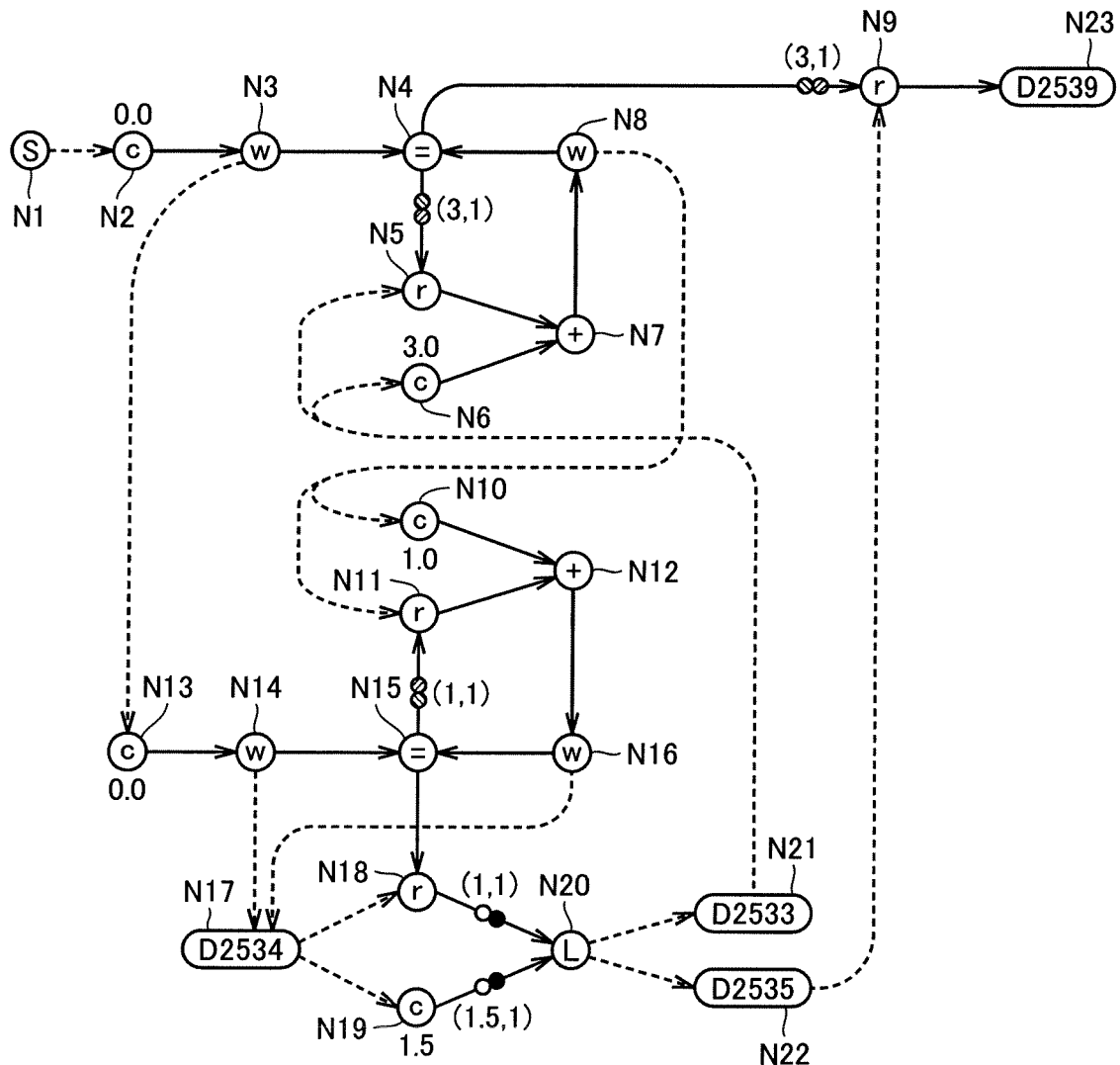
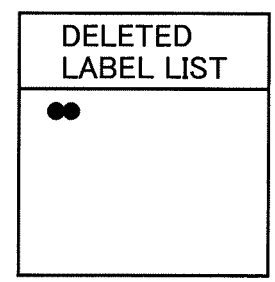

FIG.28
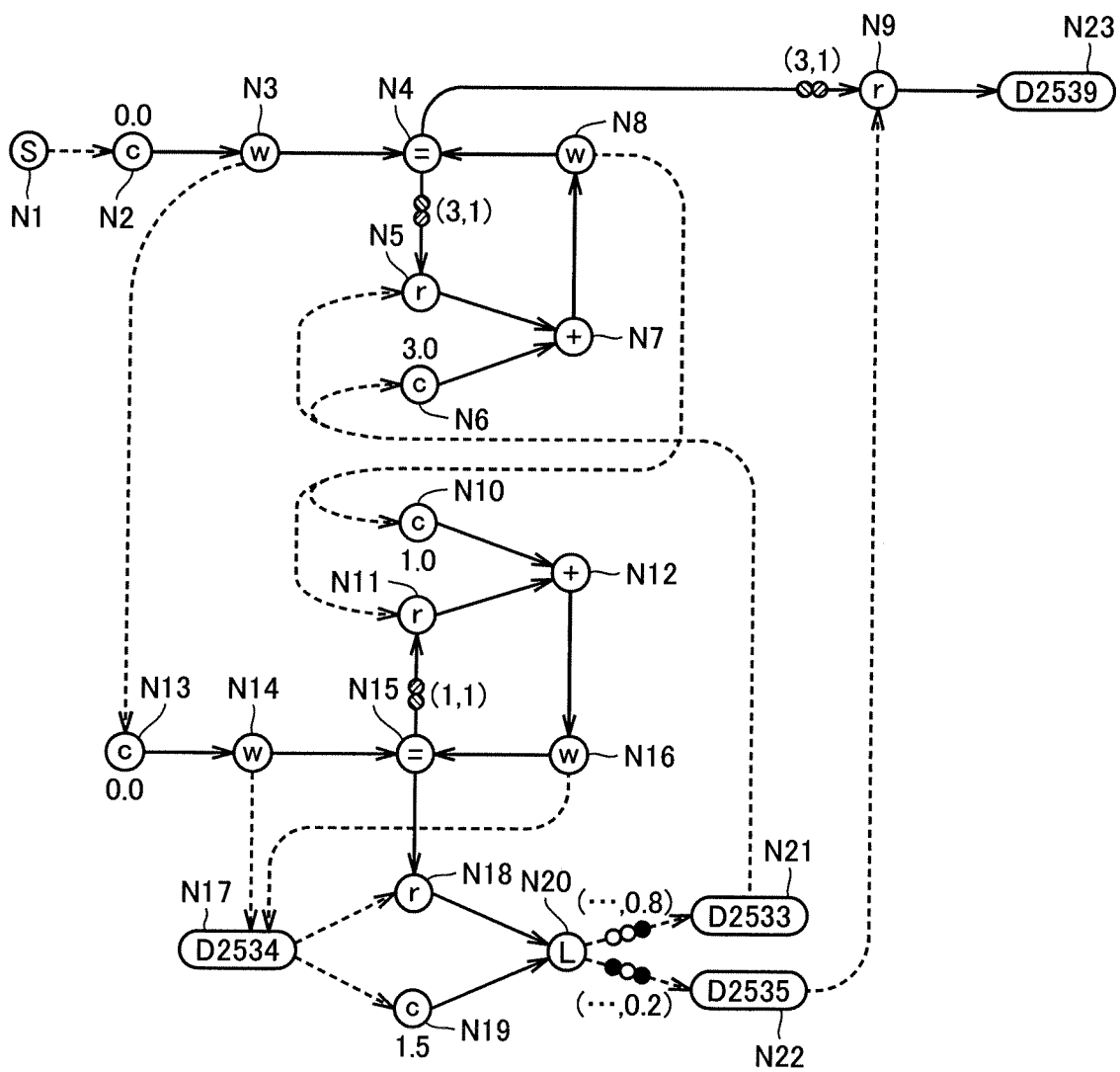
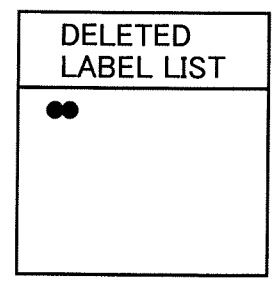
DELETED LABEL LIST

FIG.29
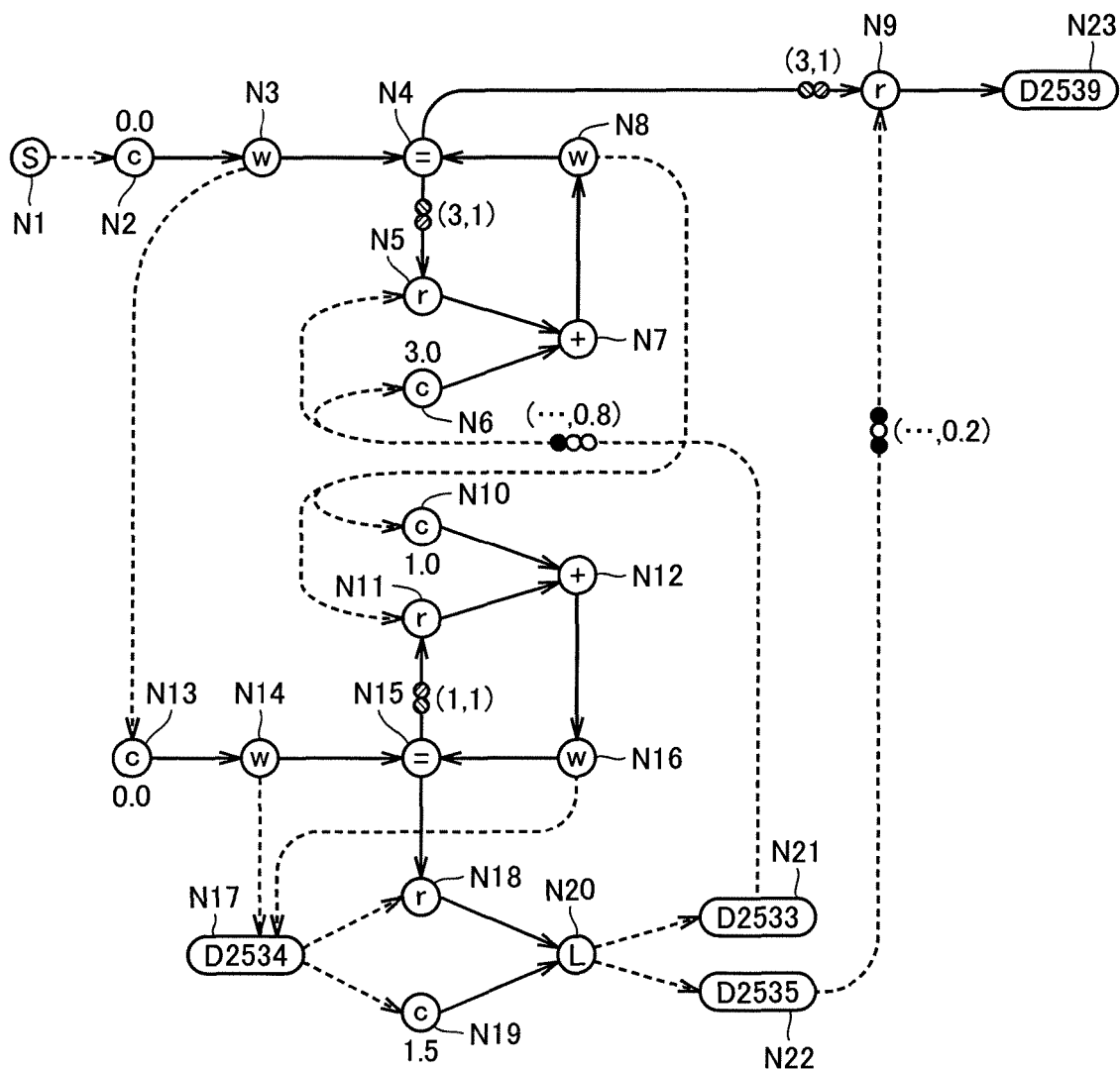
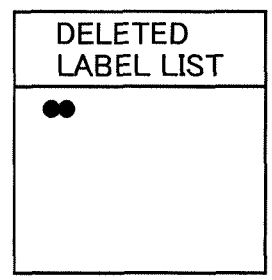

FIG.30
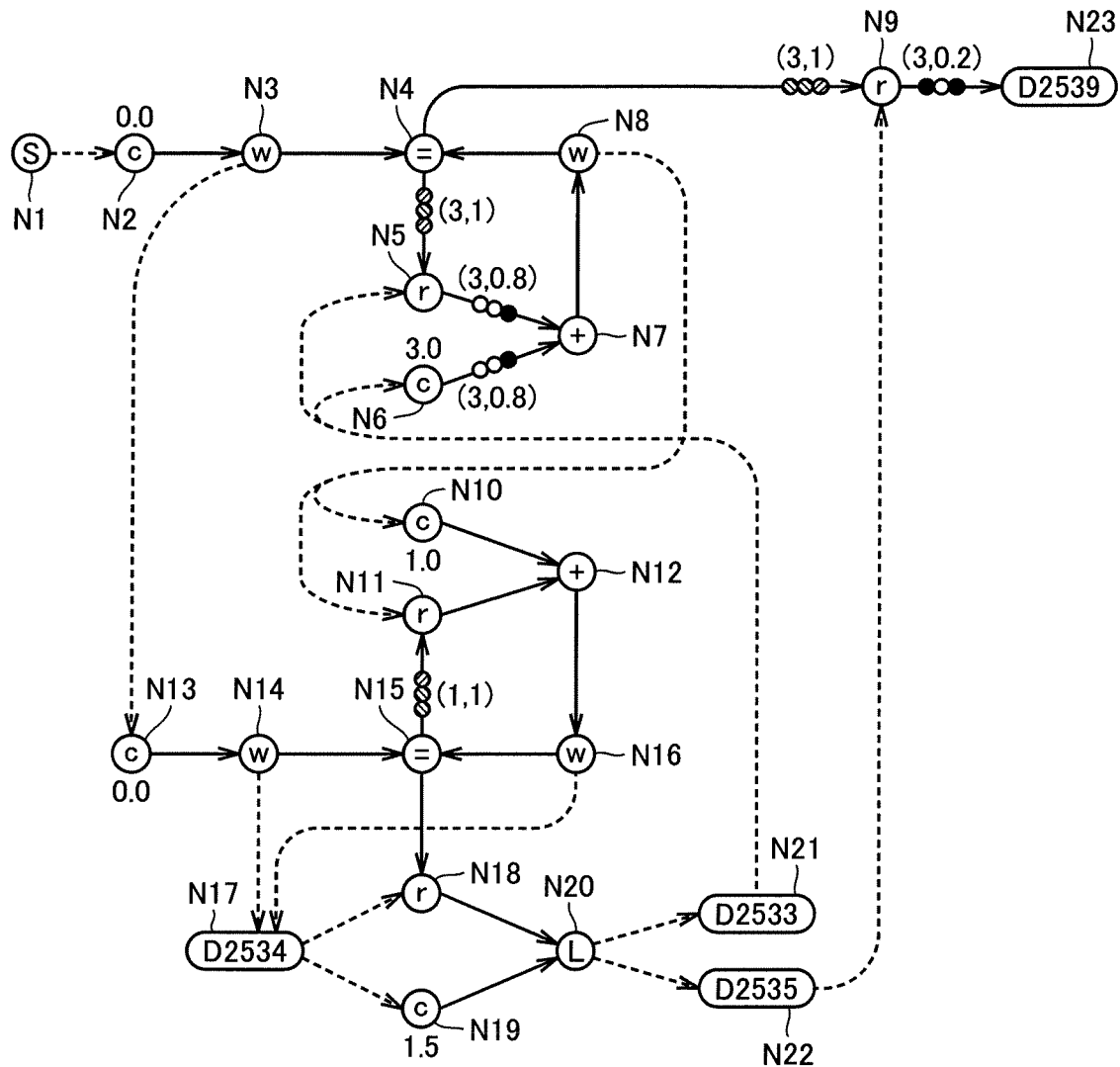
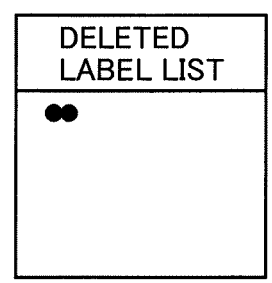

FIG.31
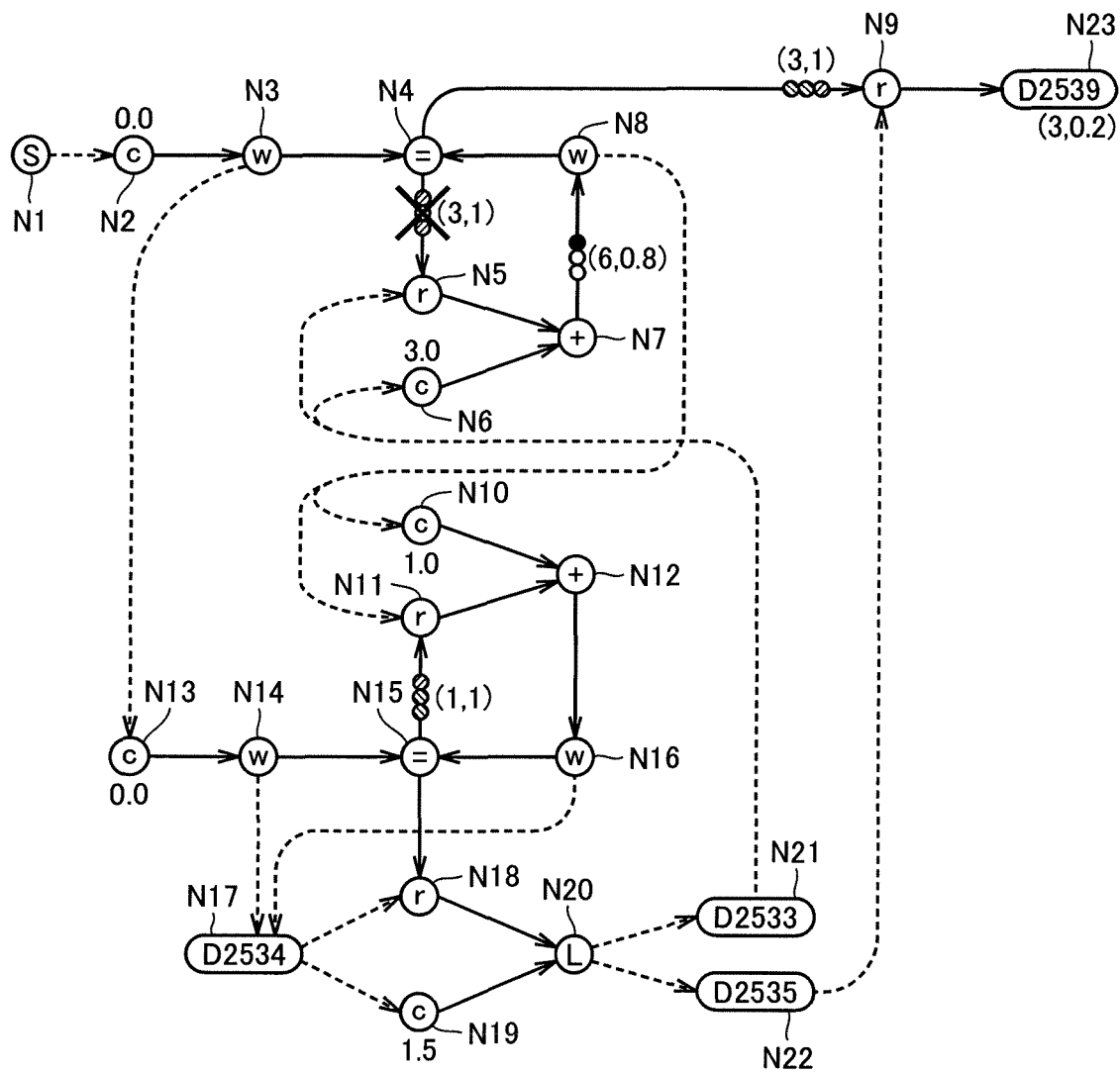
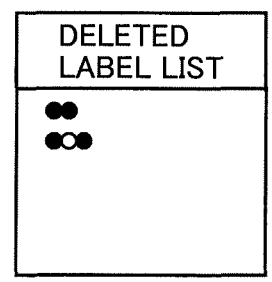

FIG.32
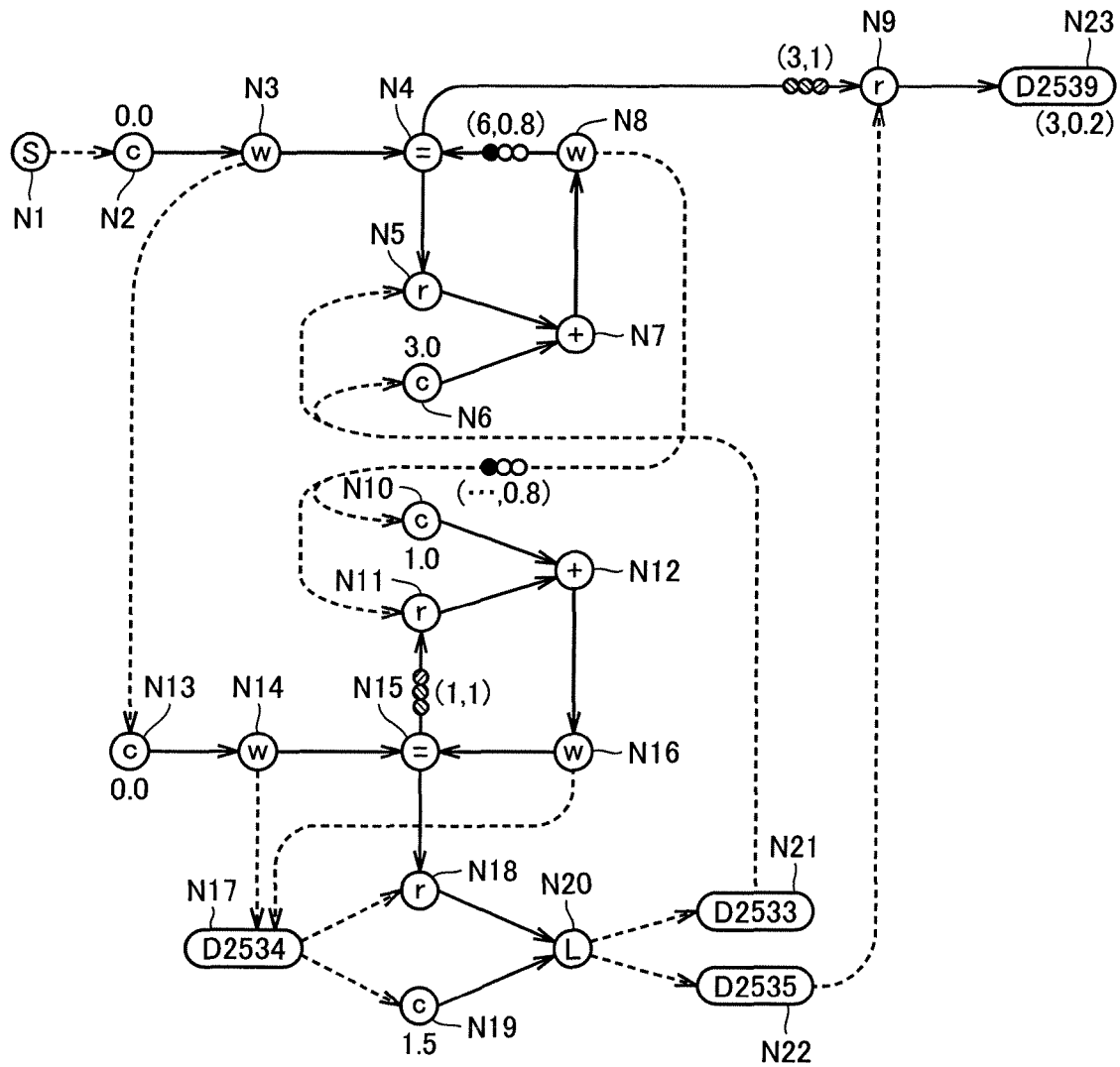
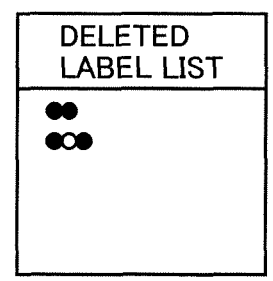

FIG.35
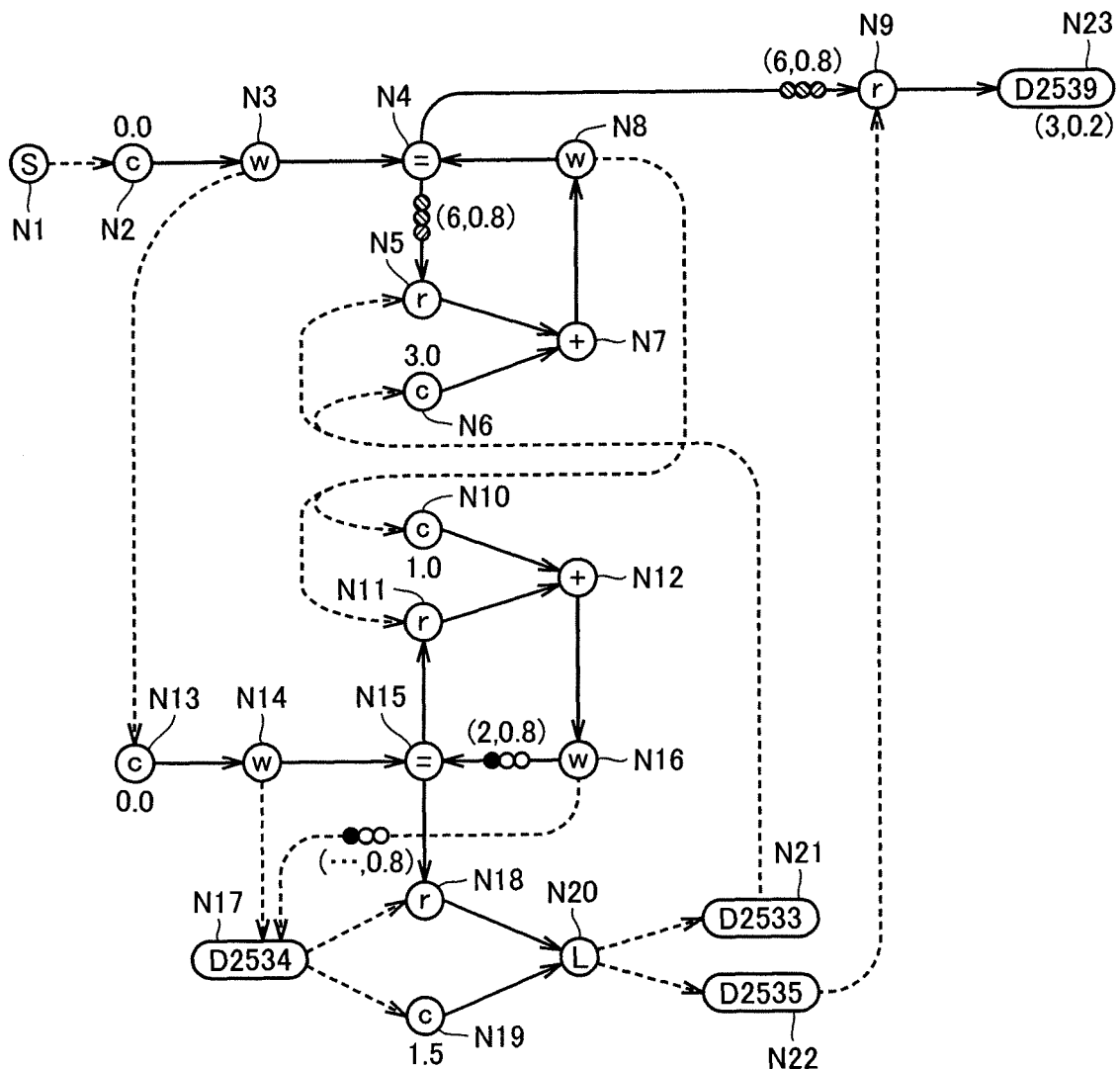
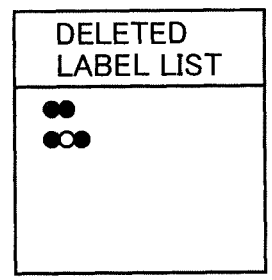

FIG.37
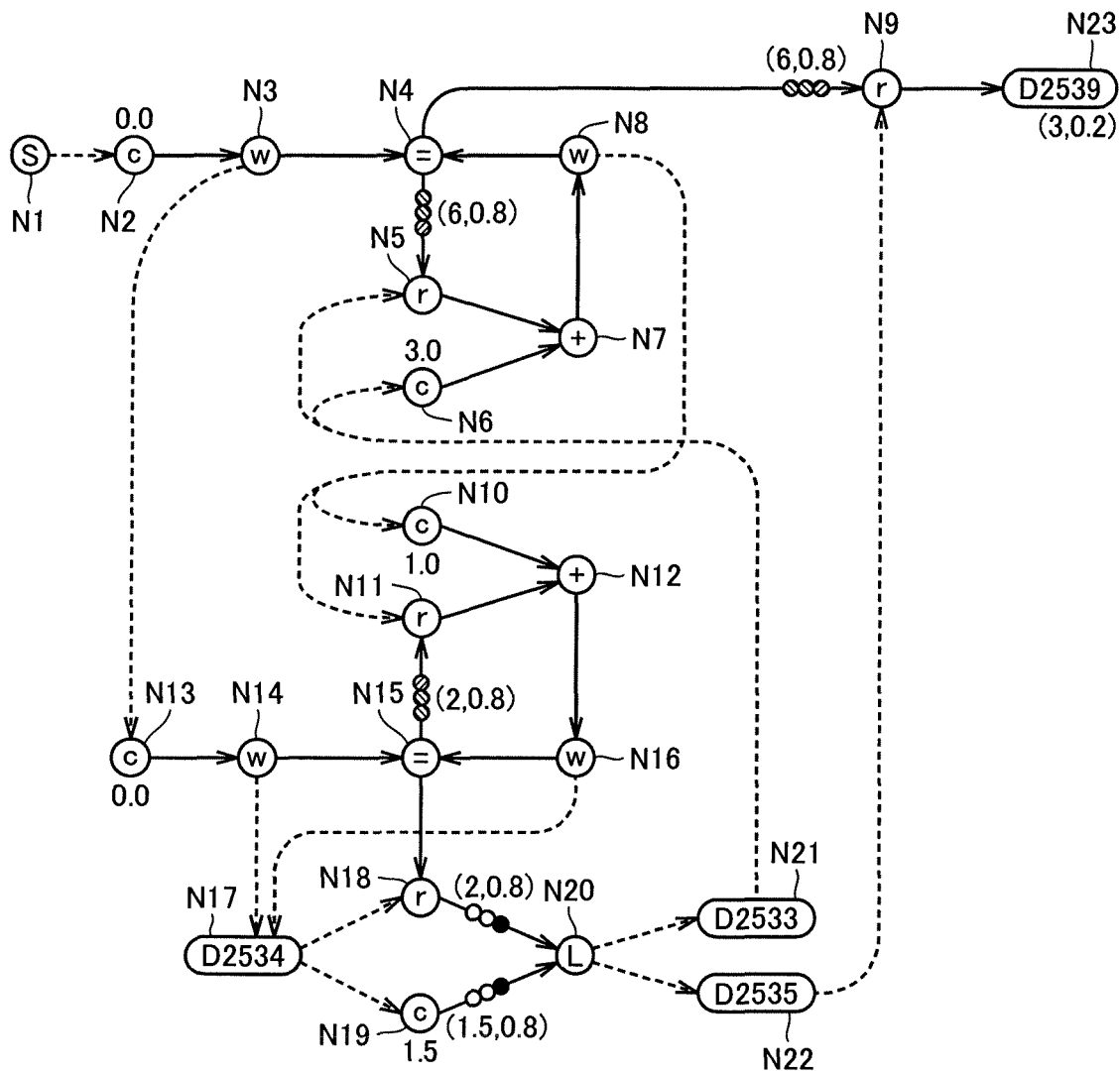
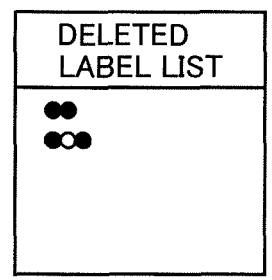

FIG.38
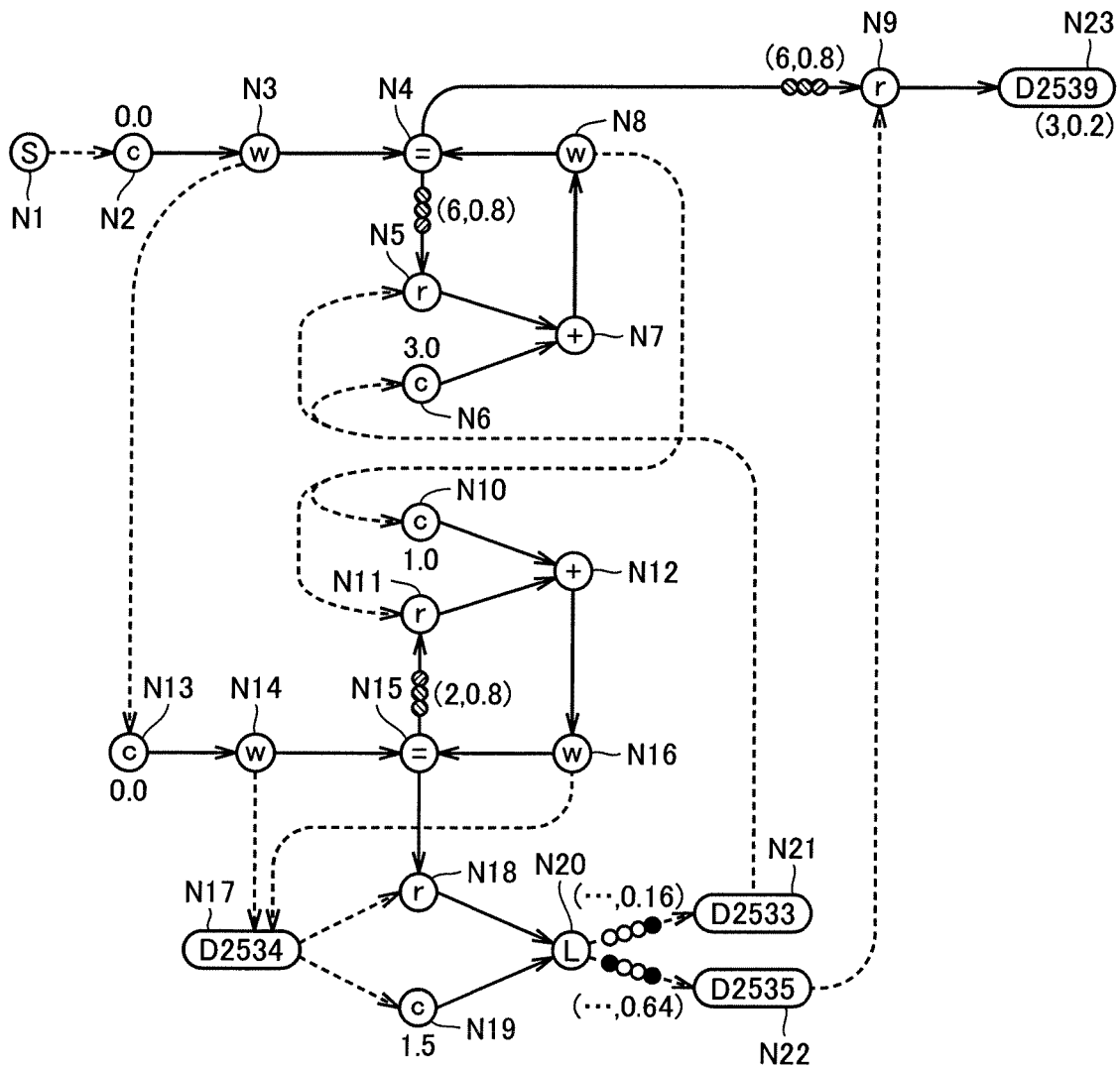
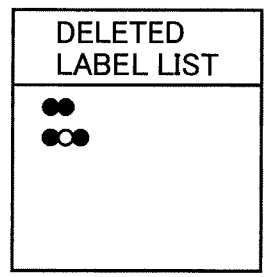

FIG.39
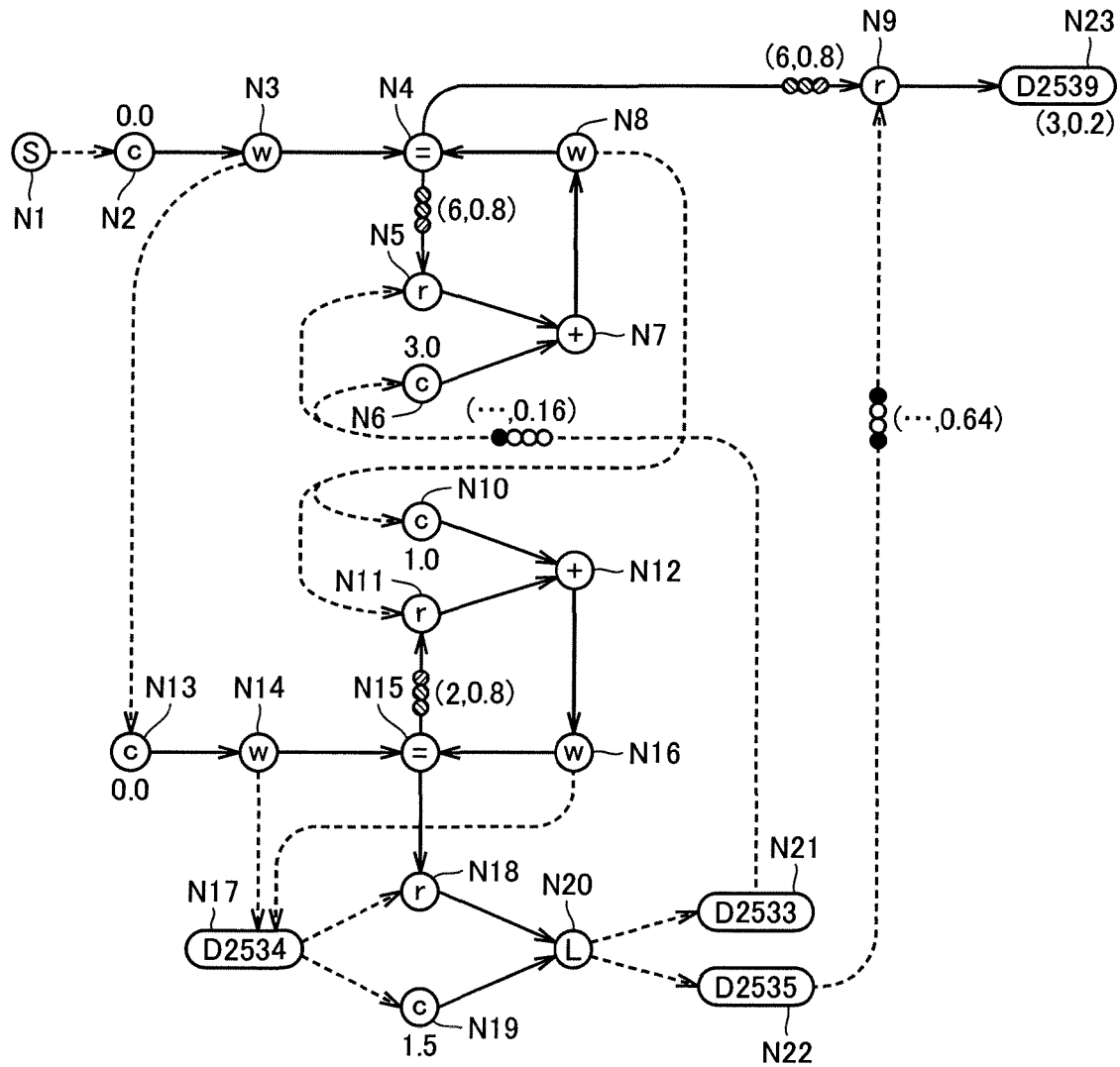
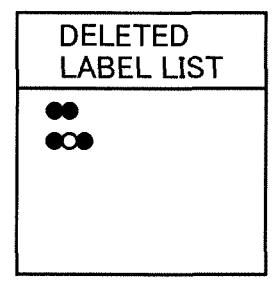

FIG.40
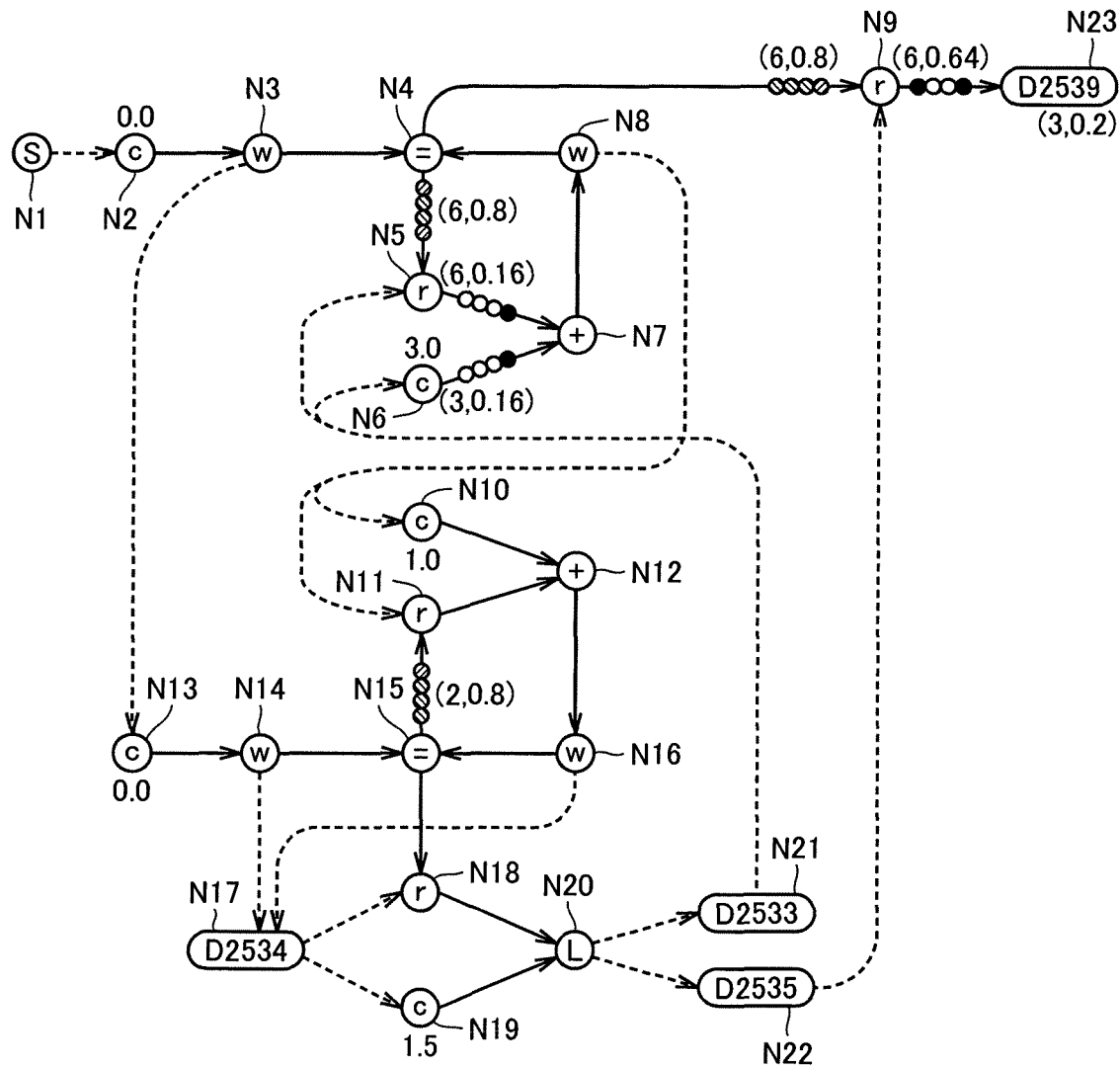
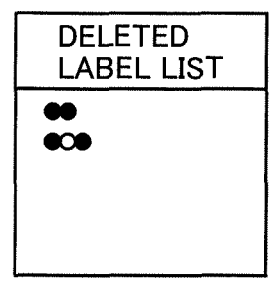

FIG.41
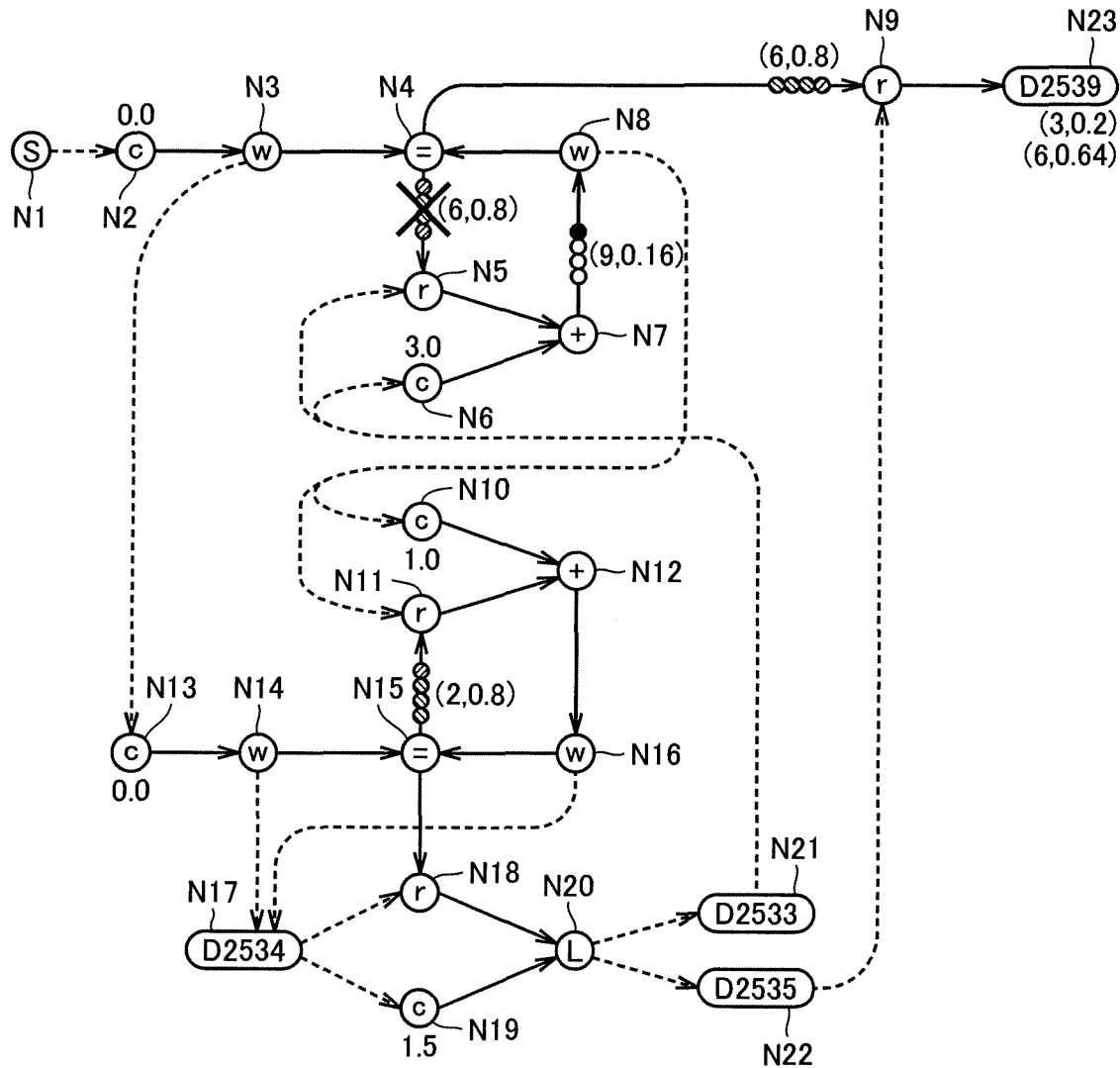
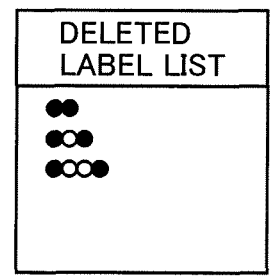

FIG.42
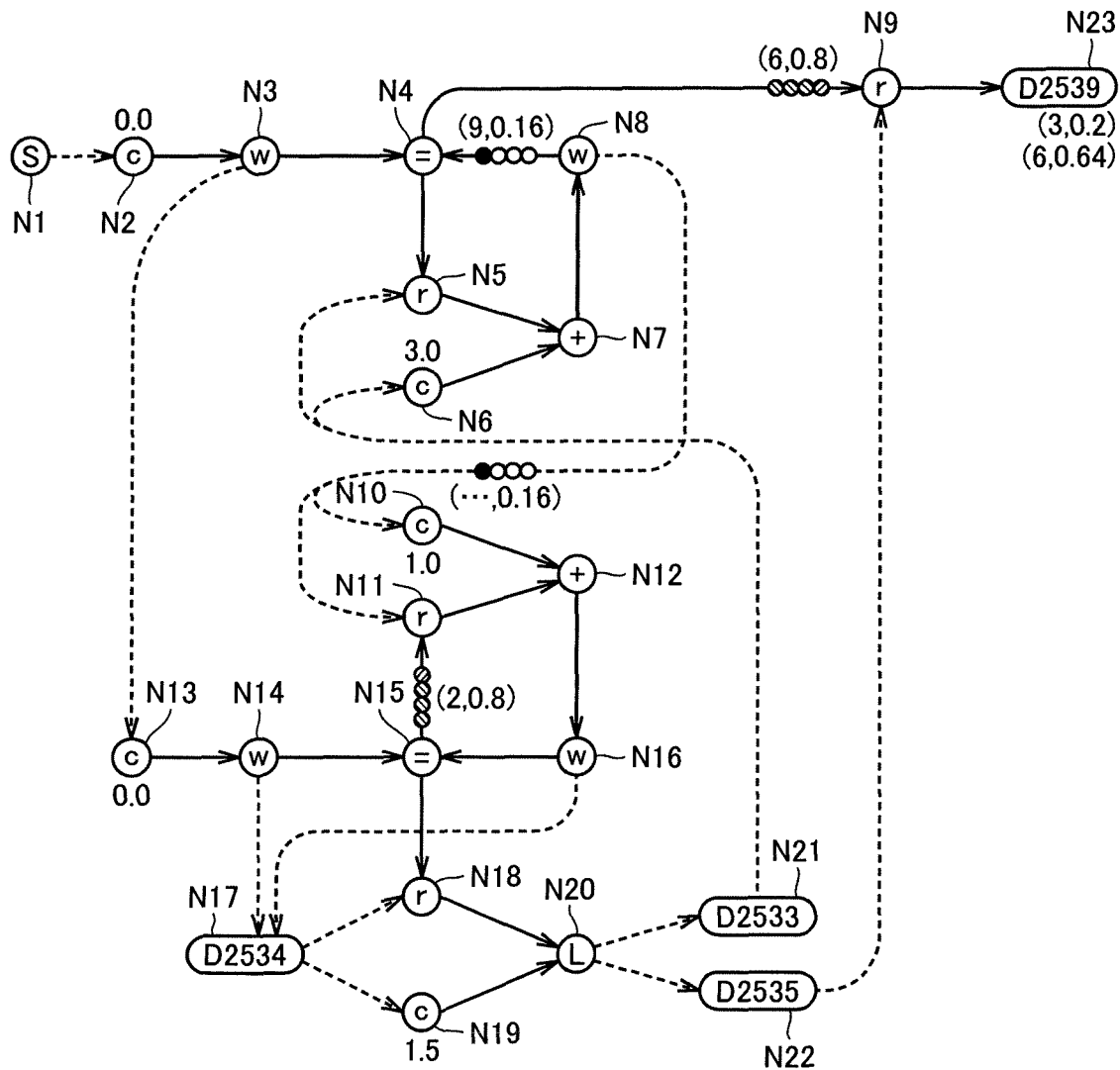
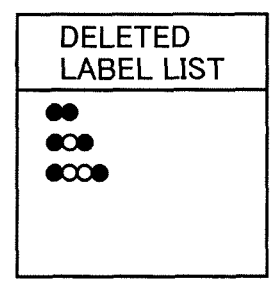

FIG.45
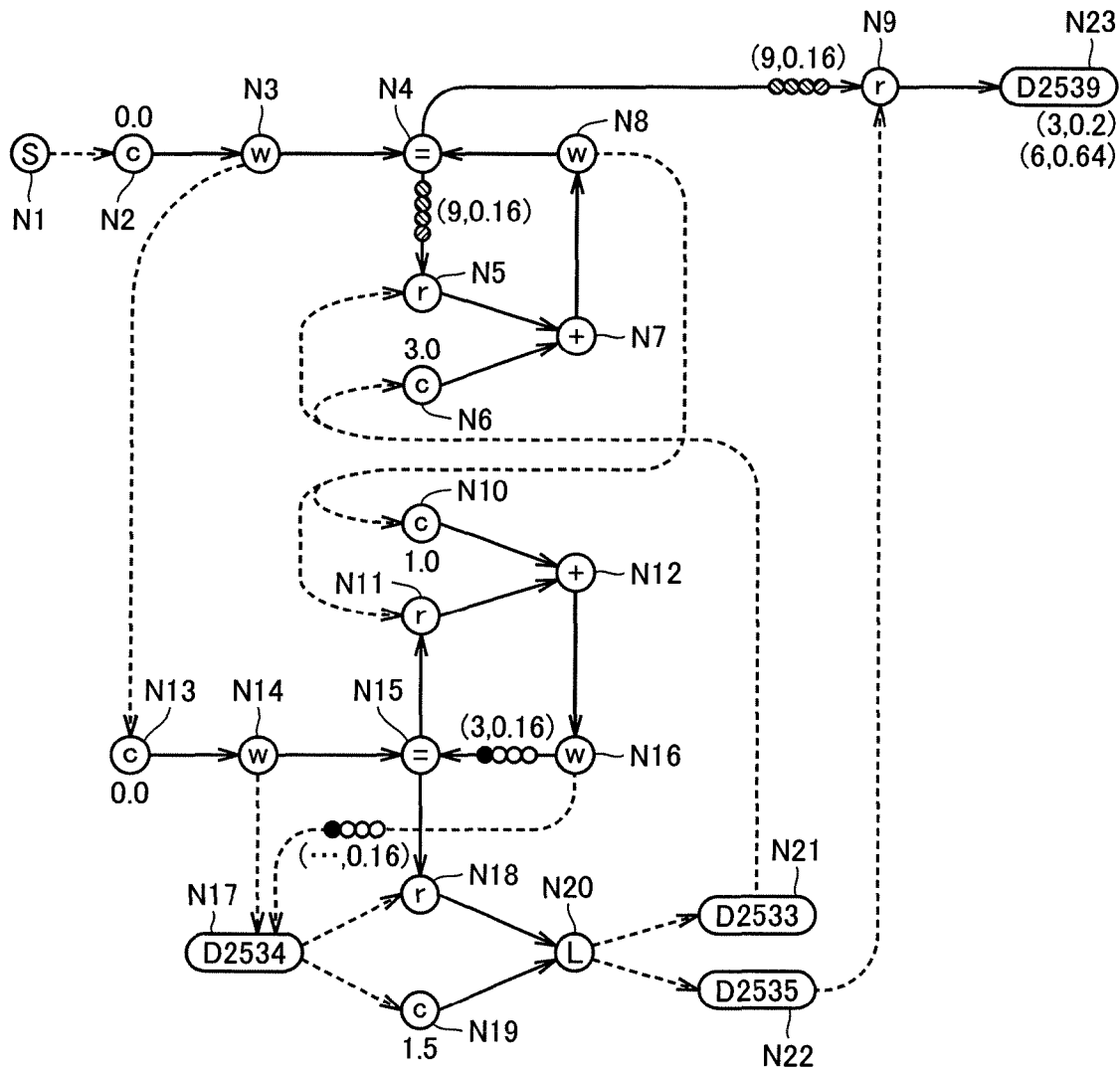
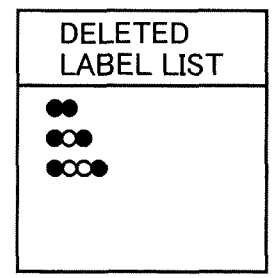

FIG.46
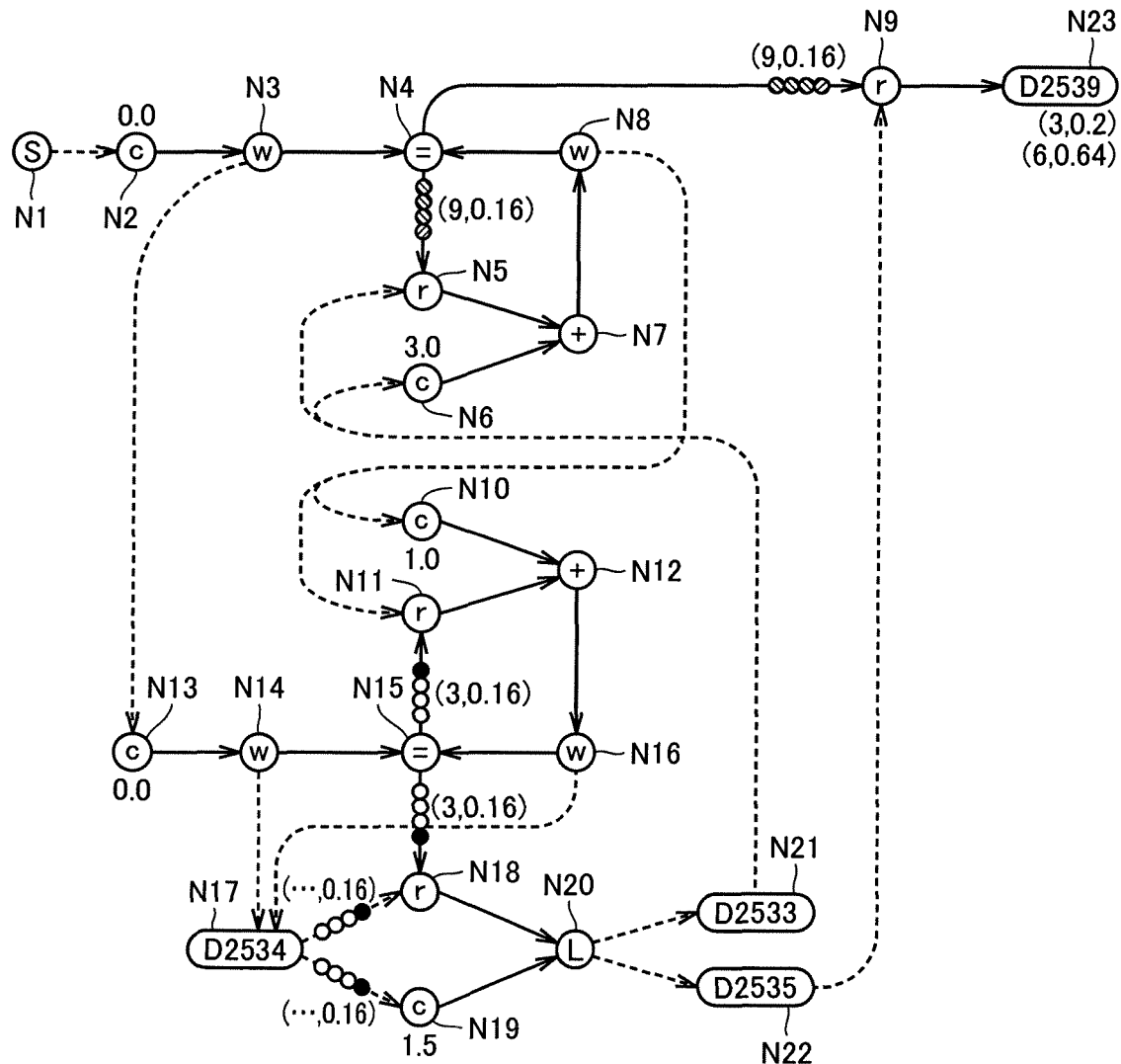
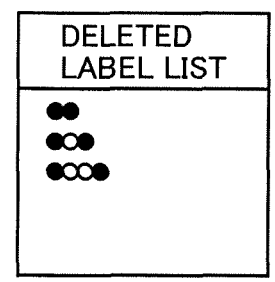

FIG.47
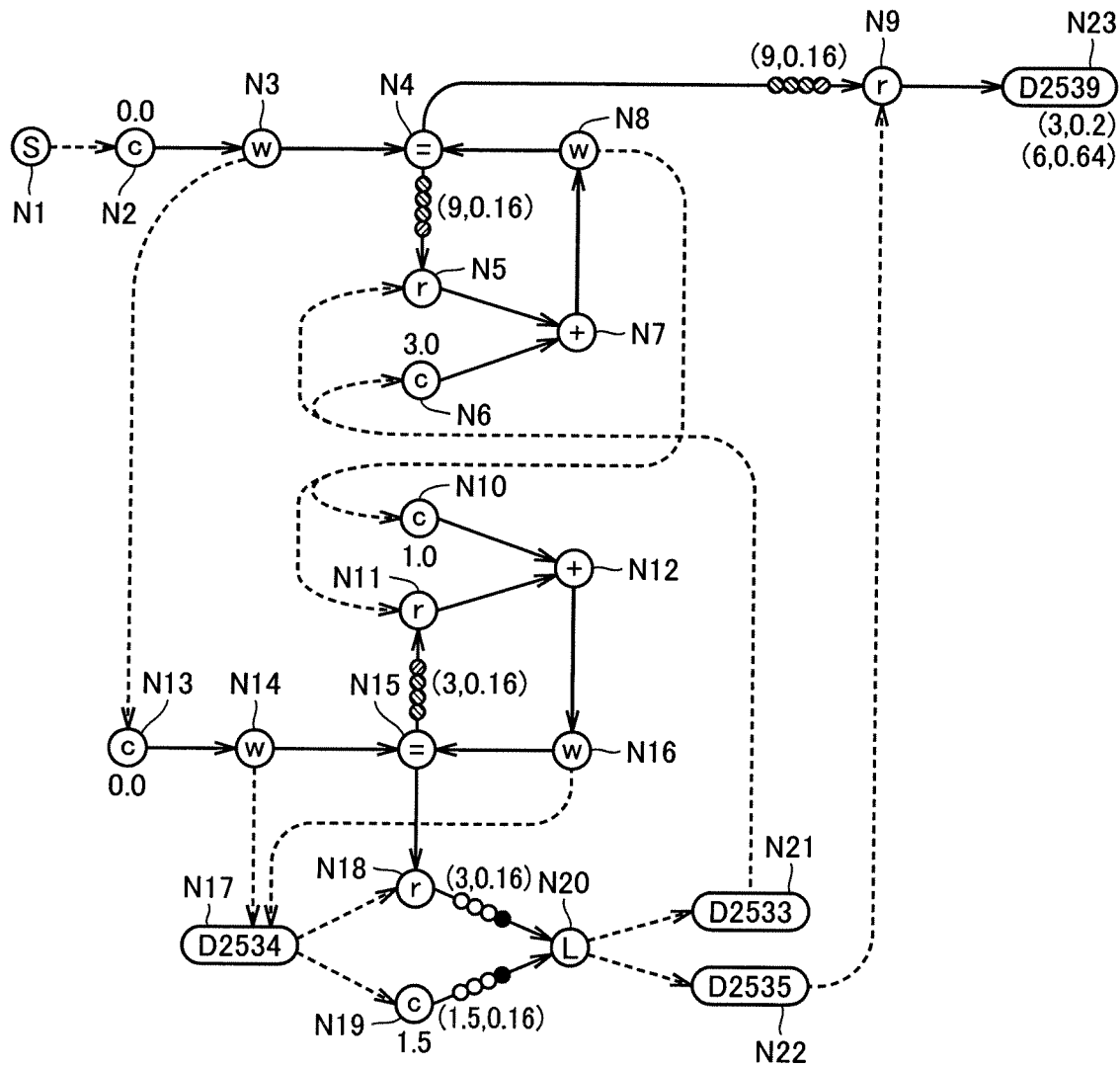
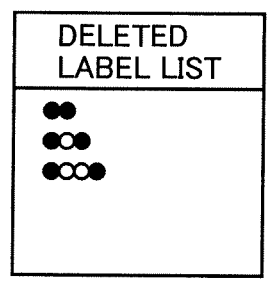

FIG.48
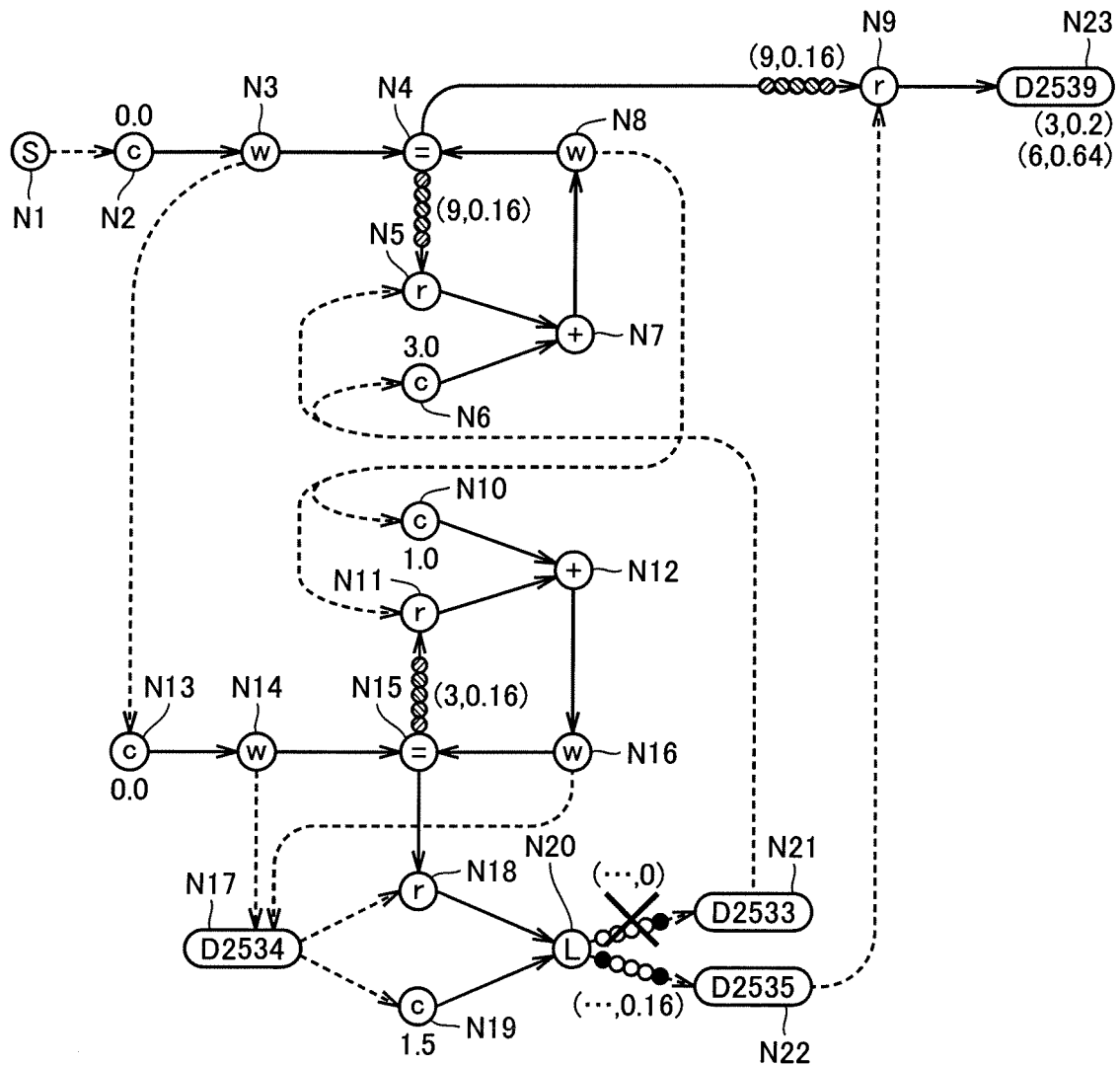
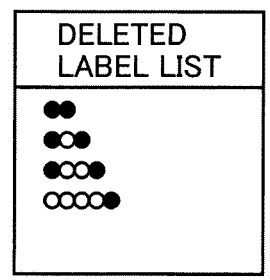

FIG.49
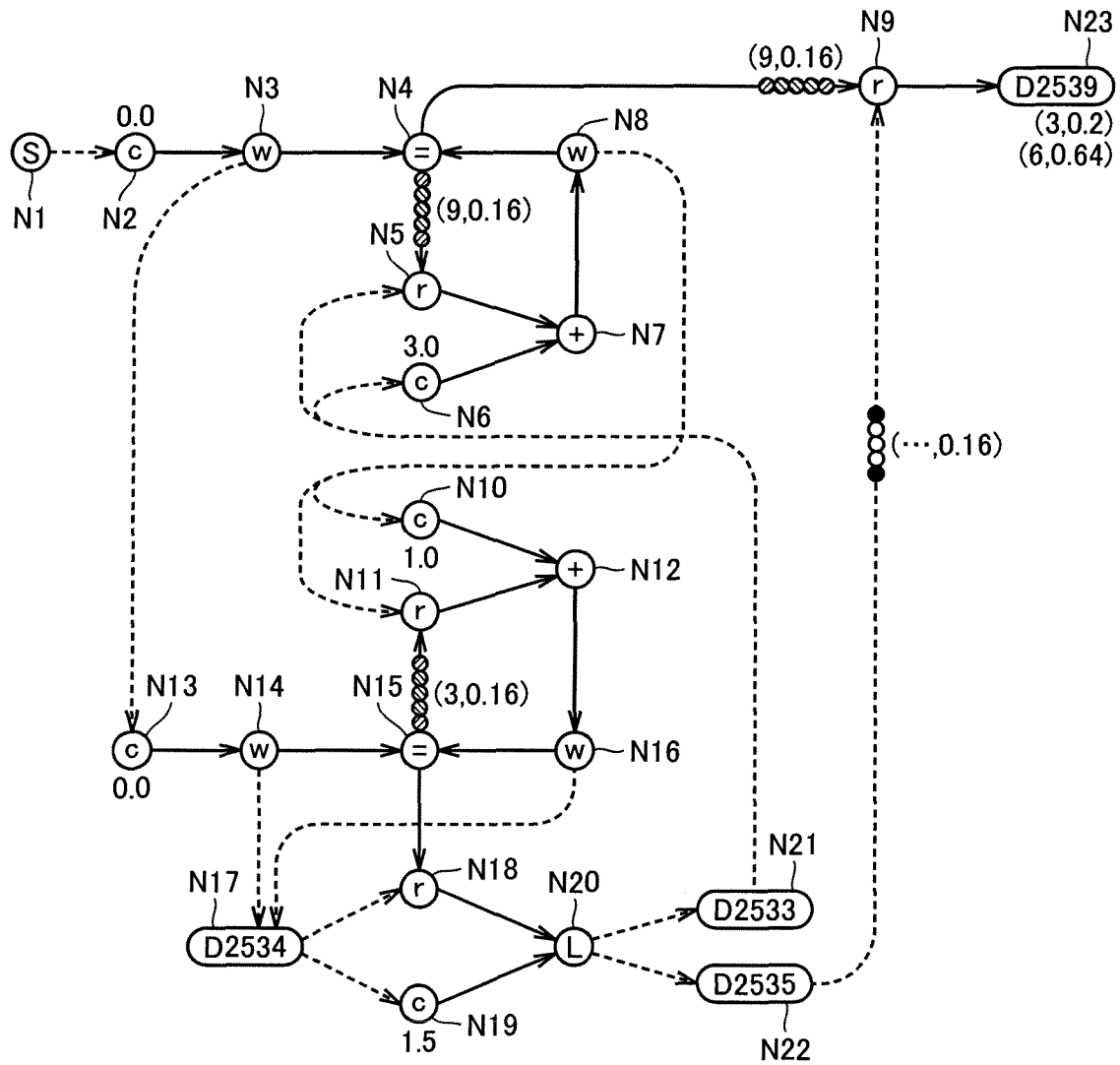
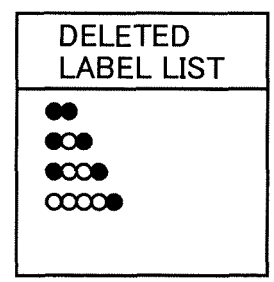

FIG.50
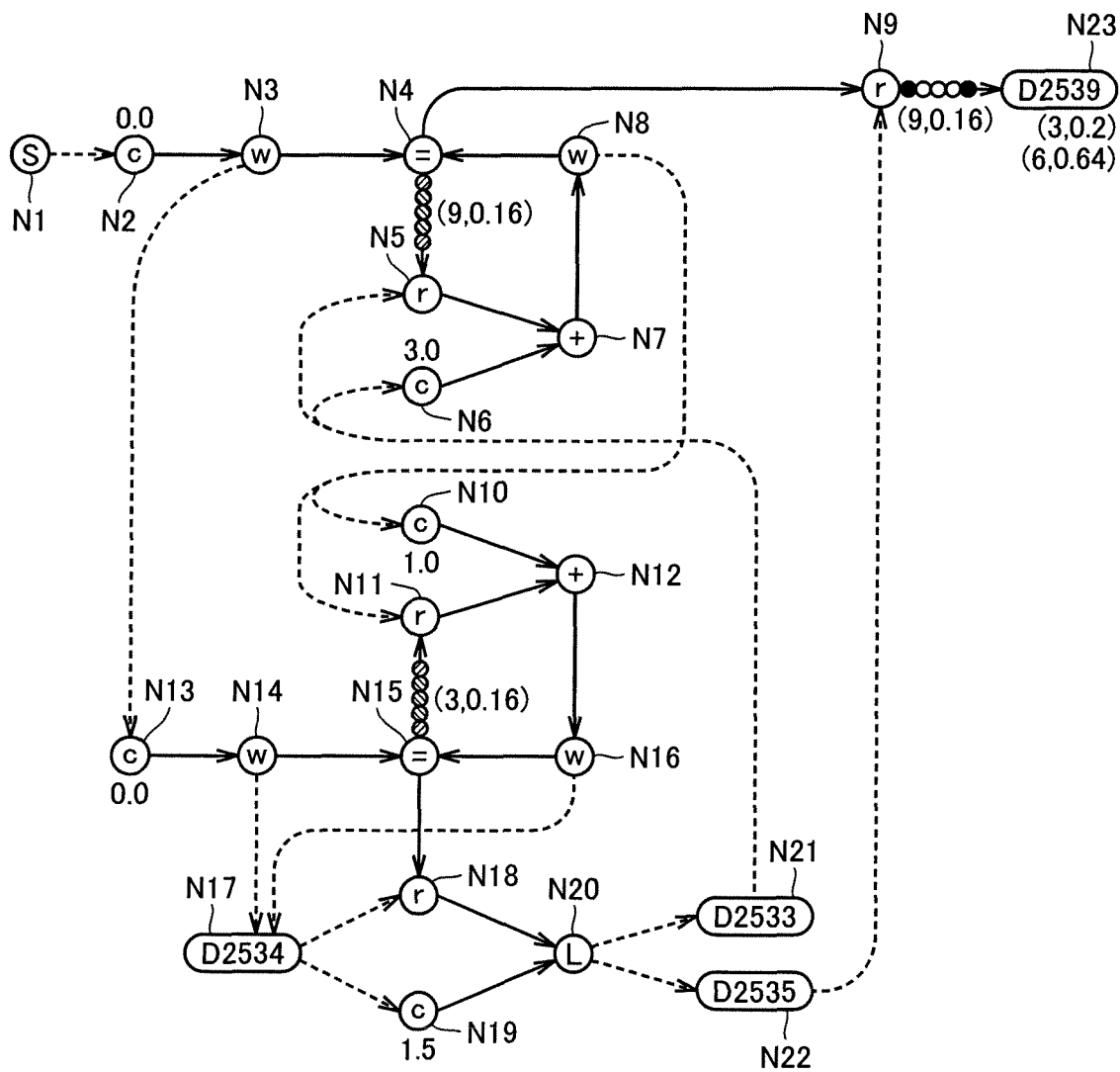
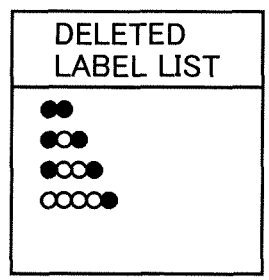

FIG.51
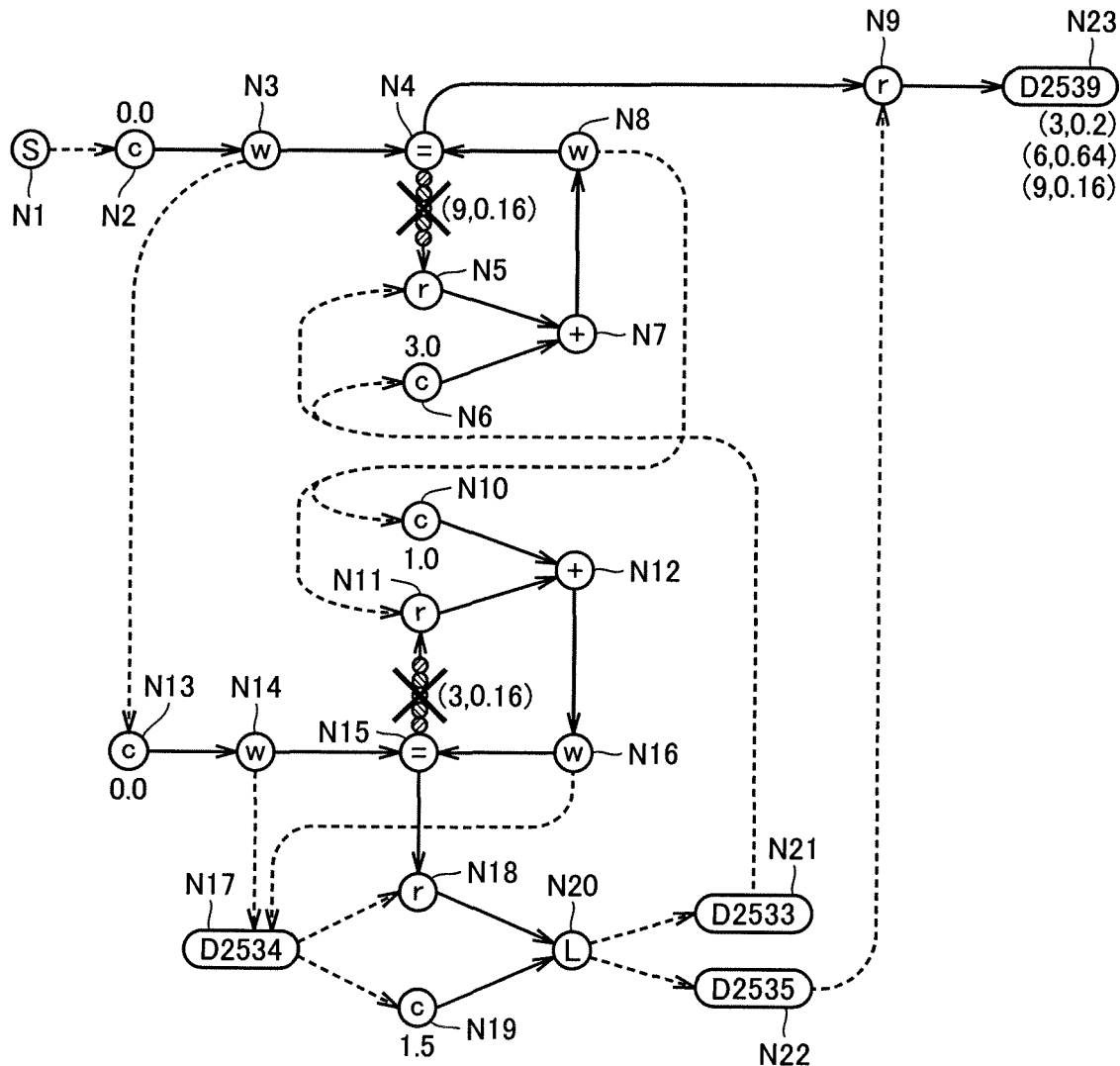
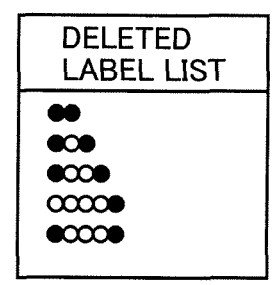

FIG.55
(a)
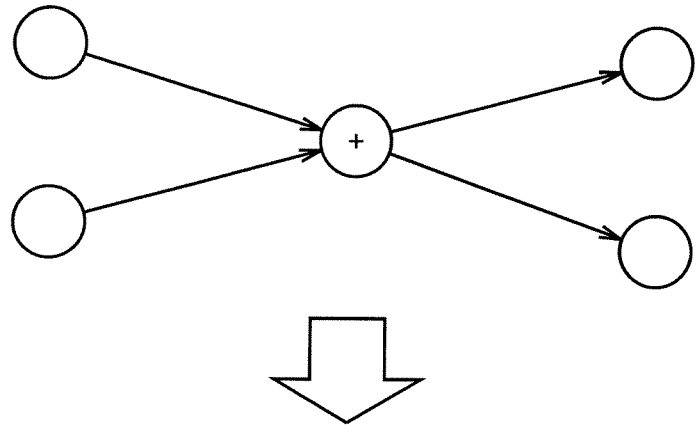
(b)
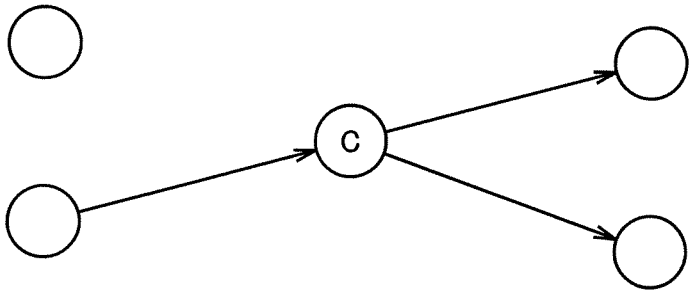

FIG.57
(a)
(b)
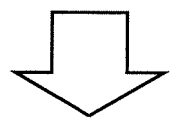
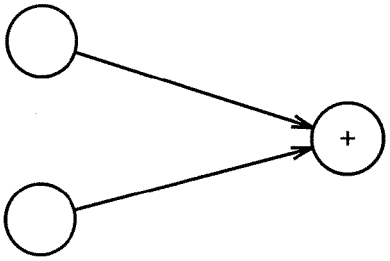
FIG.58
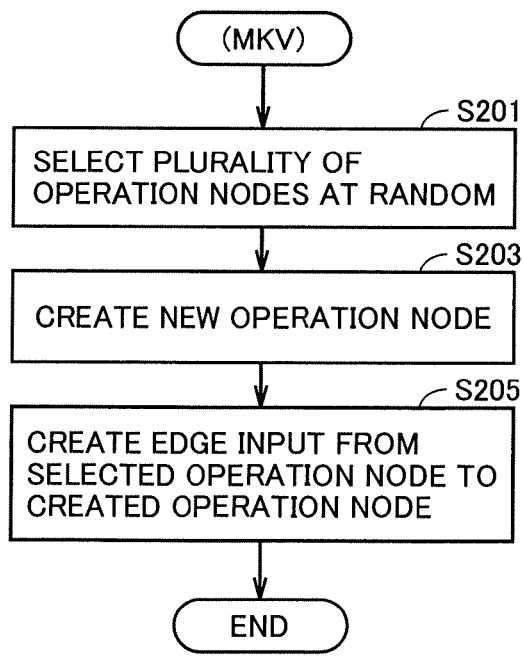

FIG.59
(a)
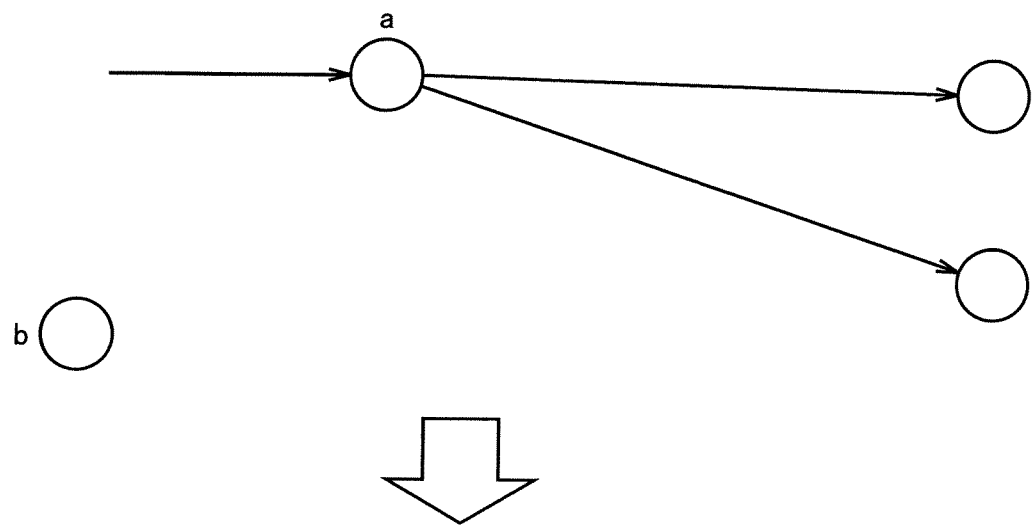
(b)
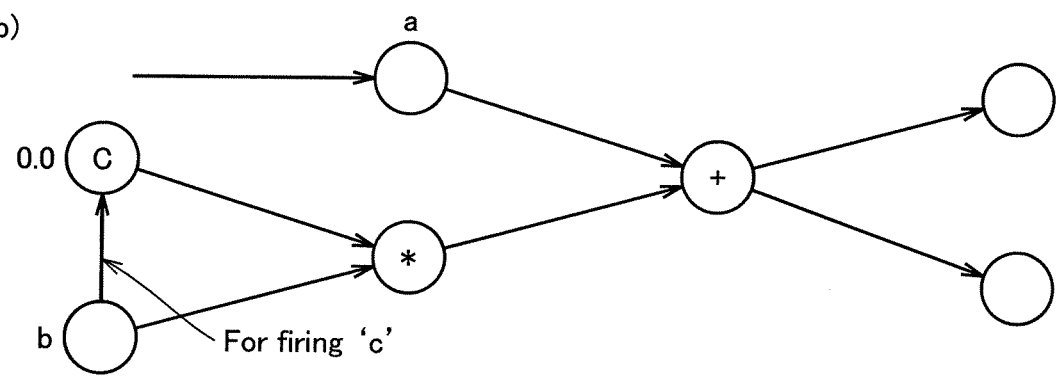
For firing 'c'

FIG.63
(a)
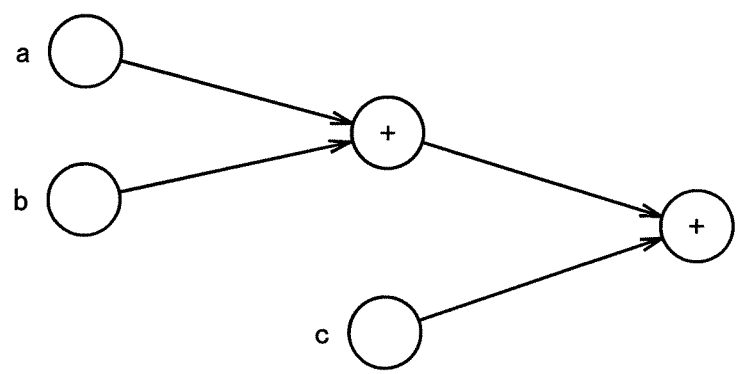
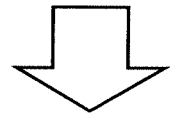
(b)
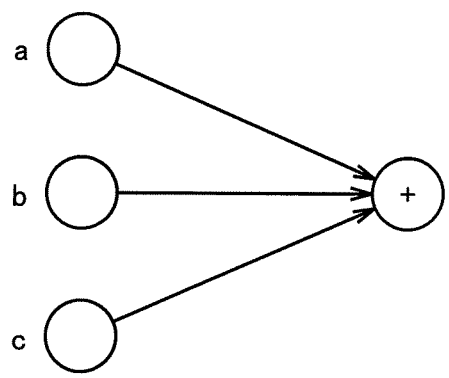

FIG.65
(a)
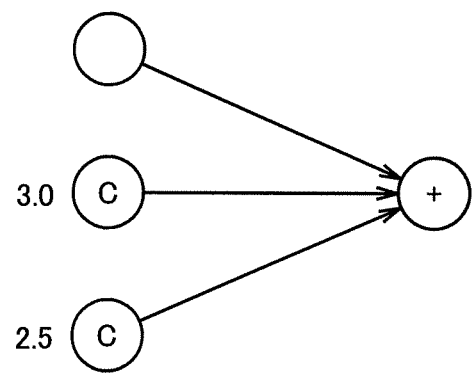
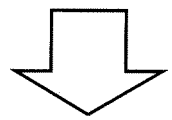
(b)
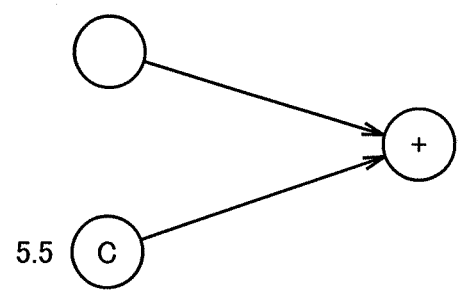

FIG.67
(a)
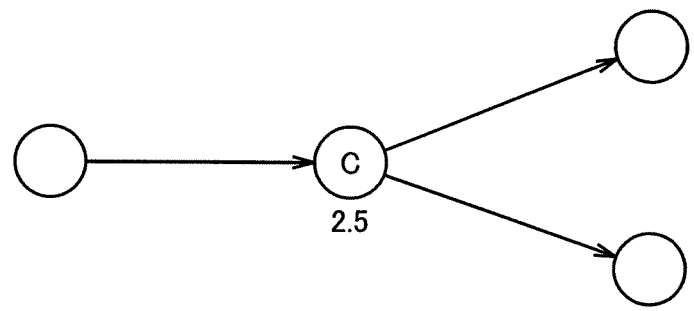
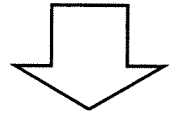
(b)
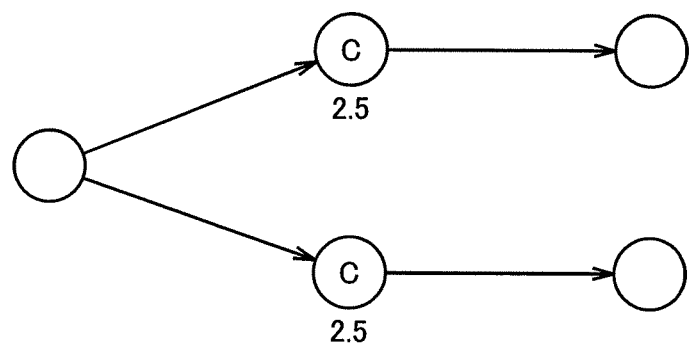

FIG.73

```
1: main (argc, argv)
2: {
3: i = 0;
4: <D1283>:;
5: i = i + 1;
6: if (i <= 9)
7: {
8: goto <D1283>;
9: }
10: else
11: {
12: goto <D1285>;
13: }
14: <D1285>:;
15: }
```

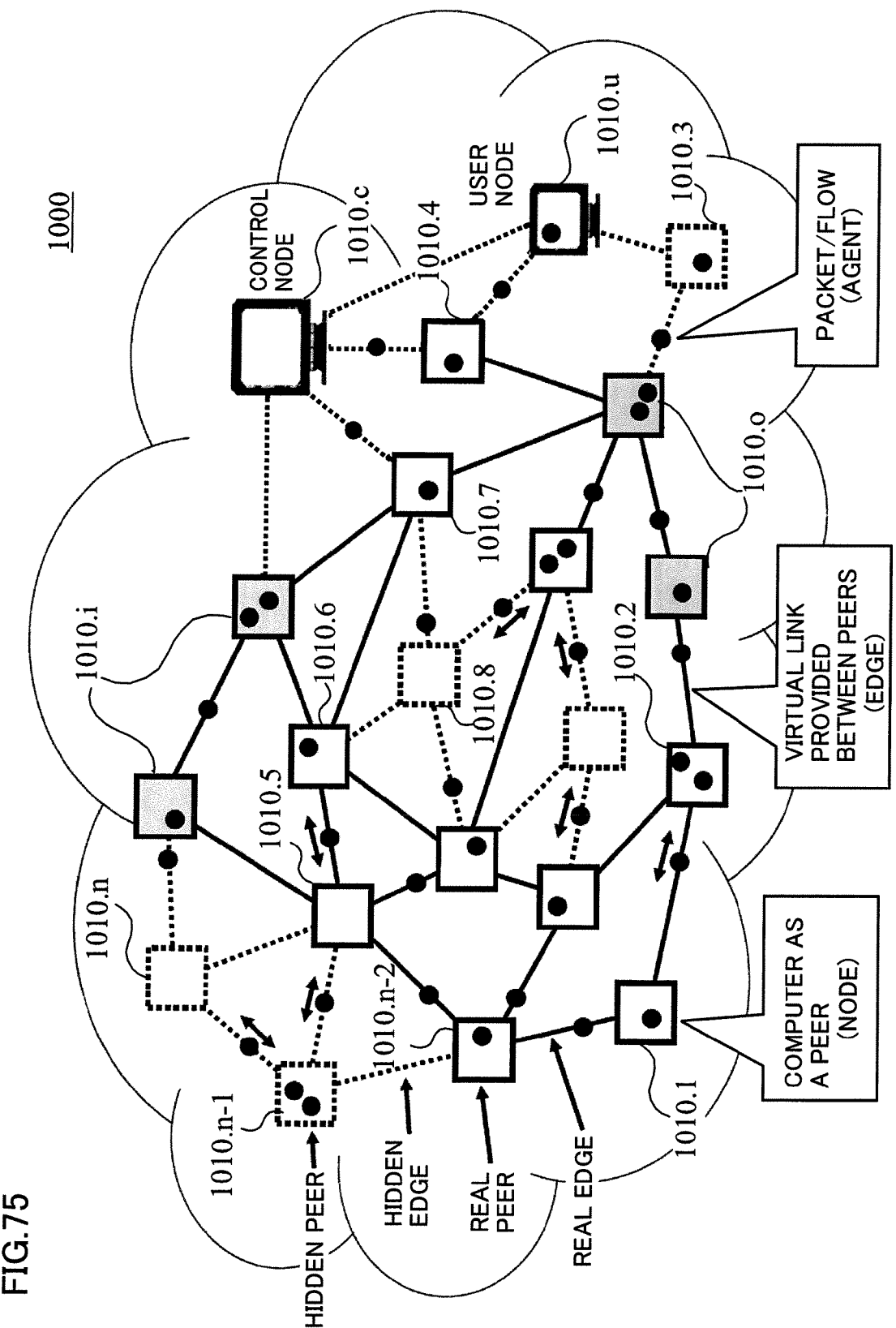

CALCULATION PROCESSING SYSTEM, PROGRAM CREATION METHOD, AND PROGRAM CREATION PROGRAM

RELATED APPLICATIONS

This application is the U.S. National Phase under 35 U.S.C. §371 of International Application No. PCT/JP2009/068271, filed on Oct. 23, 2009, which in turn claims the benefit of Japanese Application No. 2008-274282, filed on Oct. 24, 2008, the disclosures of which Applications are incorporated by reference herein.

TECHNICAL FIELD

The present invention relates to a calculation processing system, a program creation method and a program creation program, for creating a program.

BACKGROUND ART

Most of the computers widely used today are von-Neumann computers. In a von-Neumann computer, programs are stored as data in a storage device, and the programs stored in the storage device are read and executed successively.

Non-von-Neumann computers are also known. Examples of non-von-Neumann computers include a data flow type computer (see, for example, Non-Patent Document 1) and a neuro-computer (see, for example, Non-Patent Document 2).

In a data flow type computer, a program is given in the form of a graph including nodes representing operations, and links between nodes, representing data transfer relations between operations. In the data flow type computer, execution of a process starts when all processes as preconditions of the process are completed. In the data flow type computer, tokens are used for timing adjustment to start various processes.

In a neuro-computer, calculation is done using a neural net, that is, a large number of units coupled to each other. Each unit is a simple operation element modeled after a nerve cell. In the neuro-computer, degree of coupling between units is repeatedly adjusted (referred to as "learning"), in order to minimize error from a desired output (referred to as a "teaching signal"). As a result of repeated learning, the neuro-computer comes to provide correct outputs.

Regarding program creation, genetic programming has been known (see, for example, Non-Patent Document 3). In the genetic programming, a program is represented by nodes representing operations and node topology (such as a tree structure). In the genetic programming, a plurality of such programs in the form of graphs are prepared, and appropriate graphs are screened through cross-over, mutation and selection, whereby an appropriate program is created.

(Peer-to-Peer Technique and Distributed Computing Technique)

Another example of trendy technique is Peer-to-Peer (P2P) technique that enables, for example, distributed computing on the Internet. In Peer-to-Peer system, clients (for example, personal computers) exchange and process data in a distributed manner with each other in an environment not provided with a dedicated server (see, for example, Non-Patent Document 5). Peer-to-Peer technique advantageously allows communication even among a huge number of terminals, as long as there is a margin in line bandwidth.

Here, the distributed computing refers to a method of information processing. In distributed computing, individual portions of a program or a task (job) are executed simultaneously in a parallel manner by a plurality of computers, which communicate with each other through a network. Calculations that require enormous computational resource can be done utilizing a plurality of computers, whereby through-put can be improved than when the calculations is done by a single computer. Peer-to-Peer technique is a possible architecture for the distributed computing as such.

(Network Virtualization)

In a system generally referred to as a communication network or, more specifically, in Peer-to-Peer system described above, a network is physically formed by a plurality of information communication devices (nodes) and communication lines (links) connecting the devices to each other.

Recently, however, a system has come to be practically used in which virtual communication lines between information devices not actually connected directly are regarded as physical communication lines in managing and operating network topology (network configuration). Such virtualization of network is described, for example, in Non-Patent Document 4.

Here, the system in which the system topology is managed and operated regarding the (virtual) communication lines between information devices that are actually not directly connected as physical communication lines is referred to as an overlay system or an overlay network.

PRIOR ART DOCUMENTS

Non-Patent Documents

Non-Patent Document 1: Yoichi MURAOKA, *Heiretsu shori* (Parallel Processing) [Software Course 37], Sho-sho-do, Apr. 10, 1986, p. 105

Non-Patent Document 2: Edited by ATR Advanced Telecommunications Research Institute International, *ATR Advanced Technology Series: Neural Network Oh'yo (Neural Network Applications)*, Ohm-sha, Jul. 20, 1995, pp. 20-21

Non-Patent Document 3: Hitoshi IBA, *Iden-teki Programming (Genetic Programming)*, Tokyo Denki University Press, 1996, pp. 18-30

Non-Patent Document 4: Campbell, A. T., DeMeer, H. G., Kounavis, M. E., Miki, K., Vicente, J. B., Villela, D., "A survey of programmable networks," Computer Communication Review 29(2), pp. 7-23, 1999

Non-Patent Document 5: Androutsellis-Theotokis, S., Spinellis, D., "A survey of Peer-to-Peer content distribution technologies," ACM Computing Surveys 36(4), pp. 335-371, 2004.

SUMMARY OF THE INVENTION

Problems to be Solved by the Invention

A program executed by a conventional von-Neumann computer is created by a user by encoding algorithms of processes to be executed by the computer conceived by the user. Therefore, the program is unchanged unless it is edited by the user.

Therefore, if the user can prepare only a program based on an imperfect algorithm, the von-Neumann computer cannot provide the correct result of operation desired by the user. For instance, if situations and environment vary, the user cannot prepare a perfect algorithm and, therefore, the computer cannot output a correct result of operation. Here, an algorithm that derives a correct result of operation from the input is referred to as a "perfect" algorithm.

A data flow type computer also faces a problem similar to the problem that arises in the von-Neumann computer. Specifically, the data flow type computer cannot output a correct result of operation either, unless the user prepares a perfect program.

On the other hand, in a neuro-computer, calculation process is changed through learning and, therefore, the above-described problem does not arise in the calculation by a neuro-computer. A network forming a neuro-computer, however, typically consists only of operation nodes combining product-sum operations and sigmoid function and the like, and it is generally applied only to a specific type of problems such as pattern recognition. It is not necessarily clear for the user what type of neural network can provide a desired result of operation.

Though the program varies in genetic programming, typically the variation occurs through operations among programs that are prepared in the same number as the samples. Therefore, it is generally the case that variations in programs in genetic programming take place before actual use of the programs. It does not involve a method of changing an algorithm while a program is actually running.

The present invention is made to solve the above-described problem, and its object is to provide a calculation processing system, a program creation method and a program creation program, capable of outputting a result of operation desired by the user.

Means for Solving the Problems

According to an aspect, the present invention provides a calculation processing system, including a calculation executing unit executing a calculation using a network representing an algorithm structure of a program by a plurality of operation nodes and a plurality of edges each connecting the operation nodes; wherein the plurality of operation nodes include operation nodes corresponding to various operations of the program; the system further including a network updating unit for modifying, using a result of calculation by the calculation executing unit and a learning algorithm, the network without changing the result of calculation.

Preferably, the plurality of operation nodes include an operation node performing calculation on a regulating value representing an algorithm flow.

More preferably, the plurality of operation nodes include operation nodes corresponding to four arithmetic operations.

More preferably, the network updating unit performs a process of changing, adding or deleting the operation node, on the network.

Preferably, the plurality of operation nodes include an operation node having a node variable; and the network updating unit calculates an error of the result of calculation from a teaching value, calculates contribution of the node variable to the error, and modifies the node variable based on the contribution.

More preferably, the network updating unit calculates an energy error based on the error, calculates differential coefficient of the energy error with respect to the node variable as the contribution, and updates the variable by subtracting a product of the differential coefficient and a learning coefficient, from the variable.

More preferably, the learning coefficient is a value determined such that the energy error is multiplied $(1-\eta_{1p})$ times (where $\eta_{1p}$ is a real number larger than 0 and smaller than 1), by the update of the variable.

Preferably, the calculation processing system further includes: an input unit receiving an input from outside; and a network creation unit creating the network based on a program received by the input unit.

More preferably, the program received by the input unit is source code described in a high level language; and the network creation unit converts the source code to a language-independent intermediate code, and creates the network based on the intermediate code.

More preferably, the network updating unit changes the operation node, of which output value is kept unchanged for a prescribed number of times continuously, to a constant node outputting a constant value.

More preferably, the network updating unit selects at random two or more of the operation nodes from the plurality of operation nodes, and creates a new operation node to be connected to the selected operation nodes.

More preferably, the network updating unit selects at random a first operation node and a second operation node from the plurality of operation nodes, and creates a bridge from the second operation node to the first operation node.

More preferably, the network updating unit selects at random an operation node from the plurality of operation nodes, and creates a branch of the selected node.

More preferably, the network updating unit rewrites a plurality of constant nodes each outputting a constant value, to one constant node in accordance with coupling rule.

More preferably, the network updating unit divides an operation node having the node variable modified successively for a prescribed number of times or more.

According to another aspect, the present invention provides a method of creating a program using a calculation processing system, including the step of the calculation processing system executing a calculation using a network representing an algorithm structure of a program by a plurality of operation nodes and a plurality of edges each connecting the operation nodes; wherein the plurality of operation nodes include operation nodes corresponding to various operations of the program; the method further including the step of the calculation processing system modifying the network, using the result of calculation and a learning algorithm.

According to a still further aspect, the present invention provides a program creation program causing a calculation processing system to create a program, including the step of causing the calculation processing system to execute a calculation using a network representing an algorithm structure of a program by a plurality of operation nodes and a plurality of edges each connecting the operation nodes; wherein the plurality of operation nodes include operation nodes corresponding to various operations of the program; the program further including the step of causing the calculation processing system to modify the network, using the result of calculation and a learning algorithm.

Effects of the Invention

By the present invention, a network corresponding to a program is modified using a learning algorithm. As a result, a program desired by the user can be created.

By the present invention, even if a user can create only a program of imperfect algorithm, the program created by the user can be revised to create a more perfect program.

BRIEF DESCRIPTION OF THE DRAWINGS

FIG. 5 shows intermediate code of GIMPLE corresponding to the source code shown in FIG. 4.

FIG. 7 illustrates operation node firing timing.

FIG. 8 shows an example of node operation definitions 135.

FIG. 9 shows network information 134.

FIG. 10 shows learning variables 136.

FIG. 11 shows a first operation process of forward propagation using the network of FIG. 6.

FIG. 13 shows a third operation process of forward propagation using the network of FIG. 6.

FIG. 14 shows a fourth operation process of forward propagation using the network of FIG. 6.

FIG. 17 shows a seventh operation process of forward propagation using the network of FIG. 6.

FIG. 18 shows an eighth operation process of forward propagation using the network of FIG. 6.

FIG. 19 shows a ninth operation process of forward propagation using the network of FIG. 6.

FIG. 20 shows a tenth operation process of forward propagation using the network of FIG. 6.

FIG. 21 shows an eleventh operation process of forward propagation using the network of FIG. 6.

FIG. 23 shows a thirteenth operation process of forward propagation using the network of FIG. 6.

FIG. 24 shows a fourteenth operation process of forward propagation using the network of FIG. 6.

FIG. 25 shows a fifteenth operation process of forward propagation using the network of FIG. 6.

FIG. 27 shows a seventeenth operation process of forward propagation using the network of FIG. 6.

FIG. 28 shows an eighteenth operation process of forward propagation using the network of FIG. 6.

FIG. 29 shows a nineteenth operation process of forward propagation using the network of FIG. 6.

FIG. 30 shows a twentieth operation process of forward propagation using the network of FIG. 6.

FIG. 31 shows a twenty-first operation process of forward propagation using the network of FIG. 6.

FIG. 32 shows a twenty-second operation process of forward propagation using the network of FIG. 6.

FIG. 35 shows a twenty-fifth operation process of forward propagation using the network of FIG. 6.

FIG. 37 shows a twenty-seventh operation process of forward propagation using the network of FIG. 6.

FIG. 38 shows a twenty-eighth operation process of forward propagation using the network of FIG. 6.

FIG. 39 shows a twenty-ninth operation process of forward propagation using the network of FIG. 6.

FIG. 40 shows a thirtieth operation process of forward propagation using the network of FIG. 6.

FIG. 41 shows a thirty-first operation process of forward propagation using the network of FIG. 6.

FIG. 42 shows a thirty-second operation process of forward propagation using the network of FIG. 6.

FIG. 45 shows a thirty-fifth operation process of forward propagation using the network of FIG. 6.

FIG. 46 shows a thirty-sixth operation process of forward propagation using the network of FIG. 6.

FIG. 47 shows a thirty-seventh operation process of forward propagation using the network of FIG. 6.

FIG. 48 shows a thirty-eighth operation process of forward propagation using the network of FIG. 6.

FIG. 49 shows a thirty-ninth operation process of forward propagation using the network of FIG. 6.

FIG. 50 shows a fortieth operation process of forward propagation using the network of FIG. 6.

FIG. 51 shows a forty-first operation process of forward propagation using the network of FIG. 6.

FIG. 55 illustrates Constantification.

FIG. 57 illustrates Making Variable.

FIG. 58 is a flowchart representing a flow of a process performed by topology learning unit 228b for Making Variable.

FIG. 59 illustrates Bridge.

FIG. 63 illustrates Merge Tuple.

FIG. 65 illustrates Merge Node.

FIG. 67 illustrates Division.

FIG. 73 shows an example of GIMPLE code.

FIG. 75 is a conceptual illustration of calculation processing system 1000 using Peer-to-Peer technique.

MODES FOR CARRYING OUT THE INVENTION

Figure 1:
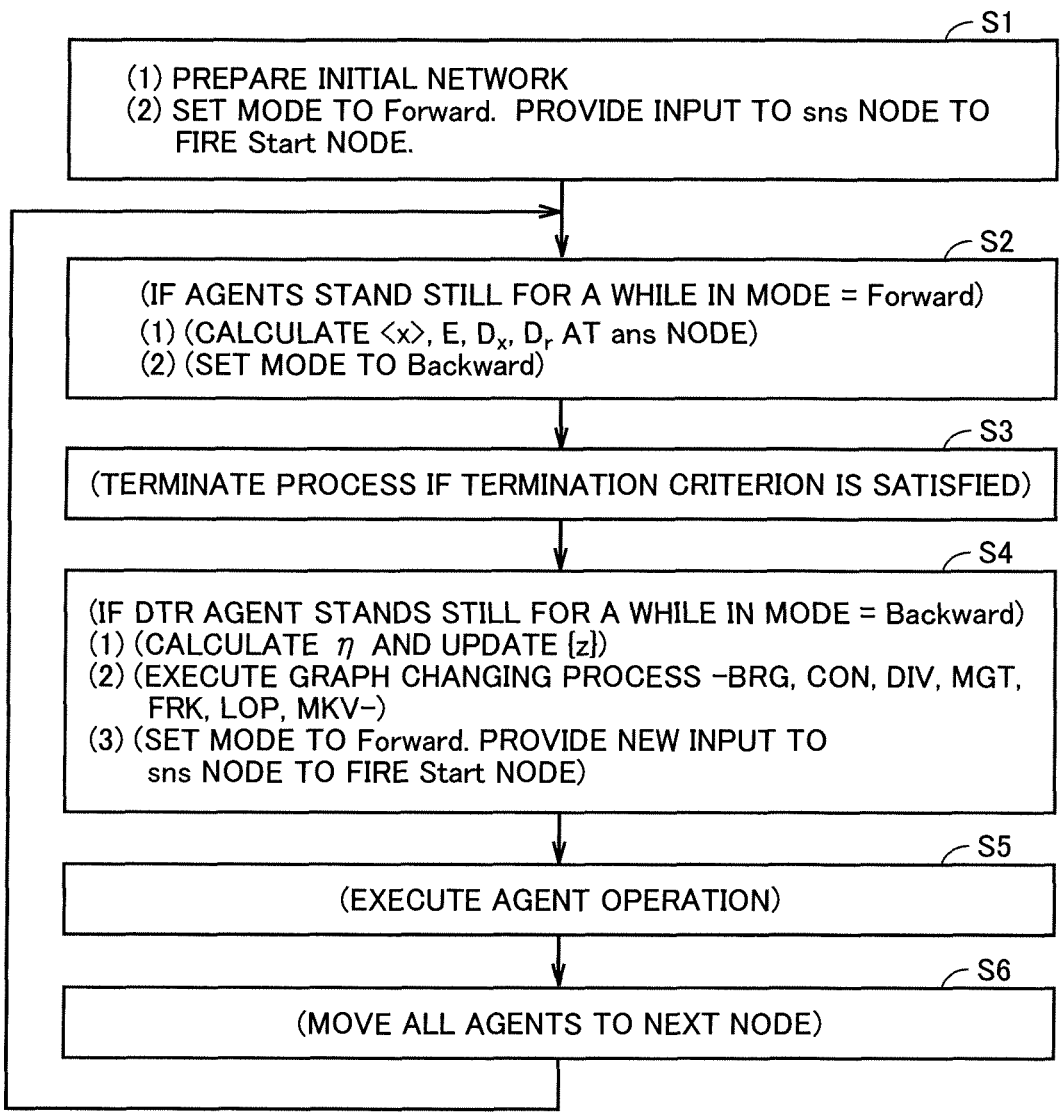
FIG. 1 schematically shows a flow of a process performed by a calculation processing apparatus 100.

In the following, embodiments of the present invention will be described with reference to the figures. In the following description, the same components are denoted by the same reference characters. Their names and functions are also the same. Therefore, detailed description thereof will not be repeated.

Embodiment 1

1. Outline

A calculation processing apparatus 100 in accordance with the present embodiment modifies an externally applied program (hereinafter also referred to as an initial program) and thereby creates a program that provides more appropriate result of operation. Briefly stated, the calculation processing apparatus performs the following three processes:

(1) conversion of a program to a network;
(2) execution of calculation using the network; and
(3) modification of the network.

In the following, outline of each of the processes will be described.

[(1) Conversion of a Program to a Network]

Calculation processing apparatus 100 creates a network type program, based on the given initial program. Specifically, calculation processing apparatus 100 creates a network that represents an algorithm structure of the initial program.

In the present embodiment, calculation processing apparatus 100 converts the initial program to a network in ATN (Algorithmically Transitive Network) format. The network in the ATN format represents an algorithm structure by a plurality of operation nodes each representing an operation process, and a plurality of edges each connecting any two of the plurality of operation nodes. Each edge has a direction representing the order of operations.

[(2) Execution of Calculation Using the Network]

Calculation processing apparatus 100 executes a calculation, using the created network. Specifically, calculation processing apparatus 100 executes operations of the operation nodes on an input value, in accordance with the order indicated by the edges.

In the present embodiment, calculation processing apparatus 100 executes an operation of each operation node on a shuttle agent (hereinafter simply referred to as an agent) having information necessary for the operation. The operation node receives an input or inputs of one or a plurality of agents, operates the agent or agents input from an edge based on a prescribed rule, and outputs the operated agent or agents to an edge. The agent output from an operation node is input to an operation node as a destination of the edge. Details of the agents and details of the rules for processing the agents will be described later.

[(3) Modification of the Network]

Calculation processing apparatus 100 modifies the network based on the result of calculation using the network, using a learning algorithm. Specifically, calculation processing apparatus 100 modifies the network such that the result of calculation by the network comes closer to a value desired by the user. More specifically, calculation processing apparatus 100 performs back propagation learning of changing the constant value of an operation node, and topology learning of changing network topology. Details of the back propagation learning and topology learning will be described later.

By repeating (2) execution of calculation using the network and (3) modification of the network, calculation processing apparatus 100 can create a network (and hence, a program) that can output a value desired by the user.

The overall process flow executed by calculation processing apparatus 100 will be described with reference to FIG. 1. FIG. 1 schematically shows the flow of a process performed by calculation processing apparatus 100.

At step S1, calculation processing apparatus 100 prepares an initial network by converting an input program ((1)). Next, calculation processing apparatus 100 sets mode to a Forward mode. In Forward mode, calculation processing apparatus 100 executes a calculation or calculations by the network, while it does not execute a process for changing the network. Then, calculation processing apparatus 100 provides an input to a Start node at the start point of an operation, so as to cause Start node to execute a calculation (fires Start node) ((2)).

If the agents stand still for a while in Forward mode, that is, if operations on all agents are finished, calculation processing apparatus 100 performs the process of step S2. Otherwise, calculation processing apparatus 100 proceeds to the process of step S4 and onwards. Calculation processing apparatus 100 determines whether or not the agents stand still for a while, using a counter.

At step S2, calculation processing apparatus 100 calculates, at ans node, the result of operation <x>, an energy error E determined based on a difference between the correct result (teaching value) and the result of operation, and differential coefficients Dx and Dr of energy error E ((1)). Details of these values will be described later.

Next, calculation processing apparatus 100 sets mode to Backward mode ((2)). In Backward mode, calculation processing apparatus 100 executes back propagation learning.

At step S3, if the result of operation satisfies a termination criterion, calculation processing apparatus 100 terminates the process. In the present embodiment, if the energy error E is equal to or smaller than a prescribed value, calculation processing apparatus 100 terminates the process. If the result of operation does not satisfy the termination criterion, calculation processing apparatus 100 continues processing.

If the agents stand still for a while in Backward mode, that is, if operations on all agents are finished in the back propagation learning, calculation processing apparatus 100 performs the process of step S4. Otherwise, calculation processing apparatus 100 proceeds to the process of step S5 and onwards. Calculation processing apparatus 100 determines whether or not the agents stand still for a while, using a counter.

At step S3, calculation processing apparatus 100 first calculates, at a network updating unit 228, a learning coefficient $\eta$ and, based on the learning coefficient $\eta$, updates a node variable $\{z\}$ ((1)). Details of the process will be described later. Next, calculation processing apparatus 100 executes topology learning ((2)).

Specifically, it executes creation or deletion of operation nodes and edges based on prescribed rules such as CON, MKV, BRG, FRK, MGT, MGN and DIV.

At step S5, calculation processing apparatus 100 executes an agent operation by an operation node. Further, at step S6, calculation processing apparatus 100 moves all agents to the next operation nodes. One process of steps S5 and S6 corresponds to one time step of operations.

By repeating the process of steps S5 and S6, operations by the network proceeds if the mode is Forward mode, and back propagation learning proceeds if the mode is Backward mode. When the process is repeated for a certain number of times, the process of step S2 or S3 is executed.

While calculation processing apparatus 100 repeats the processes of calculation and learning as described above, the program changes to output data desired by the user, in accordance with the principles of the steepest descent method of learning or the self-organized learning. Specifically, the user can get a program environment in which an algorithm of the program encoded by the user is automatically revised.

2. Hardware Configuration

Figure 2:
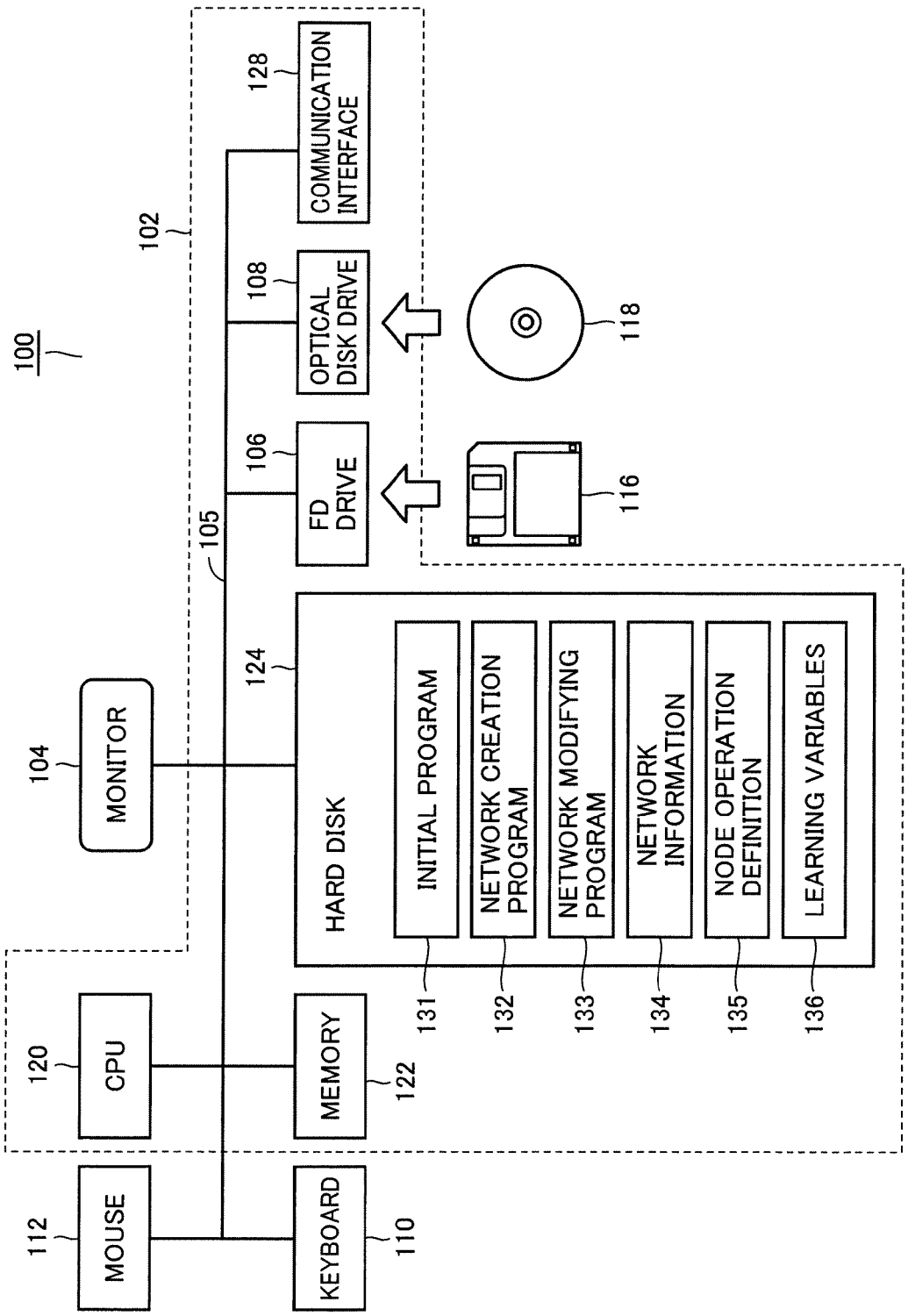
FIG. 2 shows, in the form of a block diagram, hardware configuration of the calculation processing apparatus in accordance with an embodiment.

Hardware configuration of calculation processing apparatus 100 in accordance with the present embodiment will be described with reference to FIG. 2. FIG. 2 shows, in the form of a block diagram, the configuration of calculation processing apparatus 100 in accordance with the present embodiment.

Calculation processing apparatus 100 includes a computer main body 102, a monitor 104 as a display device, and a keyboard 110 and a mouse 112 as input devices. Monitor 104, keyboard 110 and mouse 112 are connected to computer main body 102 through a bus 105.

Computer main body 102 includes a flexible disk (hereinafter referred to as "FD") drive 106, an optical disk drive 108, a CPU (Central Processing Unit) 120, a memory 122, a direct access memory, such as a hard disk 124, and a communication interfaced 128. These components are connected to each other through bus 105.

FD drive 106 reads information from and writes information to FD 116. Optical disk drive 108 reads information on an optical disk such as a CD-ROM (Compact disc Read-Only Memory) 118. Communication interface 128 exchanges data to/from the outside.

Other than CD-ROM 118, any medium that can record information such as a program to be installed to the computer main body, such as a DVD-ROM (Digital Versatile Disk) or a memory card, may be used, and in such a case, a driver capable of reading such medium is provided on computer main body 102. A magnetic tape device on which a cassette type magnetic tape is detachably attached and accessed may be connected to bus 105.

Memory 122 includes an ROM (Read Only Memory) and an RAM (Random Access Memory).

Hard disk 124 stores an initial program 131, a network creation program 132, a network modifying program 133, network information 134, a node operation definition 135, and learning variables 136.

Initial program 131 is a program serving as a base for creating a program. Hard disk 124 may store a program created by the user as initial program 131. Initial program 131 may be supplied on a storage medium such as FD 116 or CD-ROM 118, or may be supplied from another computer through communication interface 128.

Network creation program 132 creates a network corresponding to initial program 131, based on initial program 131. Further, network creation program 132 stores network information 134 related to the created network in hard disk 124.

Network modifying program 133 modifies the program created by network creation program 132. Specifically, if the energy error between the result of execution of an operation based on network information 134 and the desired value is equal to or larger than a prescribed threshold value, network modifying program 133 creates a new network by modifying network information 134.

Network information 134 includes information related to the network created by network creation program 132 and information created by network modifying program 133 at the time of operation by the network or at the time when the network is modified.

Node operation definition 135 represents operation rules of the operation nodes included in the network. Node operation definition 135 includes information for identifying an operation node (operation code), the number of edges input to an operation node (input number) and the like. Details of node operation definition 135 will be described later.

Learning variables 136 represent information necessary for modifying the network. Learning variables 136 include, for example, a teaching value desired by the user as a result of calculation, and energy error E calculated based on a difference between the teaching value and the result of operation by the network. Details of the learning variables 136 will be described later.

Node operation definition 135 and learning variables 136 used here may be those created by the user using an input device. It is noted, however, that these may be supplied by means of a storage medium such as FD 116 or CD-ROM 118, or may be supplied from another computer through communication interface 128.

Further, network creation program 132 and network modifying program 133 may be supplied by means of a storage medium such as FD 116 or CD-ROM 118, or may be supplied from another computer through communication interface 128.

CPU 120 functioning as an operation processor executes processes corresponding to respective programs described above, using memory 122 as a working memory.

As described above, network creation program 132 and network modifying program 133 are software executed by CPU 120. Generally, such software is distributed stored in a storage medium such as CD-ROM 118 or FD 116, read from the storage medium by optical disk drive 108 or FD drive 106, and once stored in hard disk 124. Alternatively, if calculation processing apparatus 100 is connected to the network, it is once copied from a server on the network to hard disk 124. Thereafter, it is further read from hard disk 124 to the RAM in memory 122, and executed by CPU 120. In network-connected environment, the software may not be stored in hard disk 124 but may be directly loaded to the RAM and executed.

The hardware itself and its principle of operation of the computer shown in FIG. 2 are common. Therefore, the essential part to realize the function of the present invention is the software stored in a storage medium such as FD 116, CD-ROM 118 and hard disk 124.

3. Functional Configuration

Figures 3, 4:
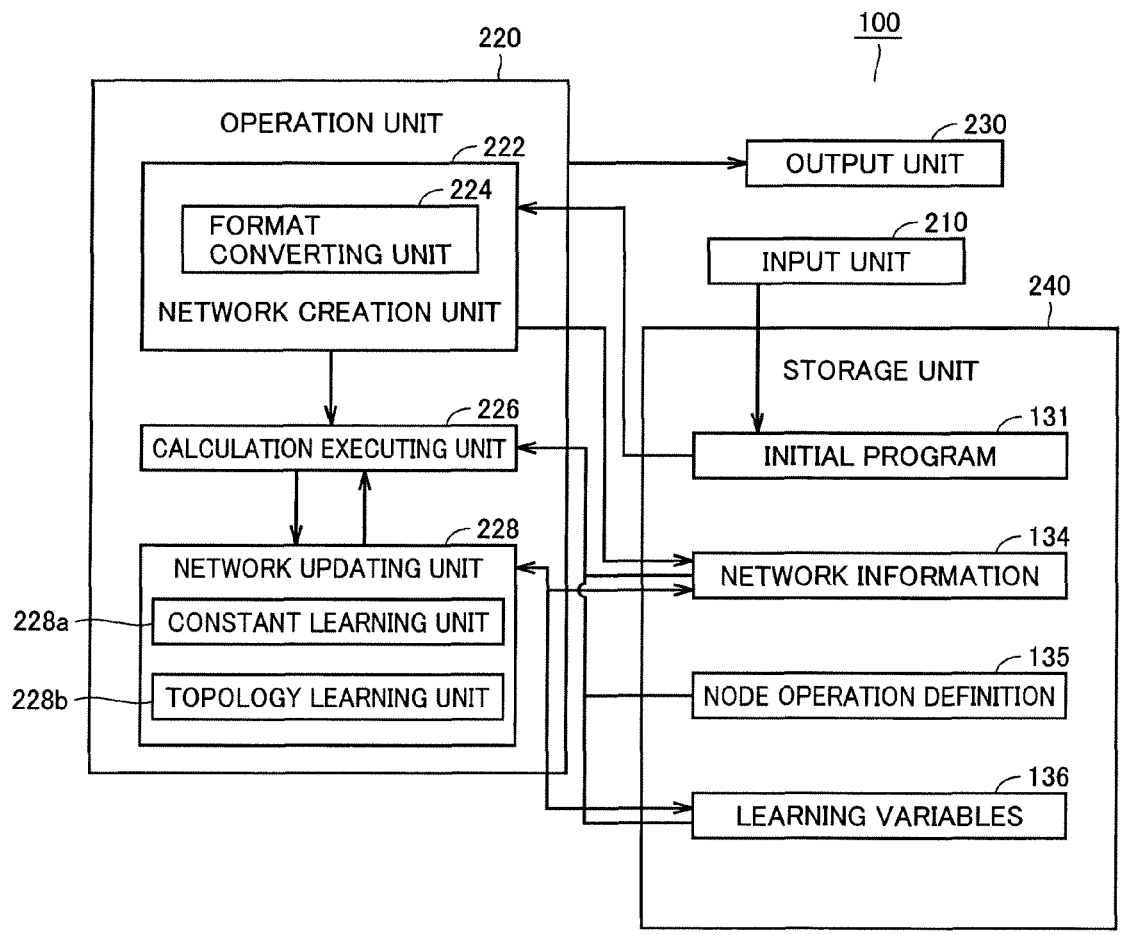
FIG. 3 shows, in the form of a block diagram, functional configuration of the calculation processing apparatus in accordance with the embodiment.
FIG. 4 shows an example of an initial program.

Referring to FIG. 3, functional configuration of calculation processing apparatus 100 in accordance with the present embodiment will be described. FIG. 3 shows, in the form of a block diagram, the functional configuration of calculation processing apparatus 100 in accordance with the present embodiment.

Calculation processing apparatus 100 includes an input unit 210 receiving data from outside, an operation unit 220, an output unit 230 outputting a result of operation of operation unit 220 to the outside, and a storage unit 240.

Operation unit 220 executes an operation on data stored in storage unit 240. Operation unit 220 includes a network creation unit 222, a calculation executing unit 226, and a network updating unit 228.

Network creation unit 222 creates network information 134 based on initial program 131 stored in storage unit 240. Network creation unit 222 includes a format converting unit 224. Format converting unit 224 converts initial program 131 to an intermediate format that is independent of program description language.

Calculation executing unit 226 executes a calculation using the network, based on network information 134 and node operation definition 135. Details of the process performed by calculation executing unit 226 will be described later.

Network updating unit 228 modifies network information 134 using a learning algorithm. More specifically, network updating unit 228 includes a constant learning unit 228a and a topology learning unit 228b. Constant learning unit 228a modifies a constant value of an operation node included in the network, based on an error contained in learning variables 136. Topology learning unit 228b executes network updating process including creation and deletion of an operation node, and creation and deletion of an edge, as needed. Details of the process performed by network updating unit 228 will be described later.

4. Network

The network created by network creation unit 222 will be described with reference to a specific example. Description will be given assuming that initial program 131 is source code described in C language. FIG. 4 shows an example of initial program 131. It is noted that initial program 131 may be source code written in a program language other than C language. Initial program 131 may be written in high level language such as C, C++, Fortran, Ada, Objective-C, Java (registered trademark), Pascal, or COBOL.

When a network is to be created, format converting unit 224 included in network creation unit 222 converts the source code to intermediate code of GIMPLE format, and converts the intermediate code to a network. The intermediate code in GIMPLE format (hereinafter simply referred to as GIMPLE) describes the source code by internal expression of GCC (GNU Complier Collection). FIG. 5 shows the intermediate code in GIMPLE format corresponding to the source code shown in FIG. 4.

Source code depends on the language in which the source code is written. In contrast, GIMPLE is independent of high level language, and independent of architecture. Therefore, it is possible for network creation unit 222 to convert the source codes described in various languages to networks, using a unique algorithm.

GIMPLE is an intermediate result of compiling process by a high level language compiler. Specifically, GIMPLE represents code before creation of object code in machine language. Format converting unit 224 is capable of creating GIMPLE in accordance with one of various known methods of creating GIMPLE. By way of example, format converting unit 224 may create GIMPLE using gcc's-fdump-tree-gimple option of GCC 4.1 or later.

Next, network creation unit 222 creates a network type program corresponding to GIMPLE. In the present embodiment, network creation unit 222 forms a network in ATN format. Rules for creating a network of the ATN format from intermediate code of GIMPLE format will be described later. In the following, a network in the ATN format may simply be referred to as an ATN.

It is noted, however, that the method of creating an ATN is not limited to the above. By way of example, network creation unit 222 may create an ATN by executing a program specialized for an initial program of a specific type, for creating an ATN from the initial program without using any intermediate format. Alternatively, network creation unit 222 may create an ATN based on object code written in a computer-understandable form. Alternatively, the user may manually create an ATN.

Figure 6:
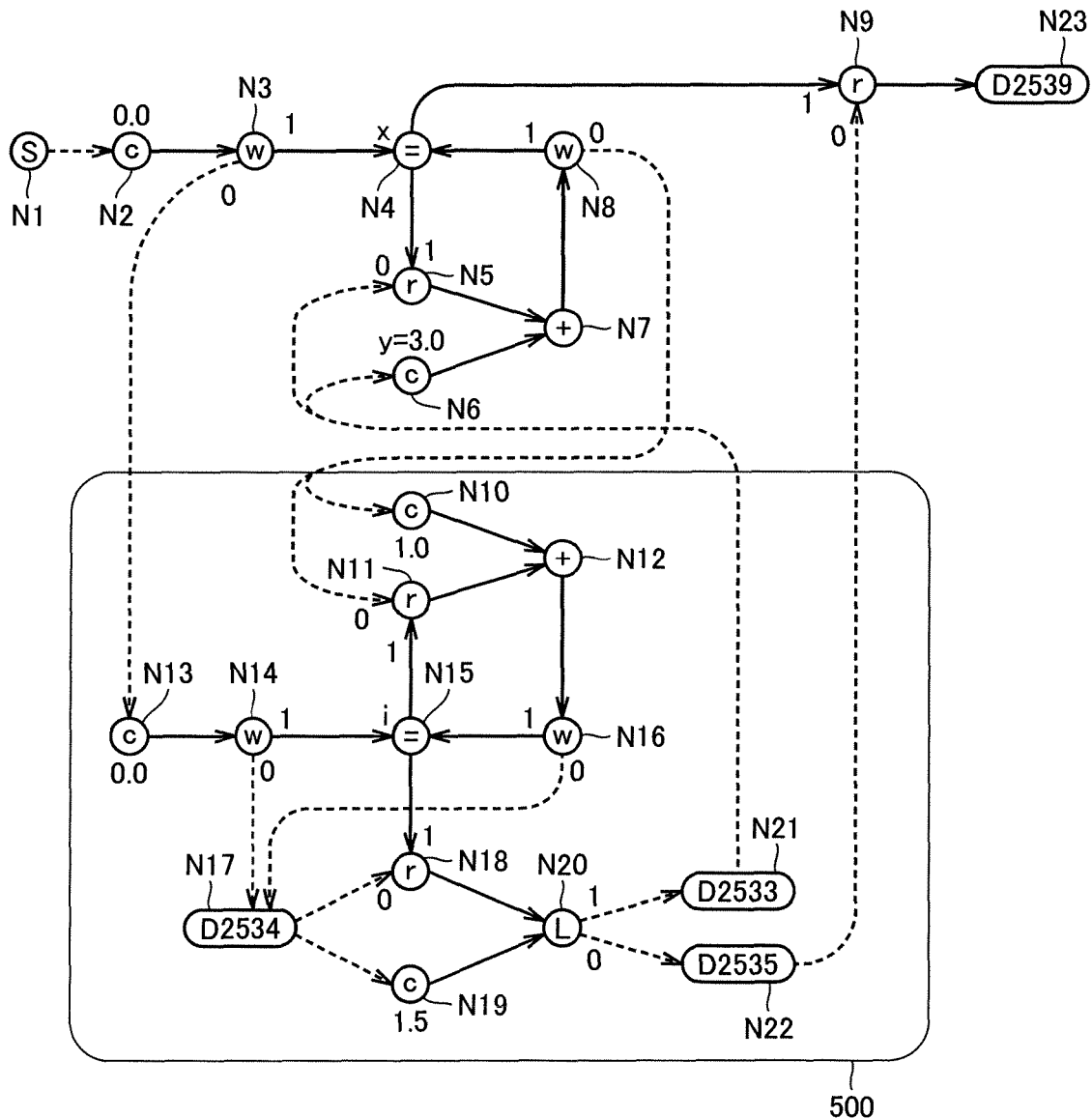
FIG. 6 shows an example of ATN created based on the source code.

FIG. 6 shows an example of an ATN created by network creation unit 222 based on the source code in accordance with the procedure described above. In FIG. 6, an operation node is represented by a figure enclosing a character (S, c, w or the like) or a symbol (=, + or the like). The character or symbol in the figure represents the type of operation of the node. An edge is represented by a solid arrow or a dotted arrow. The solid arrow represents a flow of an agent including an arithmetic value. A dotted arrow represents a flow of an agent including only a regulating value. In FIG. 6, a portion surrounded by a frame 500 represents a loop operation process.

The arithmetic value is an actual object of calculation, and it represents the result of operation or operations by the operation nodes through which the shuttle agent has passed so far. The arithmetic value assumes an arbitrary real value. The arithmetic value changes in accordance with the operation rule determined for the operation node. Consider, for example, an operation of y=x+1. The arithmetic value before this operation is x, and the arithmetic value after this operation is x+1.

The regulating value represents probability of agent existence. In the present embodiment, it is assumed that the regulating value assumes a value from 0 to 1. The lower the judging value resulting from conditional branching made during calculation, the smaller becomes the regulating value of the agent existing at the branch. Calculation executing unit 226 deletes a branch having a regulating value smaller than a prescribed threshold value, so that the calculation can be finished within limited time with limited memory resource.

5. Operation Node and Agent

In the following, the operation nodes included in the network and the agents as the object of operation by the operation nodes will be described.

An operation node represents an individual local calculation process or data resulting from the calculation process. An edge connecting the operation nodes represents register transfer. An agent represents data as the object of calculation or data used for calculation. An agent is created every time a calculation is executed by an operation node, and the operation node provides the created agent with the result of calculation.

Calculation using agents is realized by propagation from an input node to an output node. Calculation by agents is done in accordance with the following two principles.

[Principle 1]

A value set (x, r) is propagated from edge-associated agent to agent.

[Principle 2]

Binary label vector held by an agent is inherited from a parent agent to a child agent.

Here, the value set means a set of arithmetic value and regulating value. Each agent has a value set. An operation node performs an operation in accordance with the type of the operation node, on the value set of the agent input to the operation node. Then, the operation node outputs an agent having a value set that have been subjected to the operation. The agent input to the operation node is referred to as a "parent" agent, and the agent output from the operation node is referred to as a "child" agent.

The binary label vector represents what conditional branches have been taken by an agent. The binary label vector includes information related to the number of branching points through which the agent has passed, and information related to which of True and False branches is taken by the agent at each branching point. In the following, the binary label vector may also be simply referred to as a label.

The label can be represented by Boolean function. Specifically, the label may be represented by a product of Boolean variables, having Boolean variables representing results of judging at each branch arranged corresponding to the order the agent passed respective branches. For instance, consider an agent of which judging at the first branch is False and the judging at the second branch is True. The label of this agent can be represented as A=ba'. Here, the single quotation mark (') represents negation of the Boolean variable on the left of the single quotation mark. Each alphabet in lower case (a, b, . . . ) or its negation represents the result of judging at each branch. A lower case character without negation symbol represents that the result of judging is True. A lower case character with negation symbol represents that the result of judging is False. A Boolean variable corresponding to a newer branch is placed to the left of the label.

An operation node that does not involve a conditional branch puts the same label as that of the parent agent on the child agent. An operation node that involves a conditional branch puts a new label, obtained by multiplying the label of the parent agent by the new Boolean variable, on the child agent.

The timing at which an operation node executes an operation on a parent agent and outputs a child agent (in the following, referred to as "operation node is fired") will be described with reference to FIG. 7. FIG. 7 illustrates the timing of operation node firing. The timing of operation node firing differs depending on whether one agent or a plurality of agents are input to the operation node.

An operation node that receives one input fires in accordance with Rule 1 below.

[Rule 1] (One-input operation) The operation node fires by itself.

The rule will be described with reference to FIG. 7(A). FIG. 7(A) illustrates an operation performed by a 1-input, 2-output operation node 304 on an agent.

One-input operation node 304 fires by itself, when it receives a parent agent 402 output from an operation node 302. Specifically, when parent agent 402 is received, operation node 304 outputs child agents 404 and 406. Operation node 304 determines the value set (X, R) of child agents 404 and 406 based on the value set $(x_0, r_0)$ of parent agent 402.

The binary label vector of parent agent 402 is inherited by child agents 404 and 406. In the figures referred to in the following, including FIG. 7, the binary label vector will be represented by the number and color of circles representing agents. In FIG. 7(A), the binary label vectors of parent agent 402 and child agents 404 and 406 are common, and the vectors are represented by one black circle.

Though 2-output operation node 304 has been described above, Rule 1 holds regardless of the number of outputs.

On the other hand, an operation node having multiple inputs fires in accordance with Rule 2 below.

[Rule 2] (Multiple input operation) An operation node fires if labels A and B of two agents input to the operation node satisfy AB≠0.

If only one agent is input to an operation node, the operation node does not fire.

The following rule holds as regards the inheritance of a label.

[Rule 3] A Boolean product AB of labels A and B of input agents is inherited by a child agent.

The following rule holds as regards the labels after firing of input agents.

[Rule 4] After firing of an operation node, labels A and B of the input agents are changed to AB' and A'B, respectively.

[Rule 5] An agent having label=0 is unfirable. Specifically, even if an agent of label=0 is input to an operation node, the operation node does not fire.

These rules will be described with reference to specific examples. First, for convenience of description, an example in which agents having the same label are input to an operation node will be described with reference to FIG. 7(B). FIG. 7(B) illustrates an operation performed by a 2-input, 2-output operation node 314 on agents having the same label.

Operation node 314 receives agents 408 and 410 from operation nodes 310 and 312, respectively. Labels A and B of agents 408 and 410 are both Boolean variable a (in the figure, represented by a single black circle). Therefore, label AB=a·a=a≠0. Therefore, operation node 314 fires, in accordance with Rule 2. Operation node 314 provides child agents with label AB=a·a=a, in accordance with Rule 3. Operation node 314 outputs agents 412 and 414 having label a, to operation nodes 316 and 318, respectively. As can be seen from the calculation above, generally, an operation node that received agents having the same label provides the child agent or agents with the same label as the input agents.

Further, the label of input agents will be a·a'=0 after the end of operation. Therefore, in accordance with Rule 5, the input agents become unfirable after the end of operation. Generally, when agents having the same label are input to an operation node, the input agents become unfirable after the operation is done by the operation node.

Next, an example in which agents having labels different from each other are input to an operation node will be described with reference to FIG. 7(C). FIG. 7(C) illustrates an operation of a 2-input, 1-output operation node 319 on agents having mutually different labels.

To operation node 319, an agent having a label A=ba' (in the figure, represented by [black, white] from the output side to the input side), and an agent having a label B=cba' (in the figure, represented by [black, white, white] from the output side to the input side) are input. In the figure, negation is represented by an overbar.

In the following figures, the labels will be represented in accordance with the rules similar to those used for representing these agents. Specifically, a Boolean variable without negation is represented by a white circle, and a Boolean variable with negation is represented by a black circle. The label is represented by a series of circles arranged in order from the output side to the input side, starting from the one corresponding to the newest branch.

Labels A and B satisfy AB'=ba'·cba'=cba'≠0. Therefore, in accordance with Rules 2 and 3, operation node 319 fires, and provides a child agent with label AB=ba'·cba'=cba' ([black, white, white]). Specifically, when agents having labels of mutually different length are input, the operation node provides the output node with the longer label.

In accordance with Rule 4, after the operation, label B will be $$A'B=(ba')'\cdot cba'=(b'+a)cba'=0.$$

Therefore, according to Rule 5, the agent that had label B becomes unfirable. Namely, the agent that had the longer label becomes unfirable.

In accordance with Rule 4, after the operation, label A will be $$AB'=ba'\cdot(cba')'=ba'(c'+b'+a)=c'ba'.$$

This agent is firable. Specifically, the agent that had the shorter label remains as a firable agent. The remained agent enters the wait state. Specifically, the remaining agent is not subjected to any operation until a new agent comes to the operation node. In the figure, the label of an agent in the wait state is represented by hatching. A circle with upper-left to lower-right hatching corresponds to a wait state of affirmative Boolean variable (white circle). A circle with upper-right to lower-left hatching corresponds to a wait state of a negative Boolean variable (black circle).

Further, the label (here, AB') of the agent left as a firable agent will be referred to as a "complementary label." The name comes from the fact that the label of the agent left as a firable agent forms a pair with the label of the child agent.

When agents having labels of which length differ by two or more are subjected to an operation, Boolean variable "1" must be introduced to represent the complementary label by a Boolean variable. Boolean variable "1" represents that the result of corresponding branch may be True or False (Don't care).

Consider, for example, that a first agent having a label A=ba' and a second agent having a label B=dcba' are input to an operation node. Here, AB'⊇dcba' is not 0 and, therefore, the operation node fires and outputs AB.

The label of second agent will be A'B=0 and, therefore, the second agent becomes unfirable. On the other hand, the complementary label will be $$AB'=(ba')\cdot(dcba')'=(ba')\cdot(d'+c'+b'+a)=d'1ba'+1c'ba'.$$

Because of Rules 2 to 5 described above, it becomes possible to execute appropriate operations even in a network with branches. By the label attached to each agent, it is possible to manage which and which agents should be subjected to an operation.

Operations performed by various operation nodes will be described with reference to FIG. 8. FIG. 8 shows an example of node operation definition 135. Referring to FIG. 8, node operation definition 135 includes operation name of an operation node, a one-character code uniquely determined corresponding to the operation node, an input number representing the number of agents to be input to the operation node, an arithmetic/regulating parameter, an output arithmetic value X, and an output regulating value R.

The arithmetic/regulating parameter assumes the value "A (initial letter of Arithmetic)" if the operation node performs an operation on an arithmetic value. The arithmetic/regulating parameter assumes the value "R (initial letter of Regulating)" if the operation node performs an operation on a regulating value. The arithmetic/regulating parameter assumes the value "A/R" if the operation node performs an operation both on the arithmetic value and regulating value.

The output arithmetic value X represents the arithmetic value of agent output from the operation node. In the table of FIG. 8, $x_0$, $x_1$ and $x_1$ represent arithmetic values of the agents input to the operation node. For an operation node that outputs two different arithmetic values, the two output operation values are represented by $X_0$ and $X_1$, respectively.

The output regulating value R represents a regulating value of an agent output from the operation node. In the table of FIG. 8, $r_0$ and $r_1$ represent regulating values of the agents input to the operation node. For an operation node that outputs two different regulating values, the two output operation values are represented by $R_0$ and $R_1$, respectively.

In the following, each of the operation nodes will be specifically described.

Start node is represented by the letter S. Start node is placed at a starting point of an operation. The number of inputs to Start node is 0. The agent output from Start node does not have any arithmetic value. Since there is no branch at the start point of a calculation, Start node provides the agent output therefrom with the largest available regulating value of R=1.

Arithmetic const. (arithmetic constant) node is represented by the letter c. The number of inputs to Arithmetic const. node is 1. Arithmetic const. node performs an operation on arithmetic values. Arithmetic const. node provides the agent to be output therefrom with a constant v, as an arithmetic value, regardless of the arithmetic value of the input agent. Here, v represents one of node variables set for each operation node. In FIG. 6, values (1.0 or 3.0) close to the encircled c represents v of Arithmetic const. node. Further, Arithmetic const. node does not perform any operation on the regulating value. Specifically, Arithmetic const. node provides the agent to be output therefrom with the regulating value $r_0$ of the input agent, as the regulating value.

Arithmetic const. node outputs a value set $(X, R)=(v, r_0)$ after operation, to one or a plurality of operation nodes. Except for special operation nodes, the operation node is generally capable of outputting, to one or a plurality of operation nodes, a value set after operation.

Regulating const. (regulating constant) node is represented by the letter C. The number of inputs to Regulating const. node is 1. The number of outputs from Regulating const. is 2. Regulating const. node performs an operation on a regulating value. Regulating const. node provides the agents to be output therefrom with 0, as the arithmetic value, regardless of the arithmetic value of the input agent. Regulating const. node provides the two agents to be output therefrom with two regulating values $R_0$=s and $R_1$=1−s, respectively. Here, s is one of the node variables, and s assumes a value from 0 to 1. The number of outputs from Regulating const. node is limited to two.

Equal node is represented by the character =. The number of inputs to Equal node is 1. Equal node provides the agent to be output therefrom with the same value set as that of the input agent. Equal node outputs the value set to one or a plurality of agents. In other words, Equal node is capable of passing the result of operation of a certain operation node to other one or plurality of operation nodes. In FIG. 6, for simplicity of the graph, a plurality of Equal nodes are collectively represented by one =surrounded by a circle. Further, in FIG. 6, D** (such as D2535) surrounded by a frame also represents Equal node. D are plotted for convenience to represent correspondence to GIMPLE. In the actually created network, the operation node represented by D** is not different from Equal node.

Negative node is represented by the letter n. The number of inputs to Negative node is 1. Negative node provides an agent to be output therefrom with an arithmetic value of the input agent with the sign inverted.

Inverse node is represented by the letter i. The number of inputs to Inverse node is 1. Inverse node provides an agent to be output therefrom with an inverse number of the arithmetic value of the input agent.

Subtraction node is represented by a character −. The number of inputs to Subtraction node is 2. Subtraction node provides an agent output therefrom with a difference between the arithmetic values of the input two agents. Further, Subtraction node provides the agent to be output therefrom with a smaller one of the regulating values of the two input agents. The reason is that the probability of existence of the edge coming out from Subtraction node does not exceed this value. It becomes easier to track branching as Subtraction node outputs as small a regulating value as possible.

Division node is represented by a character /. The number of inputs to Division node is 2. Division node provides an agent to be output therefrom with a quotient of the arithmetic values of the input two agents. Further, as in the case of Subtraction node, Division node provides the agent to be output therefrom with a smaller one of the regulating values of the two input agents.

Less than node (or judging node) is represented by the letter L. The number of inputs to Less than node is 2. Less than node performs an operation on the regulating value. Less than node provides an agent to be output therefrom with 0 as the arithmetic value, regardless of the arithmetic values of the input agents. Less than node provides the agent to be output therefrom with the following two different types of regulating values:

$$R0 = sig(\kappa \beta_r(x_0 - x_1)) \cdot Min(r_o, r_1) \text{ and}$$

$$R1 = sig(\kappa \beta_r(x_1 - x_0)) \cdot Min(r_o, r_1)$$

where sig represents a sigmoid function, defined as $sig(z) = 1/\{1 + exp(-z)\}$, $\kappa$ is a constant, and $\beta_r$ is a node variable. Specifically, the agents output from Less than node are classified to two types depending on the value of regulating value. There may be one or a plurality of agents of each type. Write node is represented by the letter w. The number of inputs to Write node is 1. Write node performs an operation on an arithmetic value and a regulating value. Write node output two edges. Write node does not output any arithmetic value on an agent on one edge (in FIG. 6, an edge with "0" written nearby) and outputs only the regulating value $R_0 = r_0$. Write node outputs $X_1 = x_1$ and $R_1 = r_0$ on an agent on the other edge (in FIG. 6, an edge with "1" written nearby).

Read node is represented by the letter r. The number of inputs to Read node is 2. Read node performs an operation on a regulating value. Read node outputs, regardless of the arithmetic value of an agent on one input edge (in FIG. 6, an edge with "0" written nearby), the arithmetic value $x_1$ of the agent on the other input edge (in FIG. 6, an edge with "1" written nearby). Further, Read node outputs smaller one of the input two regulating values.

By the use of Less than node, Write node and Read node as well as the regulating values, it becomes possible in the network to represent conditional branches such as an if statement.

Addition node is represented by the character +. The number of inputs to Addition node is two or more (in FIG. 8, represented by 2+). Addition node provides the sum of all arithmetic values of the input agents. Further, Addition node outputs the smallest of the regulating values of the input agents.

Multiplication node is represented by the character *. The number of inputs to Multiplication node is two or more (in FIG. 8, represented by 2+). Multiplication node provides the product of all arithmetic values of the input agents. Further, Multiplication node outputs the smallest of the regulating values of the input agents.

As described above, the operation nodes includes operation nodes corresponding to various types of operations in the program, for example, four arithmetic operations. The operation nodes are not limited to the operation nodes corresponding to the calculations other than sigmoid calculation or product-sum operations used in the conventional neural networks. As described above, in the present embodiment, the network is represented by various operation nodes. Therefore, the network has general versatility and is capable of representing various programs.

6. Data Set

Following the description of network, agents and operation nodes, network information 134 and learning variables 136 stored in storage unit 240 will be described in detail.

First, network information 134 will be described with reference to FIG. 9. FIG. 9 shows network information 134. Referring to FIG. 9, network information 134 includes node information 134a, edge information 134b, agent information 134c and deleted label list 134d.

Node information 134a is defined for each of the operation nodes included in the network. The node information includes an operation code, node variables, differential coefficients of energy error E between the result of operation by the network and the teaching value with respect to node variables, value sets produced by the firing at the node, a node-to-edge pointer, output information, and an edge index.

The operation code represents the type of the operation node. As the operation code, the operation name or the one-character code may be used. The differential coefficients of error E with respect to node variables are used in the constant learning of the network, as will be described later.

The node-to-edge pointer represents an edge connected to the node. Output information is a binary variable indicating whether or not the edge connected to the node is an outgoing edge of the operation node. If the output information assumes the value of True, the edge goes out from the operation node. If the output information assumes the value of False, the node comes into the operation node. The edge index is a value of 0 or 1, defined for an edge output from the operation node that outputs two types of values such as the judging node. The index represents the type of output value held by the agent on the edge.

Edge information 134b represents how each edge connects the operation nodes. Edge information 134b includes a pointer to an operation node connected to an origin of the edge (origin node), and a pointer to an operation node connected to an end point of the edge (end node).

Agent information 134c is produced during execution of operations using the network, on various pieces of information held by the agent. Agent information 134c includes the value set, binary label vector, differential coefficients of energy error E with respect to the value set, partial differential of the child agent's value set with respect to this agent's value set, partial differential of the child agent's value set with respect to the output node's variables, pointers to parent/child agents, and a pointer to the edge where the agent exists.

Each of the differential coefficients and each of the partial differential coefficients are used in the constant learning of the network, as will be described later. The pointers to parent/child agents represent a family tree among the agents, that is, the branching structure of operations. The pointers to parent/child agents become necessary in the back propagation learning, as will be described later.

Next, learning variables 136 will be described with reference to FIG. 10. FIG. 10 shows learning variables 136. Learning variables 136 are given at the time of network update, regardless of the network structure. Learning variables 136 include a learning coefficient, a learning ratio by one-pass, a teaching value, energy error E, and coefficients in E. Details of these variables will be described in relation to the network updating process later.

7. Forward Propagation

In the following, calculation using the ATN will be described in detail. Calculation using the ATN is realized by the operation nodes performing operations on the agents in accordance with an order indicated by arrows. Because of such characteristic, the calculation using ATN will be hereinafter also referred to as Forward Propagation.

Calculation executing unit 226 executes Forward Propagation in accordance with Rules below. Rules 1 to 5 have already been described.

[Rule 1] (One-input operation) The agent fires by itself

[Rule 2] (Multiple input operation) An operation node fires if labels A and B of two agents input to the operation node satisfy AB≠0.

[Rule 3] A Boolean product AB of labels A and B of input agents is inherited by a child agent.

[Rule 4] After firing of an operation node, labels A and B of the input agents are changed to AB' and A'B, respectively.

[Rule 5] An agent having label=0 is unfirable. Specifically, even if an agent of label=0 is input to an operation node, the operation node does not fire.

[Rule 6] An agent having a regulating value close to 0 becomes unfirable, and its label is stored in the deleted label list. Here, it is assumed that an agent satisfying $r < r_{th} = 0.01$ becomes unfirable. It is noted that the value $r_{th}$ is not limited to this.

[Rule 7] Judging node L adds a new Boolean variable to a child agent.

[Rule 8] The label of an agent that reached an ans node, to which the final result of operation is input, is stored in the deleted label list.

[Rule 9] All labels in the network are multiplied by a negation of the label newly registered with the deleted label list.

[Rule 10] The label of an agent created at judging node L is multiplied by a new Boolean variable.

In the following, Forward Propagation will be described in detail with reference to FIGS. 11 to 51. FIGS. 11 to 51 show the process of Forward Propagation operations using the network of FIG. 6. Though identifiers (0, 1) of the input or output of judging node, write node and read node are not shown in FIGS. 11 to 51, these are the same as those shown in FIG. 6.

Referring to FIG. 11, at the start of Forward Propagation, calculation executing unit 226 causes node N1 to output an agent having a value set ( . . . , 1). In the following, an agent having a value set (x, r) will be denoted as agent (x, r). Here, x= . . . represents absence of an arithmetic value.

Figure 12:
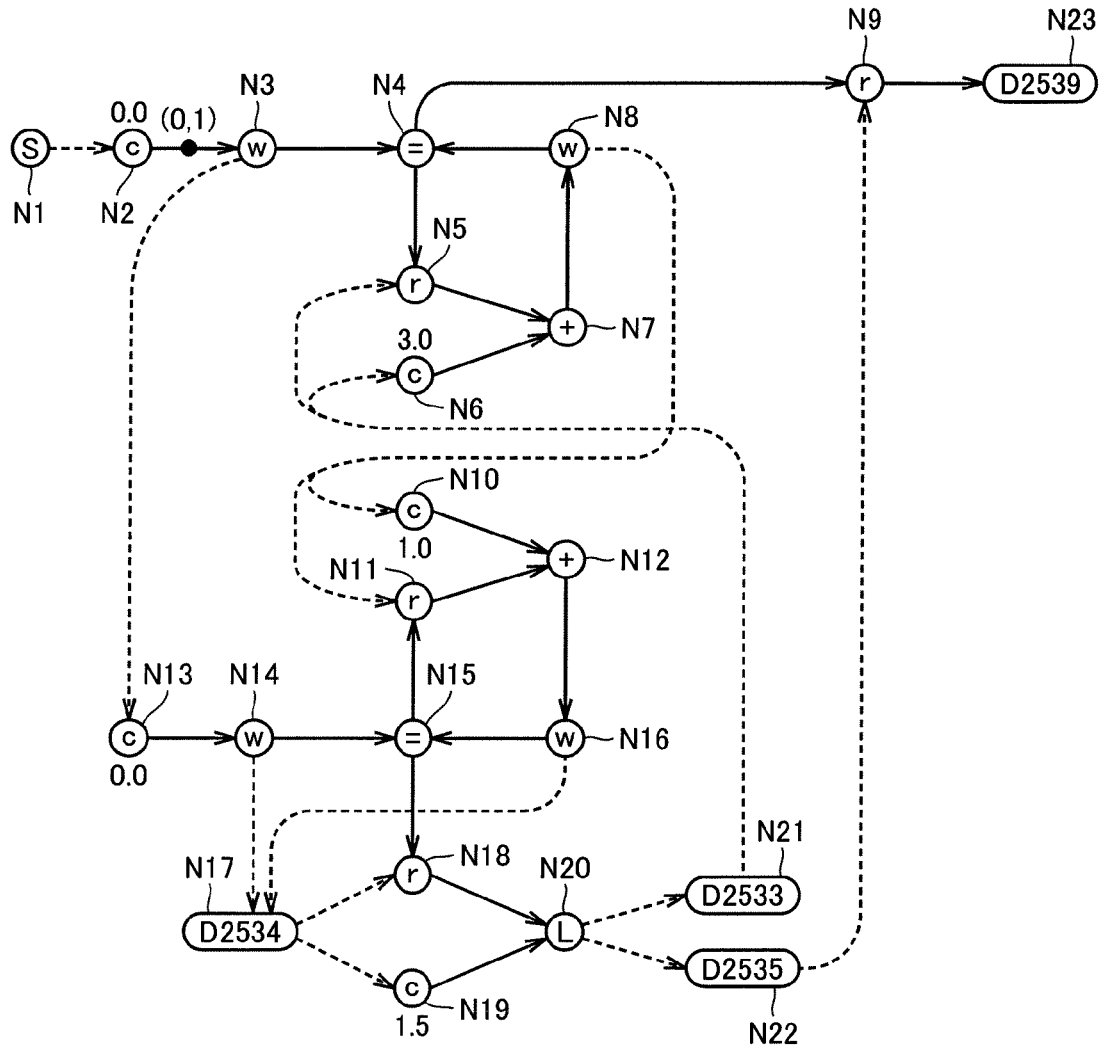
FIG. 12 shows a second operation process of forward propagation using the network of FIG. 6.

Referring to FIG. 12, node N2 receiving agent ( . . . , 1) outputs an agent (0, 1).

Referring to FIG. 13, at the next operation step (hereinafter simply referred to as a step), node N3 that has received agent (0, 1) outputs an agent (0, 1) to node N4. Further, node N3 outputs an agent ( . . . , 1) to node N13.

Referring to FIG. 14, at the next step, node N4 outputs an agent (0, 1) to node N9, and outputs an agent (0, 1) to node N5. Further, node N13 outputs an agent (0, 1) to node N14.

Figure 15:
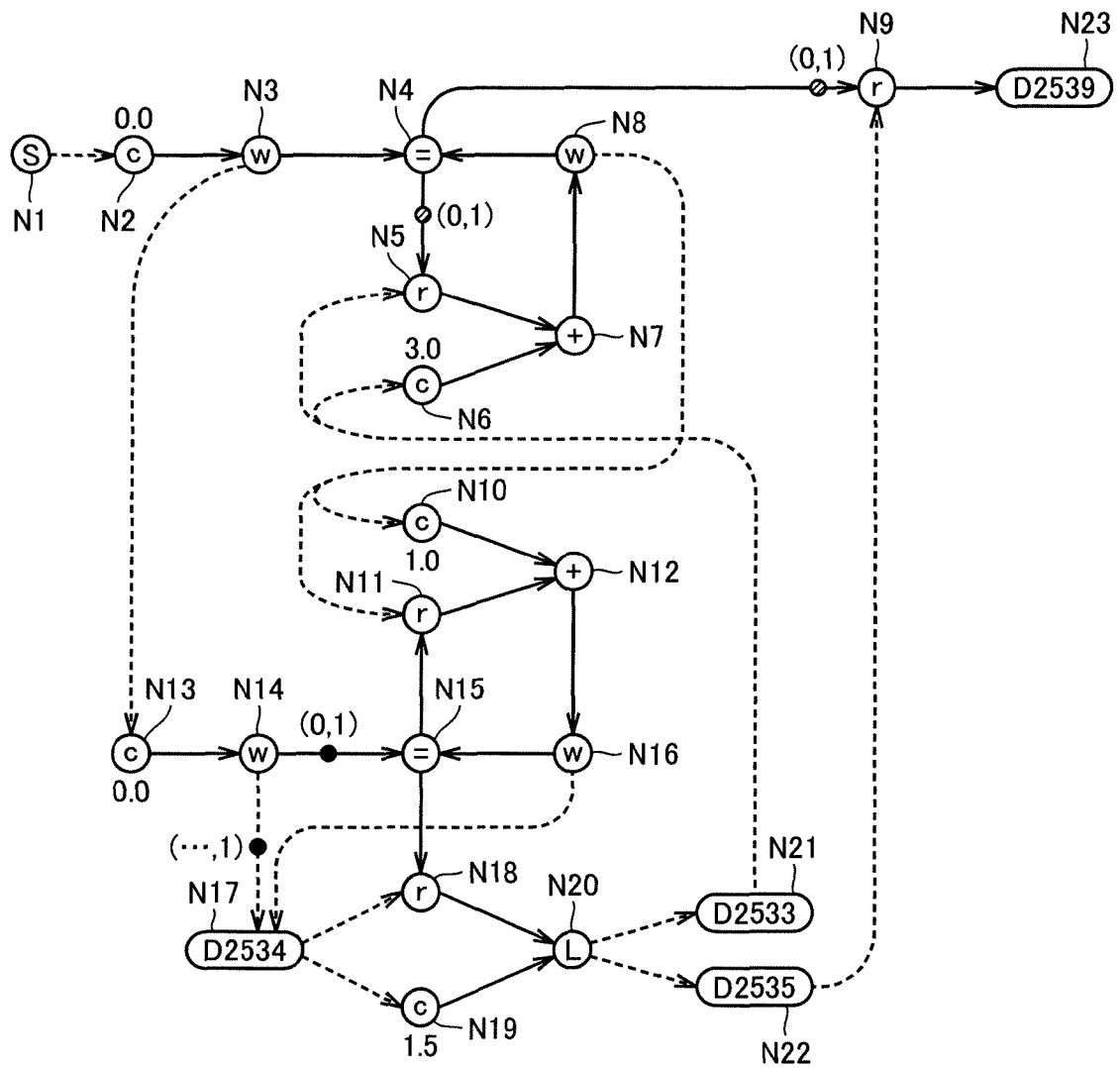
FIG. 15 shows a fifth operation process of forward propagation using the network of FIG. 6.

Referring to FIG. 15, at the next step, node N14 outputs an agent (0, 1) to node N15. Further, node N14 outputs an agent ( . . . , 1) to node N17. Though the agent (0,1) that has reached node N9 is firable, it enters the wait state, since a counterpart agent has not yet reached node N9. Similarly, the agent that has reached node N5 enters the wait state.

Figure 16:
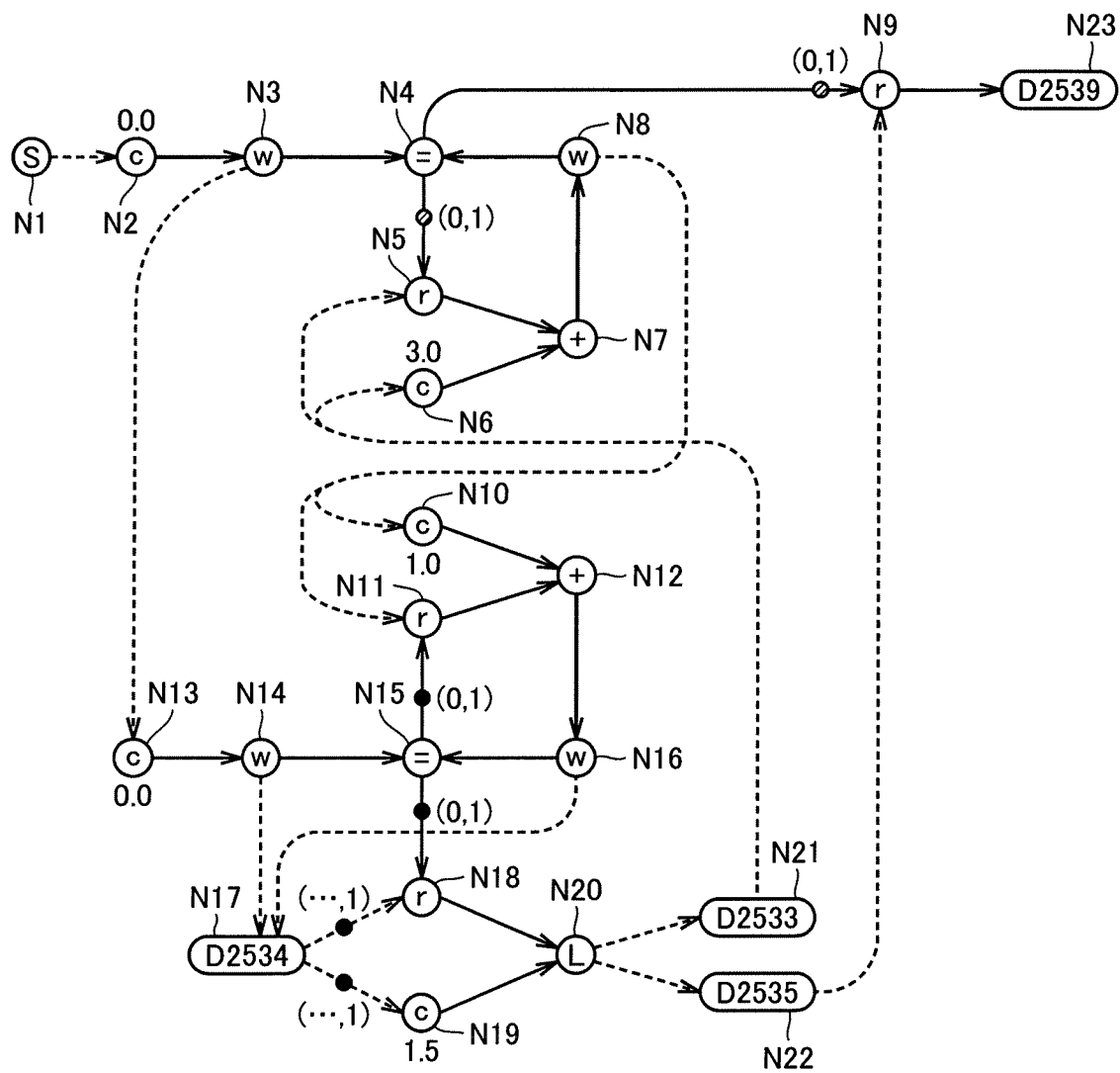
FIG. 16 shows a sixth operation process of forward propagation using the network of FIG. 6.

Referring to FIG. 16, at the next step, node N15 outputs an agent (0, 1) to node N11, and outputs an agent (0, 1) to node N18, respectively. Further, a node N17 outputs an agent ( . . . , 1) to node N18 and an agent ( . . . , 1) to node N19, respectively.

Referring to FIG. 17, as the two agents are input to node N18, node N18 fires, since Boolean product of labels of these agents is not 0. Node N18 outputs an agent (0, 1) to node N20. The agents that have been subjected to the operation become unfirable. Since unfirable agents do not have any influence on the subsequent operations, they are not shown in the figure. Further, at the step shown in FIG. 17, node N19 outputs an agent (1.5, 1) to node N20. The agent that has been input to node N11 enters the wait state.

Referring to FIG. 18, as the two agents are input to node N20, node N20 fires, since Boolean product of labels of these agents is not 0. Node N20 outputs an agent ( . . . , 1) to node N21, and outputs an agent ( . . . , 0) to node N22. Node N20 adds mutually different Boolean variables to two child agents.

Here, the agent ( . . . , 0) becomes unfirable in accordance with Rule 5, and its label [black, black] is stored in the deleted label list. Further, in accordance with Rule 4, a new Boolean variable is added to the label of each of the firable agents (agents preceding nodes N5, N9 and N15). Thus, these agents come to have the label [black, white]. According to Rule 9, all labels in the network are multiplied by the negation of label stored in the deleted label list, so that labels of agents that are in the standby state at nodes N5, N9 and N15 change.

Referring to FIG. 19, at the next step, node N21 outputs agents ( . . . , 1) to nodes N5 and N6.

Referring to FIG. 20, at the next step, as the two agents are input to node N5, node N5 fires. Node N5 outputs an agent (0, 1) to node N7. Node N6 outputs an agent (3, 1) to node N7.

Referring to FIG. 21, at the next step the two agents that have been input to node N7 fire, and node N7 outputs an agent (3, 1) to node N8.

Figure 22:
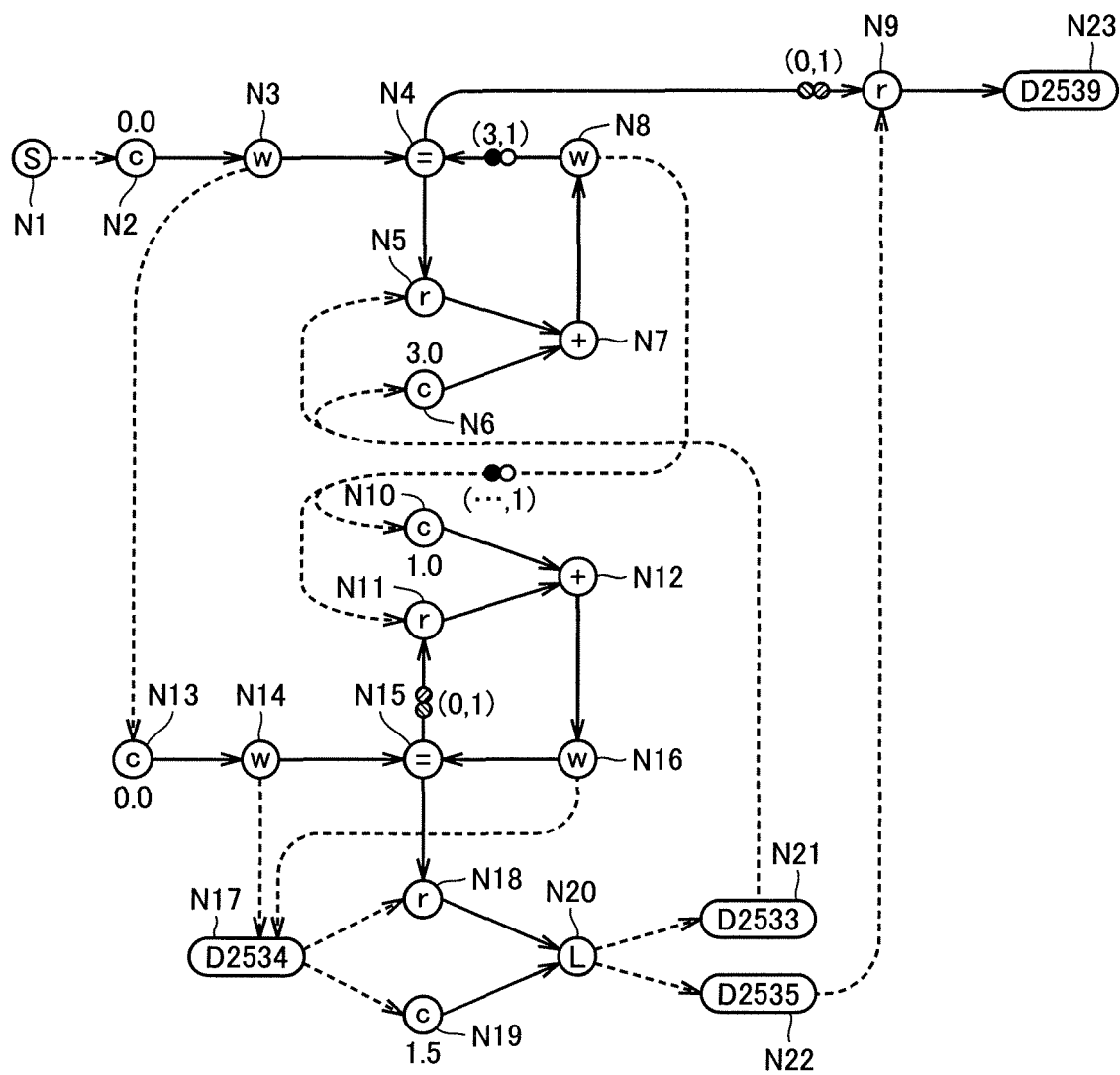
FIG. 22 shows a twelfth operation process of forward propagation using the network of FIG. 6.

Referring to FIG. 22, at the next step, node N8 outputs an agent (3, 1) to node N4, and outputs agents ( . . . , 1) to nodes N10 and N11, respectively.

Referring to FIG. 23, at the next step, as the two agents are input to node N4, node N4 fires. Node N4 outputs an agent (3, 1) to node N9. Here, the agent (0, 1) that has been in the standby state at node N9 become unfirable. Further, node N10 outputs an agent (1, 1) to node N12. Further, as the two agents are input to node N11, node N11 fires. Node N11 outputs an agent (0, 1) to node N12.

Referring to FIG. 24, at the next step, as the two agents are input to node N12, node N12 fires. Node N12 outputs an agent (1, 1) to node N16.

Referring to FIG. 25, at the next step, node N16 outputs an agent (1, 1) to node N15 and outputs an agent ( . . . , 1) to node N17, respectively.

Figure 26:
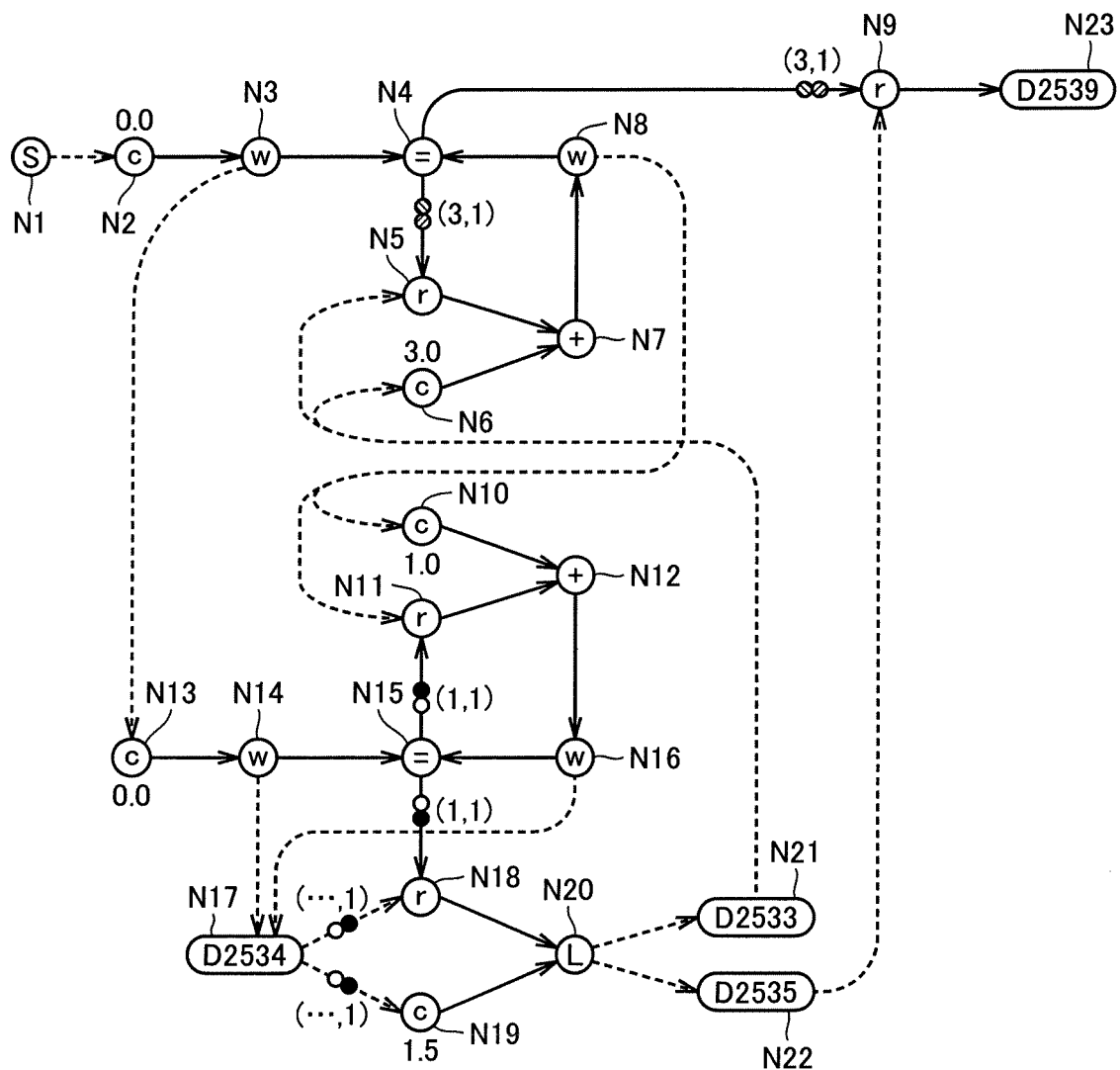
FIG. 26 shows a sixteenth operation process of forward propagation using the network of FIG. 6.
Figure 33:
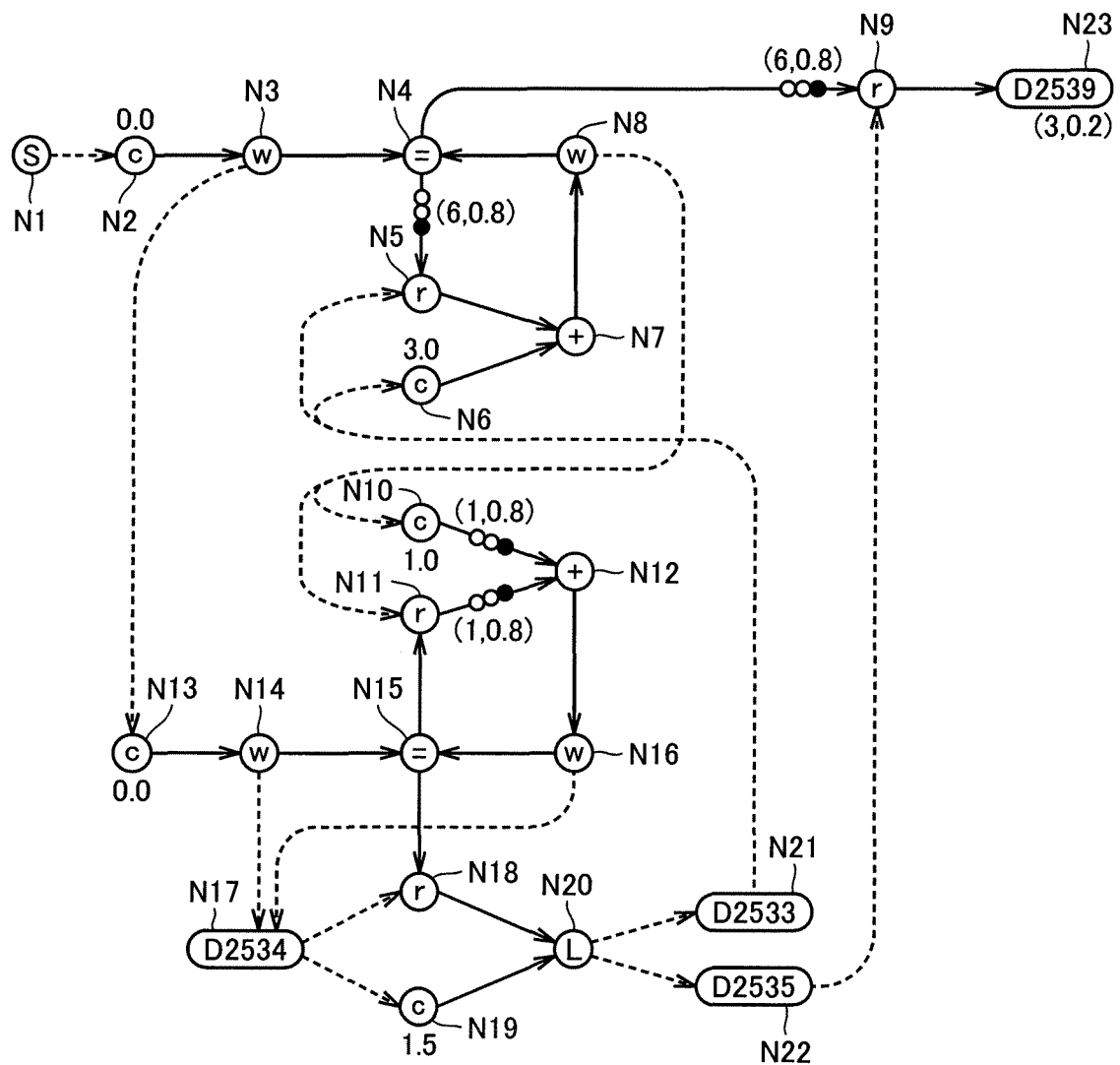
FIG. 33 shows a twenty-third operation process of forward propagation using the network of FIG. 6.
Figure 34:
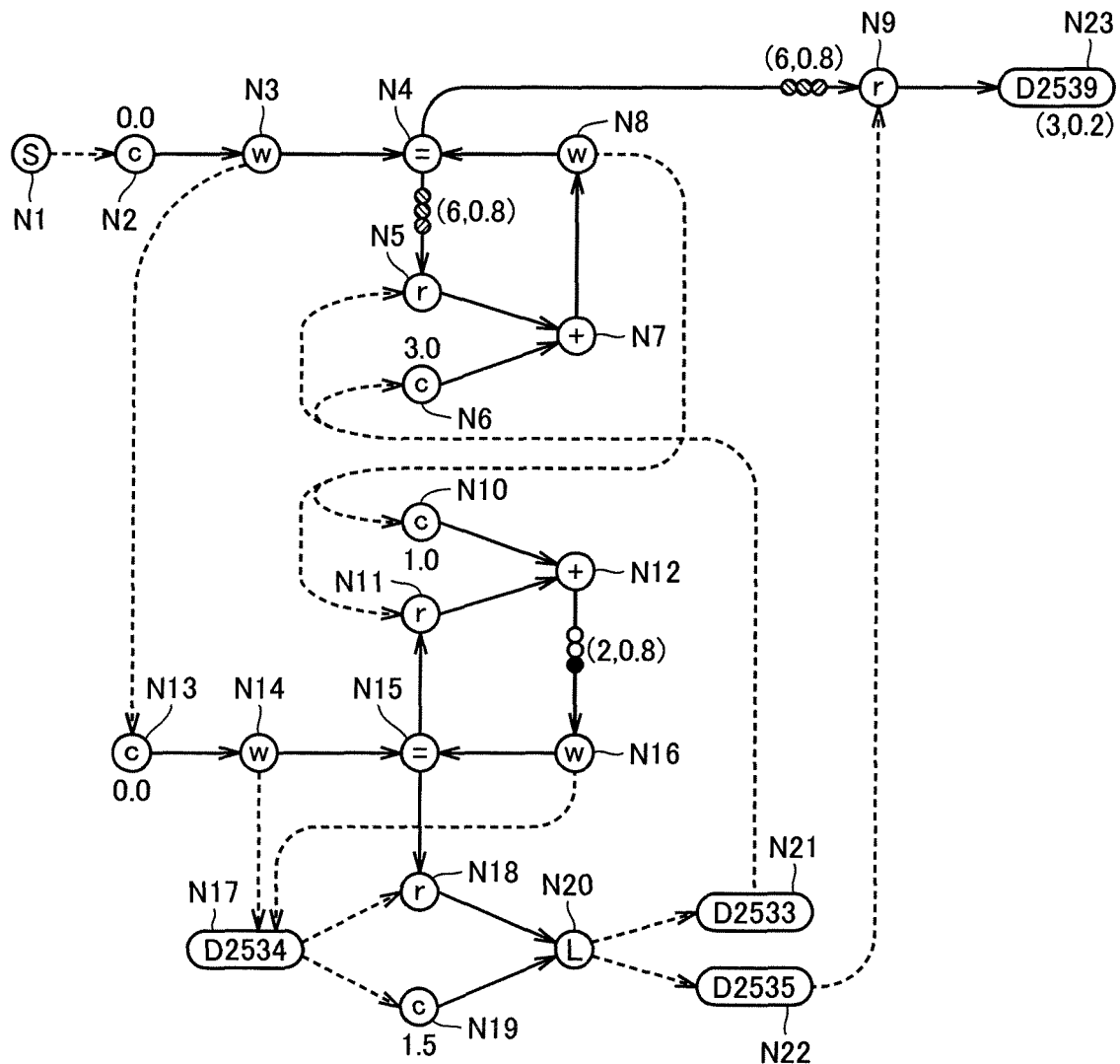
FIG. 34 shows a twenty-fourth operation process of forward propagation using the network of FIG. 6.
Figure 36:
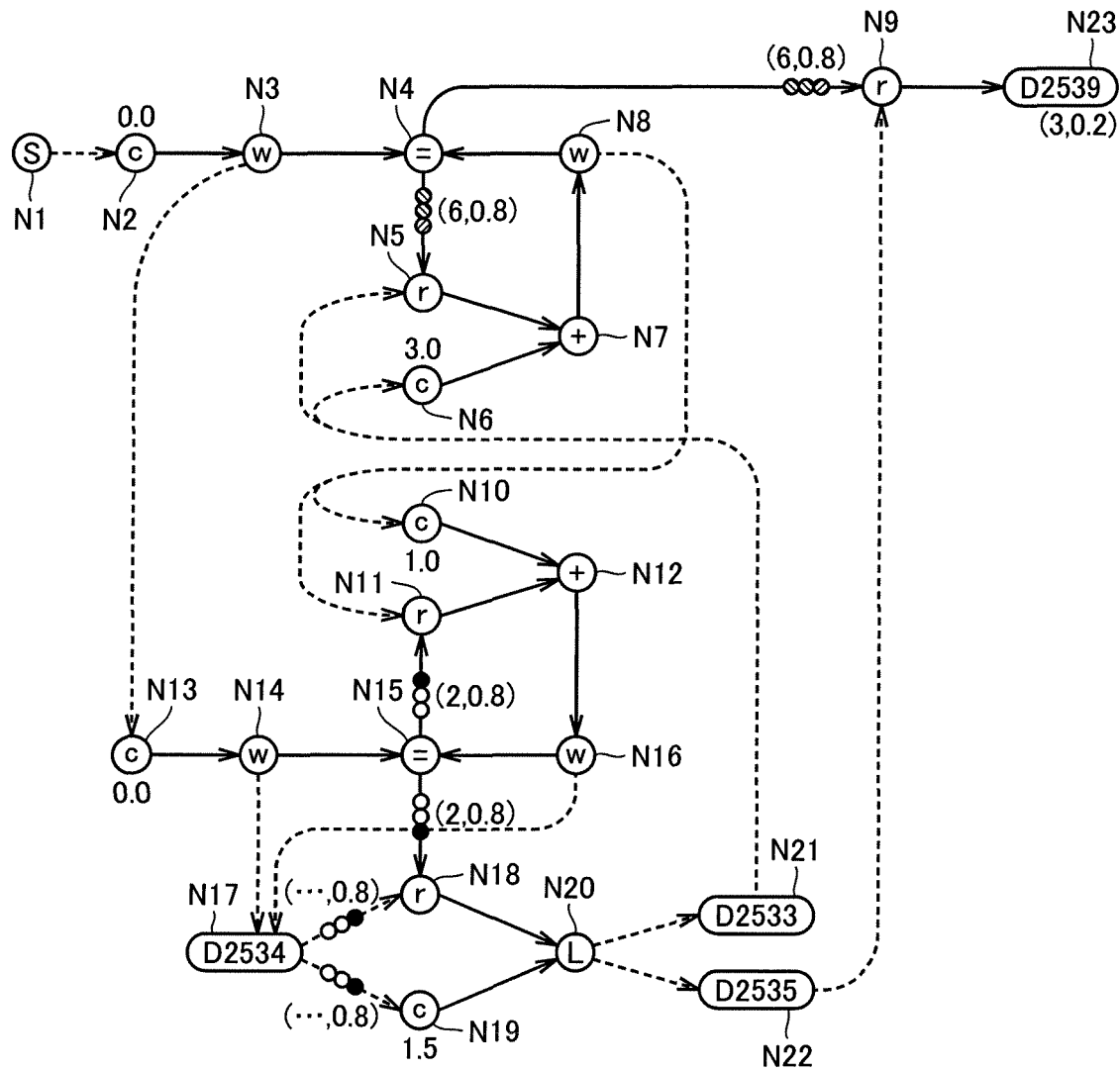
FIG. 36 shows a twenty-sixth operation process of forward propagation using the network of FIG. 6.
Figure 43:
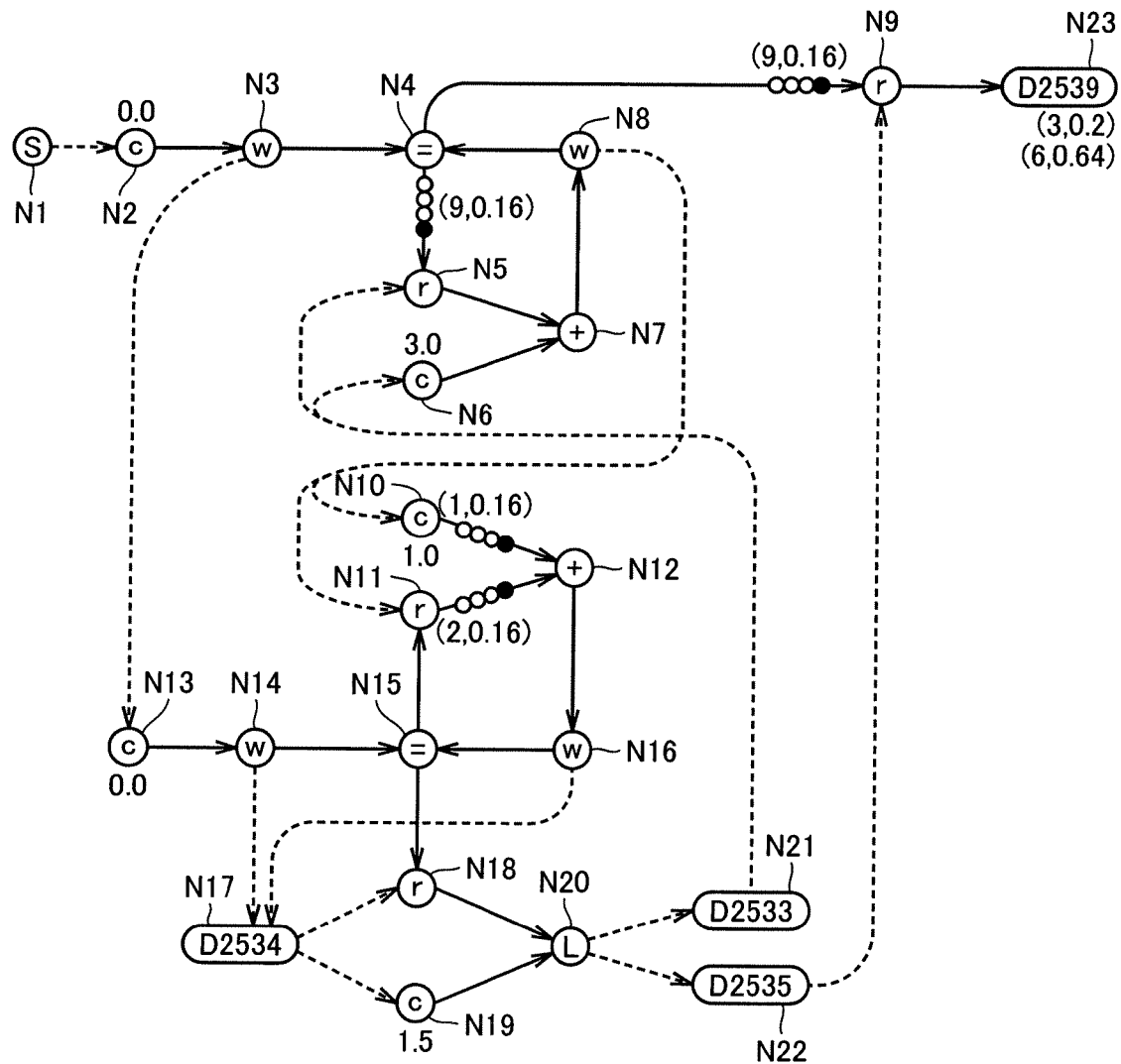
FIG. 43 shows a forward propagation using the network of FIG. 6.
Figure 44:
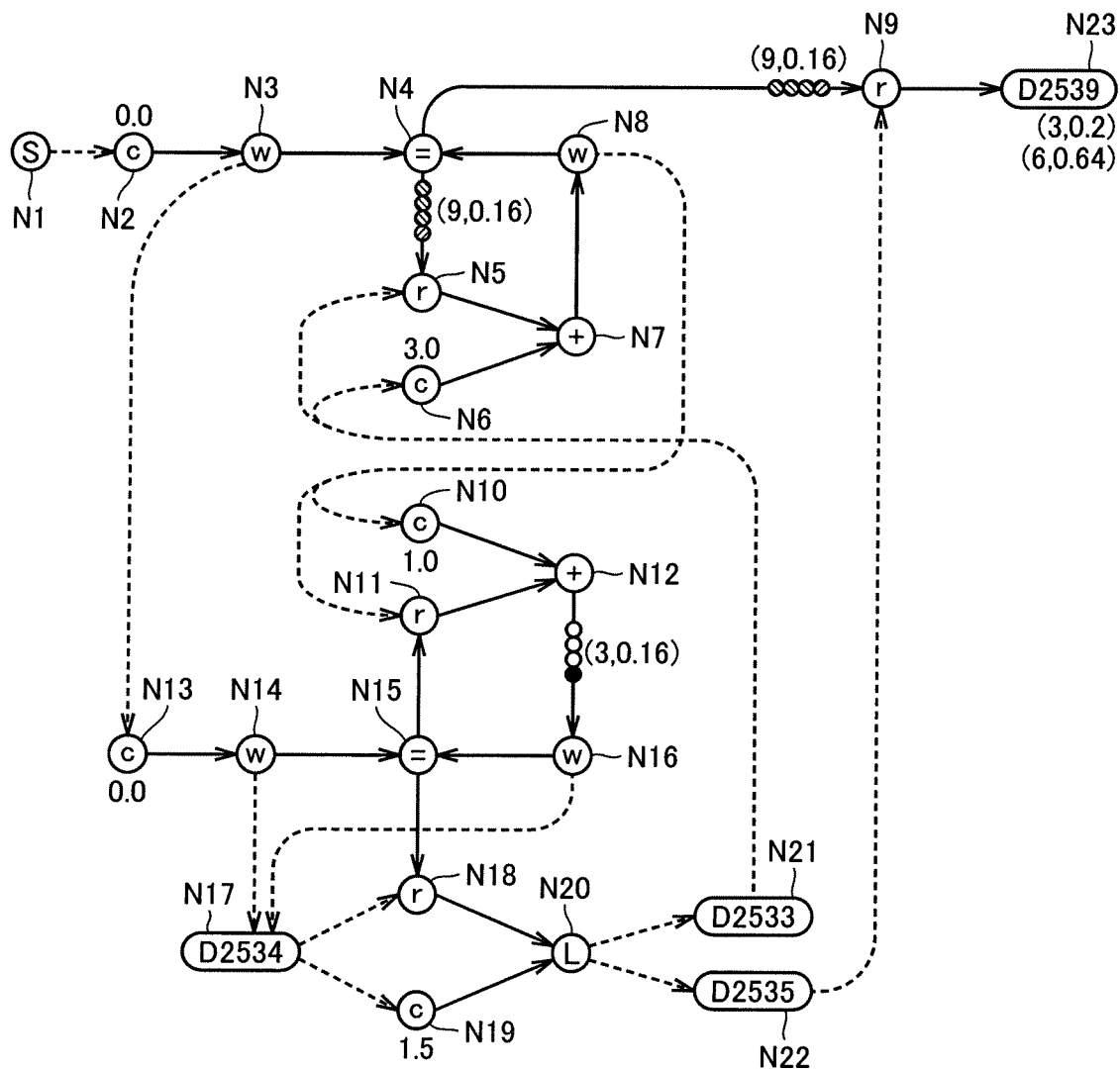
FIG. 44 shows a thirty-fourth operation process of forward propagation using the network of FIG. 6.

Referring to FIG. 26, at the next step, node N17 outputs an agent ( . . . , 1) to node N18 and outputs an agent ( . . . , 1) to node N19, respectively. Further, node N15 outputs an agent (1, 1) to node N18.

Referring to FIG. 27, at the next step, as the two agents are input to node N18, node N18 fires. Node N18 outputs an agent (1, 1) to node N20. Further, node N19 outputs an agent (1.5, 1) to node N20.

Referring to FIG. 28, at the next step, the two agents that have been input to node N20 fire. Node N20 outputs an agent ( . . . , 0.8) to node N21, and outputs an agent ( . . . , 0.2) to node N22. Node N20 adds mutually different Boolean variables to two child agents. Here, since the relation $r=0.2 > r_{th}$ is satisfied, the agent ( . . . , 0.2) does not become unfirable.

Referring to FIG. 29, at the next step, node N21 outputs an agent ( . . . , 0.8) to node N6. Node N22 outputs an agent ( . . . , 0.2) to node N9.

Referring to FIG. 30, at the next step, node N5 outputs an agent (3, 0.8) to node N7. Node N6 outputs an agent (3, 0.8) to node N7.

The Boolean product of two agents that have been input to node N9, that is, the Boolean product of label [black, white] and label [black, white, black] is not 0. Therefore, node N9 fires.

According to Rule 4, an agent having a shorter label becomes a firable agent having a complementary label. The agent having the shorter label is not necessarily the fired agent. Every agent in the network having a shorter label becomes a firable agent with complementary label.

Referring to FIG. 31, at the next step, node N9 outputs an agent (3, 0.2) to node N23. Node N23 is an ans node and, therefore, Rule 8 is applied, and the label of the agent input to node N23 is stored in the deleted label list.

Thereafter, through similar process steps, calculation executing unit 226 carries on operations. Intermediate processes of operations are shown in FIGS. 32 to 51. FIG. 51 shows states of agents when the third result of operation is output to node N23. Calculation executing unit 226 terminates Forward Propagation operation at the time point when there remains no agent moving in the network. Here, description will be given assuming that calculation executing unit 226 terminates Forward Propagation when the third result of operation is output.

As can be seen from the results of operations, calculation executing unit 226 outputs a plurality of value sets $(x_1, r_1)$ as the calculation results. Here, 1 is a suffix representing an agent. Calculation executing unit 226 outputs a weighted mean <x> of the arithmetic value weighted by the regulating value, as the final result of calculation. Here, calculation executing unit 226 outputs <x>=(3×0.2+6×0.64+9×0.16)/(0.2+0.64+0.16)=5.88 as the final result of calculation.

8. Network Updating-1; Constant Learning

The result of calculation obtained in the above-described manner may possibly be different from a value desired by the user (teaching value). Particularly, if a program roughly coded by the user is used as initial program 131, the result of calculation through Forward Propagation generally differs from the teaching value. Therefore, network updating unit 228 modifies the network if the energy error between the result of calculation and the teaching value is larger than a prescribed value.

The energy error is represented as a function of $x_1, r_1$ output at ans node. In the present embodiment, calculation executing unit 226 calculates energy error E in accordance with Equation (1) below.

[Equation 1]

$$E = \frac{1}{2}\left(t - \frac{\sum_l x_l r_l}{\sum_l r_l}\right)^2 + \mu\left(1 - \sum_l r_l\right)^2 + \nu\sum_l r_l^2(1 - r_l^2) \qquad (1)$$

Here, t represents a teaching value. Further, t and v are error coefficients. The error coefficient is a predetermined constant or a constant appropriately determined by the user. The first term represents a square of error between the result of calculation <x> and the teaching value t. The closer the result of calculation to t, the smaller becomes the energy error E. The second and third terms are provided reflecting the fact that the total sum of regulating values should preferably be 1. If the total sum of regulating values is not 1, it means that too many or too few branches have been deleted, suggesting possible failure of correct operation. If the energy error E is larger than a prescribed value, calculation executing unit 226 passes the energy error E to network updating unit 228.

Network updating unit 228 modifies the network using a learning algorithm, based on energy error E. By way of example, network updating unit 228 modifies the network using a learning algorithm similar to Hebb's learning or error back propagation learning in a neural network.

In the present embodiment, network updating unit 228 modifies the node variable {z}={v, s, βr} of respective operation nodes included in the network, by a method similar to the error back propagation learning. Specifically, network updating unit 228 calculates contribution of node variable {z} of each operation node to the error, and updates {z} based on the contribution.

In the present embodiment, network updating unit 228 calculates, as the contribution, a differential coefficient of error with respect to the node variable, and updates {z} by steepest descent method. Specifically, network updating unit 228 updates {z} in accordance with Equation (2) below. In Equation (2), η represents a learning coefficient. $D_z$ is a differential coefficient of E with respect to z.

[Equation 2]

$$z \to z - \eta \frac{\partial E}{\partial z} = z - \eta D_z \qquad (2)$$

Network updating unit 228 calculates $D_z$ of each node based on back propagation of differential coefficient of the energy error. The back propagation of differential coefficient of the energy error refers to the characteristic that the differential coefficient of energy error with respect to a variable of a parent agent can be calculated based on the differential coefficient of energy error with respect to a variable of a child agent. Network updating unit 228 calculates the differential coefficient of energy error for each operation node in order, starting from the operation node on the output side to the operation node on the input side of the network. Network updating unit 228 determines in what order the differential coefficients of energy error are to be calculated, based on the pointers to parent/child agents (family tree).

The basis of back propagation is the chain rule. The chain rule is that a differential coefficient with respect to an input variable of a function is equal to product-sum of partial differentials of nodes of the entire path from a terminal node to the variable.

Figure 52:
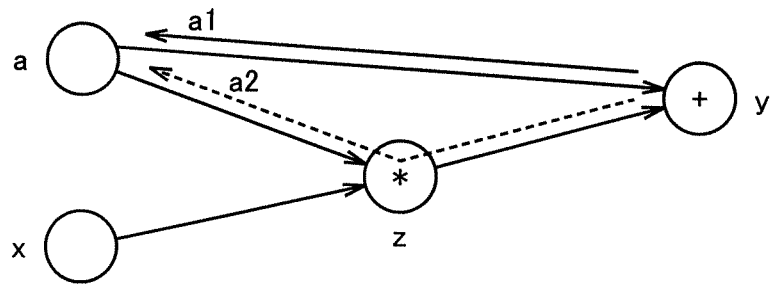
FIG. 52 illustrates a chain rule.

The chain rule will be described with reference to FIG. 52. FIG. 52 illustrates the chain rule. In the graph of FIG. 52, $z=a_2 x$. Further, $y=a_1+z=a_1+a_2 x=a(1+x)$. The differential coefficient of y with respect to a can be represented by Equation (*) below.

$$\partial y/\partial a = 1+x = 1+x \cdot 1 = \partial y/\partial a_1 + \partial z/\partial a_2 \cdot \partial y/\partial z \ldots (*)$$

Here, the first term of the right-most side represents a product of partial differentials of the path given by solid lines. The second term of the right-most side represents a product of partial differentials of the path given by dotted lines. Thus, it can be seen that the chain rule holds. As can be inferred from Equation (*), the chain rule is the partial differential method of composite function stated in another way. Therefore, the chain rule holds good at all times.

It is understood that when the chain rule is applied to the differential coefficient of energy error (in the following, also referred to as "error differential coefficient" for simplicity of description), the error differential coefficient propagates backward. Specifically, differential coefficients of error with respect to x, r of a parent agent can be calculated based on the differential coefficients of the error with respect to X, R of a child agent and the partial differentials of node operations. More specifically, the differential coefficient $Dx_1$ (or $Dr_1$) of the error with respect to $x_1$ (or $r_1$) of a parent agent is given by error coefficient with respect to X of a child agent times partial differential of X with respect to x1 plus error coefficient with respect to R of the child agent times partial differential of R with respect to $r_1$, summed for all child agents.

Figure 53:
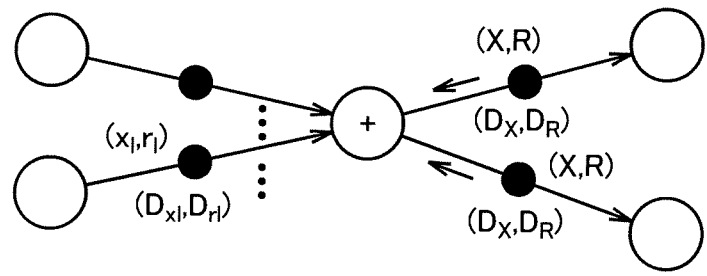
FIG. 53 illustrates back propagation of differential coefficient of error.

This will be described with reference to FIG. 53. FIG. 53 illustrates back propagation of error differential coefficients. Error differential coefficients $D_{x1}$ and $D_{r1}$ with respect to x1 and r1 of a parent agent in FIG. 53 can be represented by Equations (3) and (4) below, respectively.

[Equation 3]

$$D_{x_l} = \sum_{children} \left( D_x \frac{\partial X}{\partial x_l} + D_R \frac{\partial R}{\partial x_l} \right) \quad (3)$$

[Equation 4]

$$D_{r_l} = \sum_{children} \left( D_x \frac{\partial X}{\partial r_l} + D_R \frac{\partial R}{\partial r_l} \right) \quad (4)$$

Because of this characteristic, it is possible for network updating unit 228 to calculate differential coefficients of error with respect to x and r of all agents in order, starting from the agent on the output side to the agent on the input side of the network.

Partial differentials of node operations (∂X/∂x, ∂R/∂x, ∂X/∂r, ∂R/∂r) can be calculated individually for each operation node. In the present embodiment, calculation executing unit 226 calculates the partial differentials of node operations at the time of Forward Propagation. By this method, it is possible to calculate partial differentials with higher efficiency than when network updating unit 228 calculates partial differentials at the time of back propagation. Further, the program as a whole can be simplified.

Further, based on the chain rule (or the partial differential method of composite function), the differential coefficient of error with respect to node variable {z} can be calculated from the differential coefficients of child agents and the partial differentials of node operations. More specifically, the error differential coefficient $D_z$ with respect to z of a node is given by adding the products of error differential coefficients with respect to X and R of a child agent created by firing of the node and the partial differentials of X and R with respect to z, and summing the results of addition for all child agents.

Figure 54:
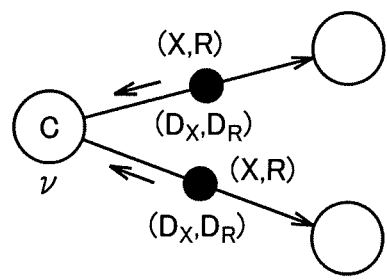
FIG. 54 illustrates differential coefficient of error with respect to node constants.

This will be described with reference to FIG. 54. FIG. 54 illustrates differential coefficient of error with respect to node constants. The error differential coefficient $D_v$ with respect to v of Arithmetic const. node shown in FIG. 54 can be represented by Equation (5) below.

[Equation 5]

$$D_v = \sum_{children} \left( D_x \frac{\partial X}{\partial v} + D_R \frac{\partial R}{\partial v} \right) \quad (5)$$

The error differential coefficient $D_z$ with respect to a node variable can be calculated in the similar manner for Regulating const. node having s as a node variable and the judging node having $\beta_r$ as a node variable.

Network updating unit 228 calculates error differential coefficient $D_z$ with respect to the node variable, for every variable node, that is, every operation node having a node variable, through the above-described procedure. Then, network updating unit 228 inputs the calculated $D_z$ to Equation (2), to update the node variable z of each variable node.

In order to appropriately update a network through learning, it is necessary to determine an appropriate value of learning coefficient η in Equation (2). Through experiments, the inventors found it preferable to determine learning coefficient η such that the learning proceeds not blindly fast. Specifically, it has been found that the coefficient must be determined such that the value of energy error E does not abruptly change by one time update of {z}.

Accordingly, in the present embodiment, network updating unit 228 determines the learning coefficient η such that E is multiplied $(1-\eta_{1p})$ times by one update of {z}. Here, $\eta_{1p}$ represents the learning ratio of one pass, which is a constant larger than 0 and smaller than 1.

The condition above can be represented by Equation (6) below.

[Equation 6]

$$(1 - \eta_{lp}) \cdot E(\{z\}) = E\left(\left\{z - \eta \frac{\partial E}{\partial z}\right\}\right) \quad (6)$$

$$\cong E(\{z\}) - \mu \sum_z \left(\frac{\partial E}{\partial z}\right)^2$$

The right side of Equation (6) is transformed in accordance with Taylor expansion.

By transforming Equation (6), Equation (7) of learning coefficient η results.

[Equation 7]

$$\eta = \frac{\eta_{lp} \cdot E}{\sum_z \left(\frac{\partial E}{\partial z}\right)^2} = \frac{\eta_{lp} \cdot E}{\sum_z D_z^2} \quad (7)$$

What is required of network updating unit 228 is simply to calculate the learning coefficient η in accordance with Equation (7). Specifically, network updating unit 228 calculates the learning coefficient η for each variable node, based on energy error E, and $D_z$ obtained by back propagation, in accordance with Equation (7).

The value of $\eta_{1p}$ may be determined in advance, or it may be determined by the user. Experiments made by the inventors suggest that preferable value of $\eta_{1p}$ is about 0.5 to about 0.7. The value of $\eta_{1p}$, however, is not limited to this range.

9. Network Update-2; Topology Learning

Network updating unit 228 is capable of updating the network by changing the network structure, in addition to the updating of node variables described above. Specifically, a topology learning unit 228b included in network updating unit 228 can update the network by adding or deleting an operation node or by changing connection of edges. Such production/deletion of nodes and change of connection among edges lead to alteration of network topology, and changes algorithm. Such update is referred to as topology learning.

Topology learning unit 228b changes the network structure in accordance with the following rules. Topology learning unit 228b may change the network structure in accordance with some of the rules, rather than all the rules described below.

<Constantification>

A node of which values (X, R) calculated upon firing remain unchanged for a long time is changed to an Arithmetic const. node (c) or a Regulating const. node (C). This rule is referred to as Constantification (CON). Constantification simplifies the algorithm without any influence on the result of calculation.

Constantification will be described with reference to FIG. 55. FIG. 55 illustrates Constantification. FIG. 55(*a*) shows a part of the network before Constantification, and FIG. 55(*b*) shows the part of the network after Constantification.

If an Addition node (+) shown in FIG. 55(*a*) applies the same arithmetic value to agents output therefrom continuously for a prescribed number of times or more, topology learning unit 228b changes the network to a state shown in FIG. 55(*b*). Specifically, topology learning unit 228b changes the Addition node (+) to an Arithmetic const. node (c). Topology learning unit 228b leaves that one of the edges input to the Addition node of which sum of past r values is the smallest, as an edge to be input to the Arithmetic const. node. Topology learning unit 228b deletes other edges that have been input to the Addition node.

Figure 56:
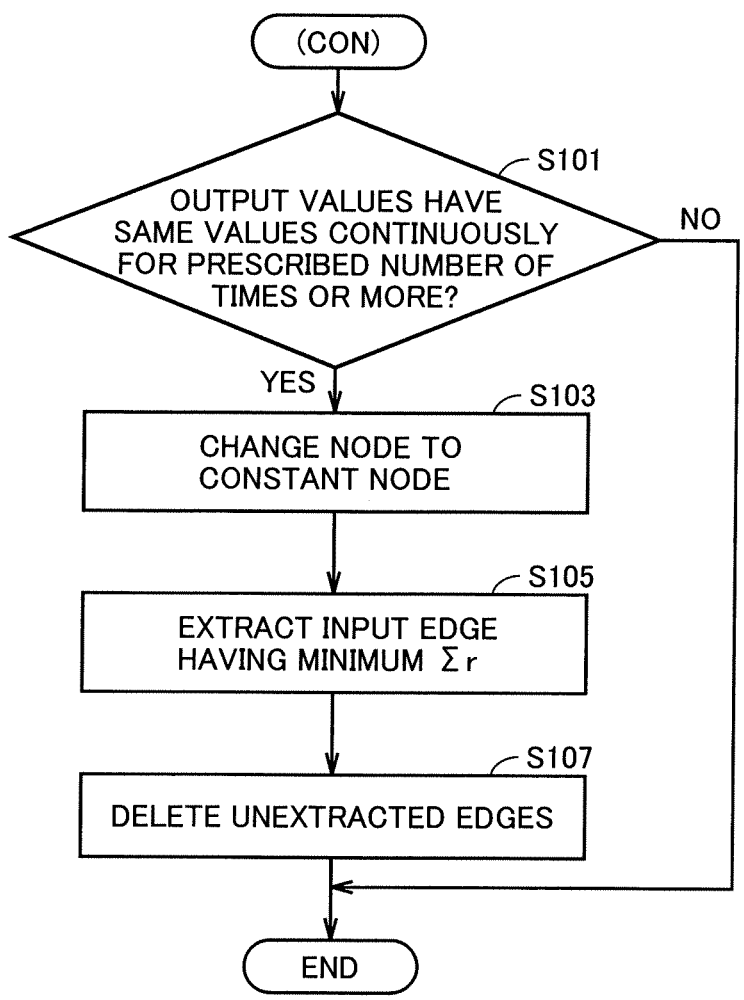
FIG. 56 is a flowchart representing a flow of a process performed by a topology learning unit 228b for Constantification.

The flow of processes performed by topology learning unit 228b for Constantification will be described with reference to FIG. 56. FIG. 56 is a flowchart representing the flow of processes performed by topology learning unit 228b for Constantification.

At step S101, topology learning unit 228b determines, based on the set (x[ ], r[ ]) of set values included in node information 134a, whether a set of output values (arithmetic value or regulating value) has the same values continuously for a prescribed number of times, for each operation node.

If the set of output values (arithmetic value or regulating value) of an operation node has the same values continuously for a prescribed number of times (YES at step S101), topology learning unit 228b changes the operation node to an Arithmetic const. node (c) or a Regulating const. node (C), at step S103.

At step S105, topology learning unit 228b extracts an input edge of which sum of past r values is the smallest, from the input edges input to the operation node.

At step S107, topology learning unit 228b deletes the input edge or edges not extracted at step S105.

If the set of output values of an operation node does not have the same values continuously for a prescribed number of times (NO at step S101), topology learning unit 228b does not execute the process of steps S103 to S107.

<Making Variable>

A new node is created as a function of a node selected at random. This rule is referred to as Making Variable (MKV). By Making Variable, an algorithm can be made complex without any influence on the result of calculation. Therefore, Making Variable prevents the algorithm from entering an inappropriate equilibrium state. Further, Making Variable prevents reduction in scale of the network due to Constantification or the like, and it maintains the network scale.

Making Variable will be described with reference to FIG. 57. FIG. 57 illustrates Making Variable. FIG. 57(*a*) shows a part of a network before Making Variable. FIG. 57(*b*) shows the part of the network after Making Variable.

Topology learning unit 228b selects two operation nodes at random. FIG. 57(*a*) shows the selected two operation nodes. Then, topology learning unit 228b creates an Addition node (+) shown in FIG. 57(*b*). Further, topology learning unit 228b creates edges to be input to the Addition node (+) from the selected two operation nodes.

It is noted that topology learning unit 228b may select three or more operation nodes and connect the selected operation nodes to the Addition node. Further, topology learning unit 228b may create an operation node other than the Addition node.

The flow of processes performed by topology learning unit 228b for Making Variable will be described with reference to FIG. 58. FIG. 58 is a flowchart representing the flow of processes performed by topology learning unit 228b for Making Variable.

At step S201, topology learning unit 228b selects a plurality of operation nodes at random.

At step S203, topology learning unit 228b creates a new operation node. Here, topology learning unit 228b creates an operation node having the same number of inputs as the number of operation nodes selected at step S201.

At step S205, topology learning unit 228b creates edges input to the operation node created at step S203 from each of the operation nodes selected at step S201.

<Bridge>

A node a selected at random is changed to (a+0*b) using a node b selected at random. This process is referred to as Bridge (BRG).

Bridge will be described with reference to FIG. 59. FIG. 59 illustrates Bridge. FIG. 59(*a*) shows a part of a network before Bridge process. FIG. 59(*b*) shows the part of the network after Bridge process.

Topology learning unit 228b selects operation nodes a and b at random. FIG. 59(*a*) shows operation nodes a and b.

Topology learning unit 228b creates an Arithmetic const. node (c) having a node variable v=0.0 and creates an edge directed from operation node b to the Arithmetic const. node, as shown in FIG. 59(*b*). Further, topology learning unit 228b creates a Multiplication node (*) that receives outputs from the Arithmetic const. node and operation node b. Further, topology learning unit 228b creates an Addition node that receives outputs from the Multiplication node and operation node a. Topology learning unit 228b uses an operation node that has been a connection destination from operation node a as a connection destination of the Addition node.

The output of Addition node is a+0*b=a. Therefore, by Bridge process, the algorithm can be made complex without changing the result of calculation. Thus, Bridge process prevents the algorithm from entering an inappropriate equilibrium state. Further, Bridge process prevents reduction in scale of the network due to Constantification or the like, and it maintains the network scale.

Figure 60:
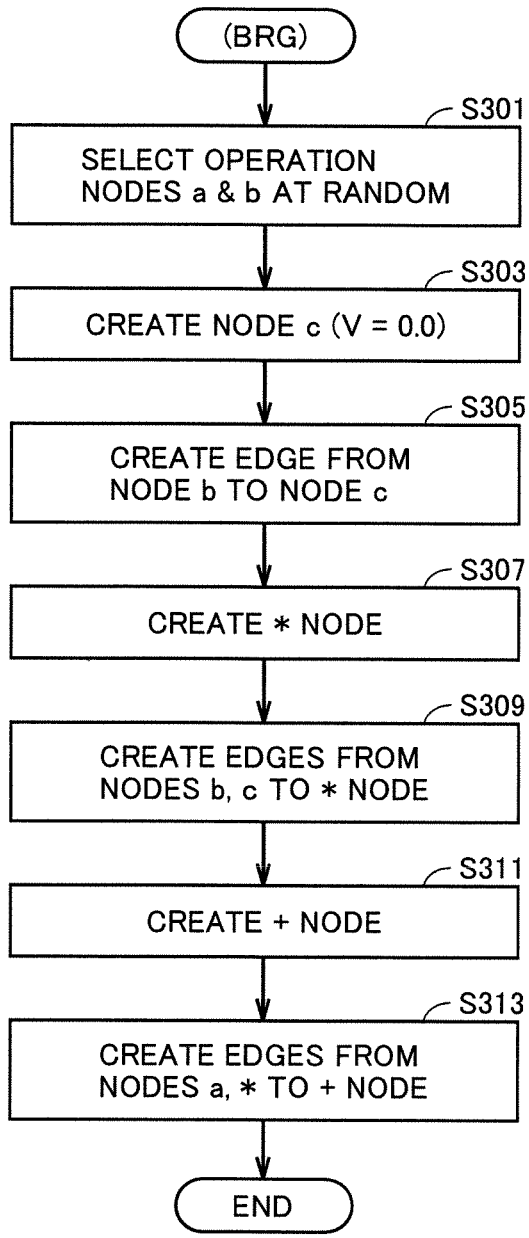
FIG. 60 is a flowchart representing a flow of a process performed by topology learning unit 228b for Bridge.

The flow of processes performed by topology learning unit 228b for Bridge will be described with reference to FIG. 60. FIG. 60 is a flowchart representing the flow of processes performed by topology learning unit 228b for Bridge.

At step S301, topology learning unit 228b selects operation nodes a and b at random.

At step S303, topology learning unit 228b creates an Arithmetic const. node (c) having a node variable v=0.0.

At step S305, topology learning unit 228b creates an edge directed from operation node b to node c.

At step S307, topology learning unit 228b creates a Multiplication (*) node.

At step S309, topology learning unit 228b creates edges directed from operation nodes b and c to node *.

At step S311, topology learning unit 228b creates an Addition (+) node.

At step S313, topology learning unit 228b creates edges directed from operation nodes a and * to node +.

<Fork>

A node a selected at random is branched depending on a judging between nodes b and c. Here, nodes b and c are nodes selected at random from nodes of which sum of past regulating values r is larger than the sum of past regulating values r of node a. This process is referred to as Fork (FRK).

Figure 61:
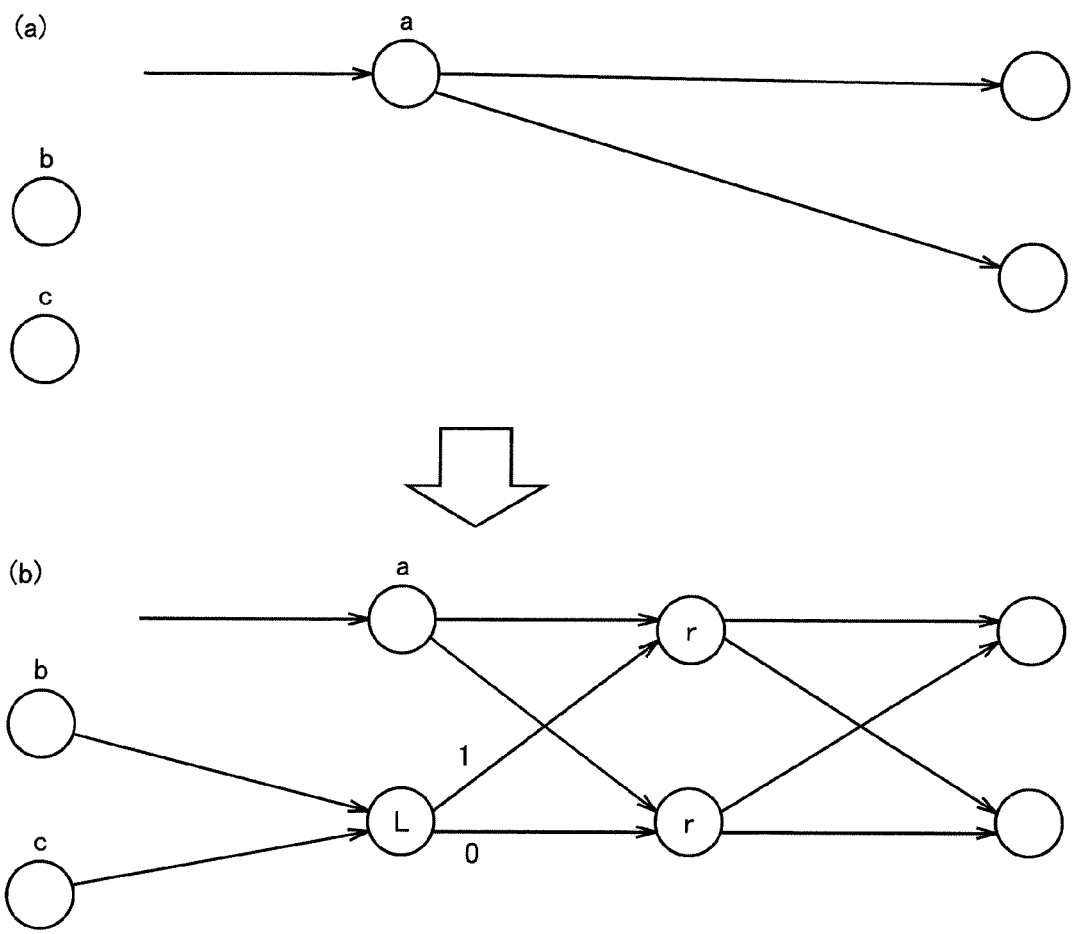
FIG. 61 illustrates Fork.

Fork will be described with reference to FIG. 61. FIG. 61 illustrates Fork. FIG. 61(a) shows a part of a network before Fork process. FIG. 61(b) shows the part of the network after Fork process.

Topology learning unit 228b selects an operation node a. Further, topology learning unit 228b selects operation nodes b and c at random, from nodes of which sum of past regulating values r is larger than the sum of past regulating values r of node a. FIG. 61(a) shows operation nodes a, b and c.

Topology learning unit 228b creates a judging node (L) that receives inputs from operation nodes b and c, as shown in FIG. 61(b). Further, topology learning unit 228b creates a first Read node (r) that receives an output from operation node a and a first output from the judging node. Topology learning unit 228b creates a second Read node (r) that receives an output of operation node a and a second output of the judging node. Further, topology learning unit 228b creates edges for inputting the results of operations by the first and second Read nodes to each of the operation nodes that have been the destinations of connection of operation node a.

By Fork process, an algorithm can be made complex without any influence on the result of calculation. Therefore, Fork process prevents the algorithm from entering an inappropriate equilibrium state. Further, Fork process prevents reduction in scale of the network due to Constantification or the like, and it maintains the network scale.

Figure 62:
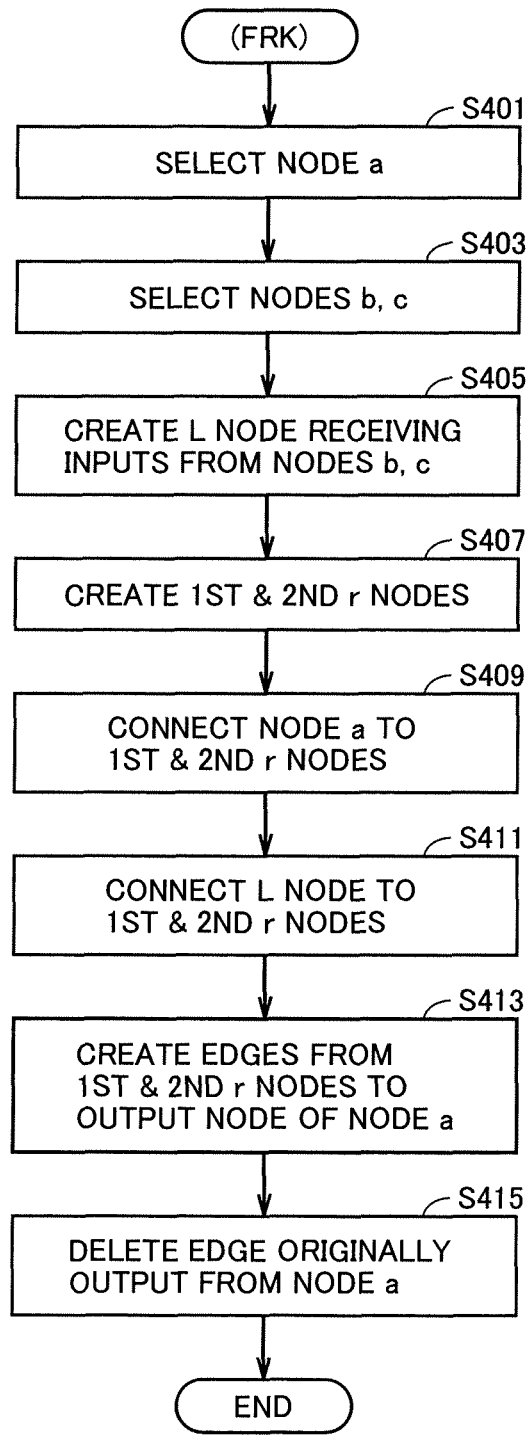
FIG. 62 is a flowchart representing a flow of a process performed by topology learning unit 228b for Fork.

The flow of processes performed by topology learning unit 228b for Fork will be described with reference to FIG. 62. FIG. 62 is a flowchart representing the flow of processes performed by topology learning unit 228b for Fork.

At step S401, topology learning unit 228b selects an operation node a at random.

At step S403, topology learning unit 228b selects nodes b and c at random from nodes of which sum of past regulating values r is larger than the sum of past regulating values r of node a.

At step S405, topology learning unit 228b creates a judging node (L) that receives inputs from operation nodes b and c. Specifically, topology learning unit 228b creates a judging node, and creates edges directed from operation nodes b and c to the created judging node.

At step S407, topology learning unit 228b generates a first r node and a second r node.

At step S409, topology learning unit 228b connects operation node a to the first and second r nodes. Specifically, topology learning unit 228b creates edges directed from operation node a to the first and second r nodes.

At step S411, topology learning unit 228b connects the judging node to the first and second r nodes. Specifically, topology learning unit 228b creates edges directed from the judging node to the first and second r nodes.

At step S413, topology learning unit 228b creates edges directed from the first and second r nodes to operation node a.

At step S415, topology learning unit 228b deletes edges originally output from operation node a.

<Merge Tuple>

Two vertically connected Addition nodes or Multiplication nodes are merged by the coupling rule. That the two Addition nodes are "vertically connected" means that the two Addition nodes are directly connected by an edge. This process is referred to as Merge Tuple (MGT). Merge Tuple can simplify the algorithm without any influence on the result of calculation.

Merge Tuple will be described with reference to FIG. 63. FIG. 63 illustrates Merge Tuple. FIG. 63(a) shows a part of a network before Merge Tuple. FIG. 63(b) shows the part of the network after Merge Tuple.

If there are two vertically connected Addition nodes as shown in FIG. 63(a), topology learning unit 228b deletes one of the two Addition nodes. Further, topology learning unit 228b connects edges that have been connected to the deleted Addition node to the remaining Addition node. Topology learning unit 228b performs a similar process to two vertically connected Multiplication nodes.

Figure 64:
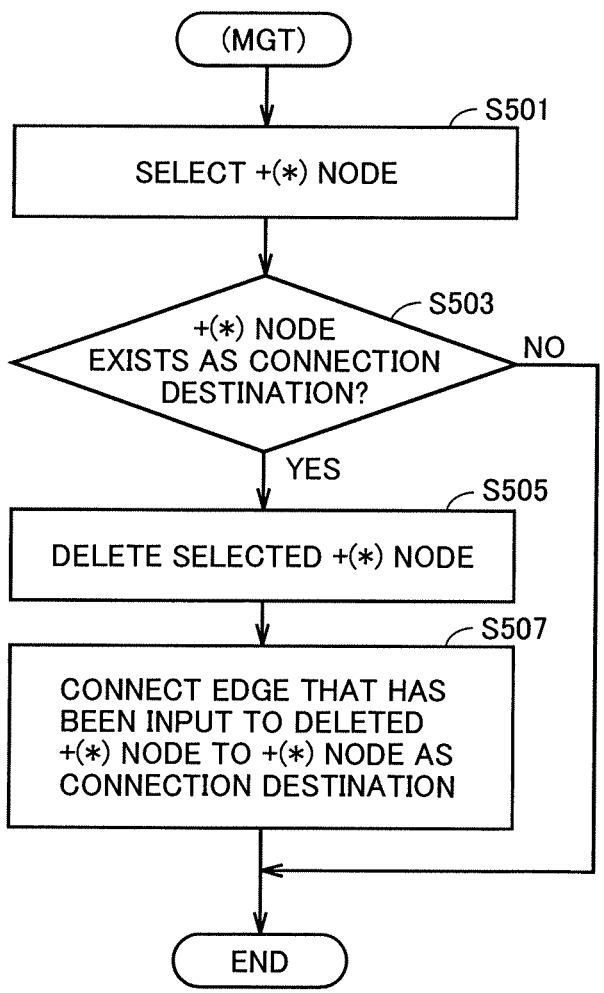
FIG. 64 is a flowchart representing a flow of a process performed by topology learning unit 228b for Merge Tuple.

The flow of processes performed by topology learning unit 228b for Merge Tuple will be described with reference to FIG. 64. FIG. 64 is a flowchart representing the flow of processes performed by topology learning unit 228b for Merge Tuple.

At step S501, topology learning unit 228b selects one +node (or * node).

At step S503, topology learning unit 228b determines whether or not the +node (or * node) selected at step S501 has a +node (or * node) as a destination of connection.

If a +node (or a * node) exists as a destination of connection (YES at step S503), at step S505, topology learning unit 228b deletes the +node (or * node) selected at step S501.

At step S507, topology learning unit 228b connects edges that have been input to the deleted +node (or * node) to the +node (or * node) as the destination of connection.

If a +node (or * node) does not exist as the connection destination (NO at step S503), topology learning unit 228b does not execute the process of steps S505 and S507.

<Merge Node>

A plurality of constant nodes input to an Addition node or a Multiplication node are merged by the coupling rule. This process is referred to as Merge Node (MGN). Merge Node can simplify the algorithm without any influence on the result of calculation.

Merge Node will be described with reference to FIG. 65. FIG. 65 illustrates Merge Node. FIG. 65(a) shows a part of a network before Merge Node. FIG. 65(b) shows the part of the network after Merge Node.

If there are two constant nodes that are input to one Addition node as shown in FIG. 65(a), topology learning unit 228b replaces the two constant nodes with one constant node having a constant value as a sum of constant values of the two constant nodes, as shown in FIG. 65(b).

Similarly, if there are three constant nodes directed to one addition node, topology learning unit 228b replaces the constant nodes that are input to the Addition node with one constant node having a constant value as a sum of constant values of all the constant nodes input to the Addition node. Topology learning unit 228b performs a similar process on two vertically connected Multiplication nodes.

Figure 66:
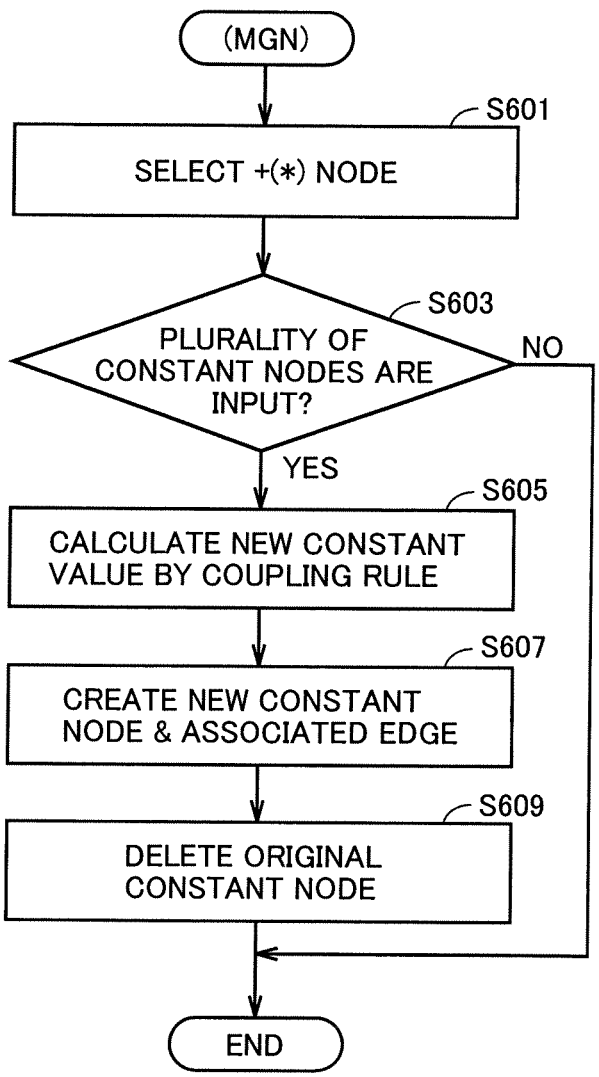
FIG. 66 is a flowchart representing a flow of a process performed by topology learning unit 228b for Merge Node.

The flow of processes performed by topology learning unit 228b for Merge Node will be described with reference to FIG. 66. FIG. 66 is a flowchart representing the flow of processes performed by topology learning unit 228b for Merge Node.

At step S601, topology learning unit 228b selects one +node (or * node).

At step S603, topology learning unit 228b determines whether or not a plurality of constant nodes are input to the +node (or * node) selected at step S601.

If a plurality of constant nodes are input (YES at step S603), at step S605, topology learning unit 228b calculates a sum (or product) of the constant values that are input. The value obtained by this calculation will be a new constant value.

At step S607, topology learning unit 228b creates a new constant node that has the new constant value. Further, topology learning unit 228b creates an edge directed from the new constant node to the +node (or * node) selected at step S601. Further, topology learning unit 228b changes connection of edges that have been input to the original constant node to the new constant node.

At step S609, topology learning unit 228b deletes the original constant node.

If a plurality of constant nodes are not input (NO at step S603), topology learning unit 228b does not execute the process from step S605 to step S609.

<Division>

If a constant value of an Arithmetic const. node or a Regulating const. node is undetermined indefinitely, it is divided. This process is referred to as Division (DIV).

Division will be described with reference to FIG. 67. FIG. 67 illustrates Division. FIG. 67(a) shows a part of a network before Division. FIG. 67(b) shows the part of the network after Division.

If a constant value of an Arithmetic const. node shown in FIG. 67(a) has been changed because of modification derived from an error continuously for a prescribed number of times or more, topology learning unit 228b creates a new Arithmetic const. node having the same constant value as the Arithmetic const. node as shown in FIG. 67(b). Topology learning unit 228b creates new Arithmetic const. nodes, whose number is (number of outputs of the original Arithmetic const. node −1). Since the number of outputs from the Arithmetic const. node shown in FIG. 67(a) is −2, topology learning unit 228b creates one new Arithmetic const. node.

Further, topology learning unit 228b creates an edge directed from the operation node that provided an input to the original Arithmetic const. node to the new Arithmetic const. node. Further, topology learning unit 228b creates an edge from each of the original or new Arithmetic const. code to one of the operation nodes as the output destination of the original Arithmetic const. node. Topology learning unit 228b deletes an edge output from the original Arithmetic const. node.

Figure 68:
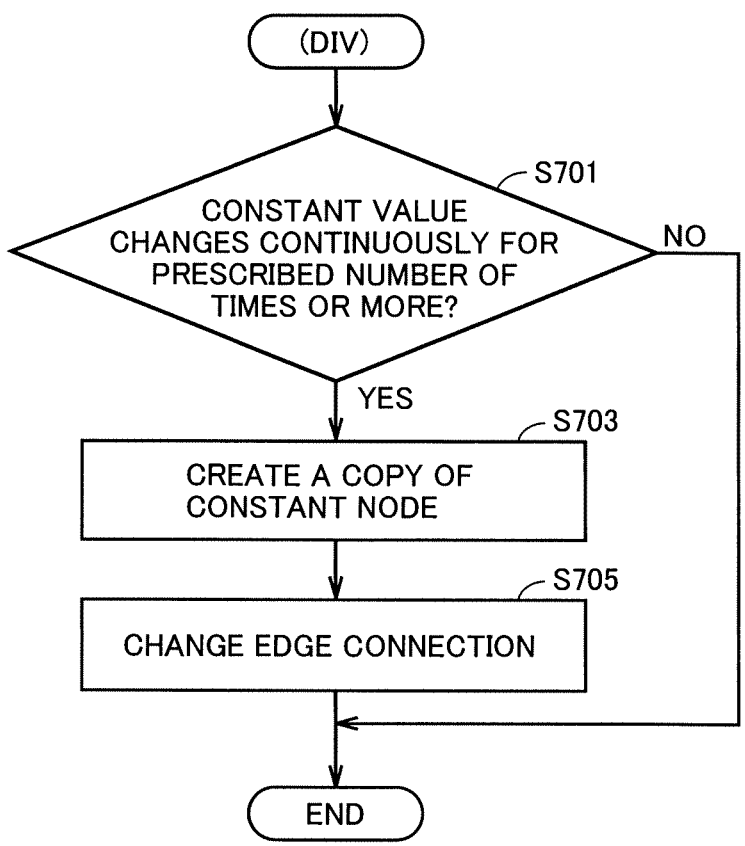
FIG. 68 is a flowchart representing a flow of a process performed by topology learning unit 228b for Division.

The flow of processes performed by topology learning unit 228b for Division will be described with reference to FIG. 68. FIG. 68 is a flowchart representing the flow of processes performed by topology learning unit 228b for Division.

At step S701, topology learning unit 228b determines, for each constant node, whether or not the constant value of constant node has been changed continuously for a prescribed number of times or more, because of modification resulting from an error.

If the constant value of constant node has been continuously changed (YES at step S701), at step S703, topology learning unit 228b creates a new constant node having the same constant value as the constant node. Topology learning unit 228b creates new constant nodes, whose number is (number of outputs of the original Arithmetic const. node −1).

At step S705, topology learning unit 228b connects an edge that has been input to the original constant node additionally to the new constant node. Further, topology learning unit 228b creates from each of the original or new Arithmetic const. nodes, an edge directed to one of the operation nodes as the output destination of the original Arithmetic const. node.

If the constant value does not continuously change (NO at step S701), topology learning unit 228b does not execute the process of steps S5703 and S705.

A constant node of which value is undetermined is a cause of network instability. By removing such a constant node through Division, calculation processing apparatus 100 can create a stable network.

10. Conversion from GIMPLE to ATN

Details of the conversion from GIMPLE to ATN, not described above, will be discussed in the following. Network creation unit 222 converts GIMPLE to ATN in accordance with the following rules.

<Substitution (R Value is a Constant)>

Network creation unit 222 replaces an instruction "L-value=R-value;" (for example, x=1;) of substituting a constant on the right side for a variable on the left side in GIMPLE with network elements (operation nodes and edges) in the following manner.

Network creation unit 222 creates an Arithmetic const. node having the right side value (R value) as a constant. Further, network creation unit 222 creates a virtual variable node of the left side value (L value). The virtual variable node of L value is a combination of a Write node, an Equal node and an edge directed from the Write node to the Equal node. Further, the network creation unit creates an edge directed from the constant node to the virtual variable node of L value, to connect the constant node and the virtual variable node of L value.

Figure 69:
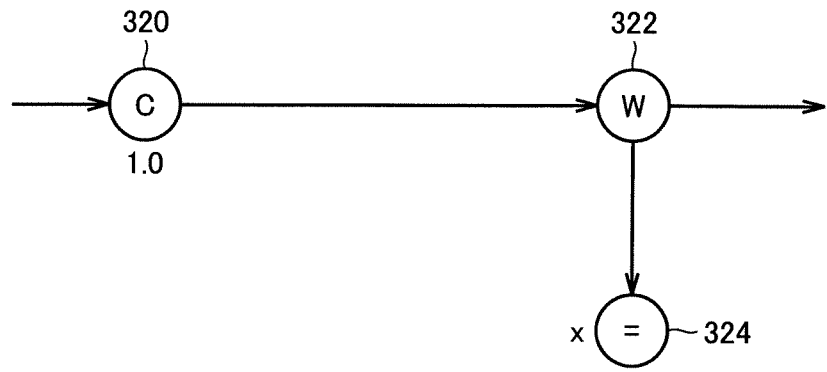
FIG. 69 shows network elements corresponding to GIMPLE instruction "x=1;".

FIG. 69 shows network elements corresponding to the instruction "x=1;" in GIMPLE. An operation node 320 corresponds to the constant value "1" on the right side. Operation nodes 322 and 324 connected by an edge represent the virtual variable node of L value.

<Substitution (R Value is a Variable)>

Network creation unit 222 replaces an instruction "L-value=R-value" (for example, x=y;) of substituting a variable on the right side for a variable on the left side in GIMPLE with network elements in the following manner.

Network creation unit 222 creates a virtual variable node of R value. The virtual variable node of R value is a combination of an Equal node, a Read node and an edge directed from the Equal node to the Read node. Further, network creation unit 222 creates a virtual variable node of L value. Further, network creation unit 222 creates an edge directed from the virtual variable node of R value to the virtual variable node of L value, to connect the virtual variable node of R value and the virtual variable node of L value.

Figure 70:
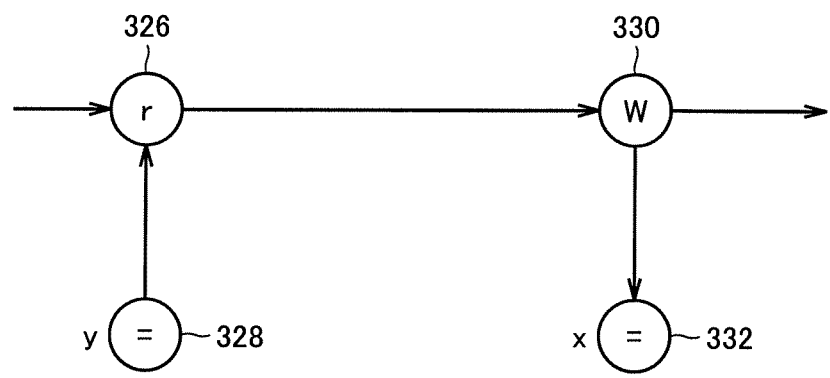
FIG. 70 shows network elements corresponding to GIMPLE instruction "x=y;".

FIG. 70 shows network elements corresponding to the instruction "x=y;" in GIMPLE. Operation nodes 326 and 328 connected by an edge represent the virtual variable node of R value. Operation nodes 330 and 332 connected by an edge represent the virtual variable node of L value.

<Binary Operation>

Network creation unit 222 replaces a binary operation instruction "L-value=R-value1<op> R-value2;" (for example, x=1+2;) in GIMPLE with network elements in the following manner. Here, <op> represents a binary operator such as addition (+) or multiplication (*).

Network creation unit 222 creates an operation node (referred to as an op node) corresponding to the binary operator. Further, network creation unit 222 creates an Arithmetic const. node or virtual variable node corresponding to the R value, and a virtual variable node of L value. Further, network creation unit 222 connects the R value node to the op node. Further, network creation unit 222 connects the op node to the virtual variable node of L value.

Figure 71:
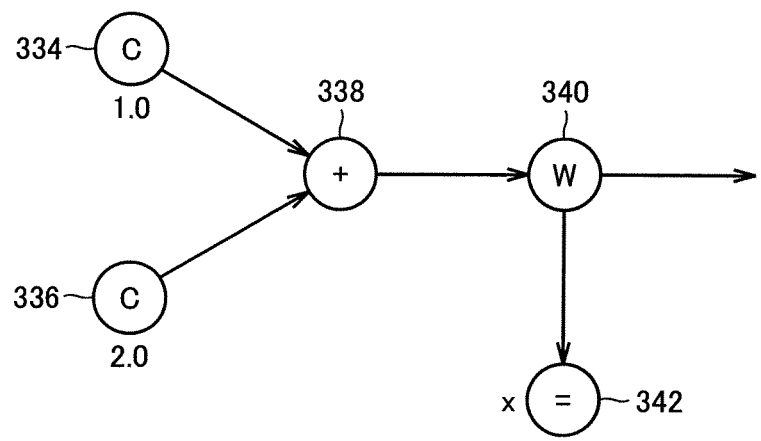
FIG. 71 shows network elements corresponding to GIMPLE instruction "x=1+2;".

FIG. 71 shows network elements corresponding to the instruction "x=1+2;" in GIMPLE. Operation nodes 332 and 336 correspond to "1" and "2" on the right side of the instruction, respectively. Operation node 338 represents the op node. Operation nodes 340 and 342 connected by an edge represents the virtual variable node of L value.

<Branch>

Network creation unit 222 replaces a branch instruction "goto<label>;" in GIMPLE with an edge that is connected to an Equal node created separately. Specifically, network creation unit 222 creates a new edge that is connected to an Equal node having a label designated by the branch instruction.

<Label>

Network creation unit 222 creates an Equal node having the label designated by GIMPLE, corresponding to the label "<label>:;" in GIMPLE.

<Conditional Branch>

Network creation unit 222 replaces a conditional branch instruction "if (R-value 1<op> R-value2) block1 else block2" (for example, if (1>0) block 1 else block 2) with network elements in the following manner.

Network creation unit 222 creates an op node corresponding to the binary operator in the if statement. Further, network creation unit 222 creates a node corresponding to a constant or variable in the if statement. Network creation unit 222 connects a TRUE side output of the op node to block1. Further, network creation unit 222 connects a FALSE side output of the op node to block2.

Alternatively, it creates a virtual variable node and a virtual variable node of L value. Further, network creation unit 222 connects the R value node to the op node. Further, network creation unit 222 connects the op node to the virtual variable node of L value.

Figure 72:
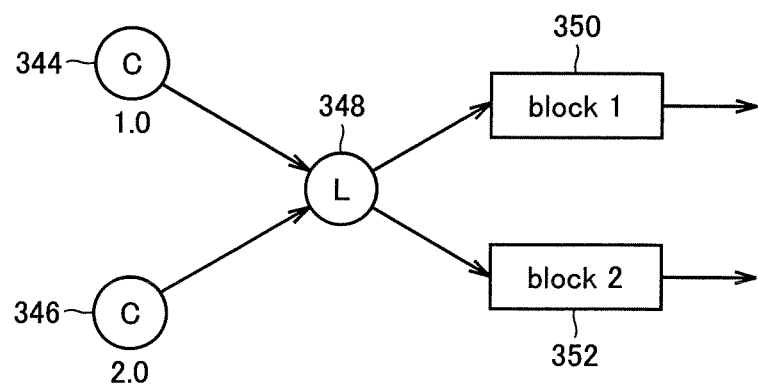
FIG. 72 shows network elements corresponding to GIMPLE instruction "if (1>0) block1 else block2".

FIG. 72 shows network elements corresponding to the instruction "if (1>0) block 1 else block 2" in GIMPLE. Operation nodes 344 and 346 correspond to "1" and "0" in the if statement, respectively. Operation node 348 is the op node. The TRUE side output of operation node 348 is output to a first block 350. The FALSE side output of operation node 348 is output to a second block 352.

Figure 74:
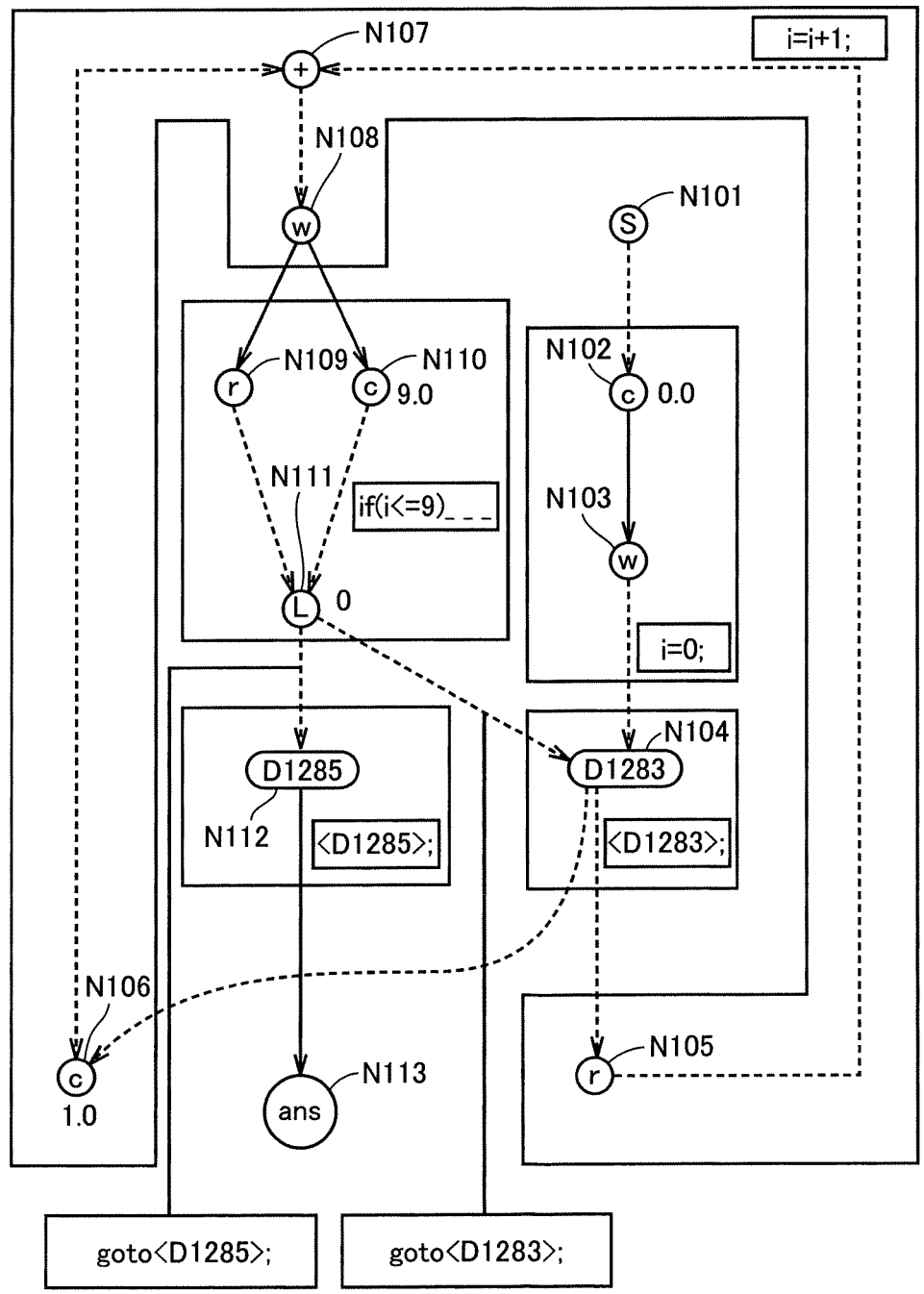
FIG. 74 illustrates ATN obtained by converting the code of FIG. 73.

The conversion from GIMPLE to ATN will be described with reference to a specific example. Here, an example of converting GIMPLE shown in FIG. 73 to ATN will be described. FIG. 74 shows ATN obtained by converting GIMPLE shown in FIG. 73. It is noted, however, that in FIG. 74, only the flow of regulating values are shown for simplicity of drawing.

First, network creation unit 222 creates a start node N101.

In accordance with the conversion rule of Substitution (R-value is a constant), network creation unit 222 converts "i=0;" on the third line of GIMPLE to nodes 102 and 103 and an edge connecting these nodes. Network creation unit 222 creates an edge directed from start node N101 to node N102.

In accordance with the conversion rule of Label, network creation unit 222 converts "<D1283>:;" on the fourth line of GIMPLE to a node N104. Network creation unit 222 creates an edge directed from node N102 to N103.

In accordance with the conversion rule of Substitution (R-value is a variable), network creation unit 222 converts "i=i+1:;" on the fifth line of GIMPLE to nodes N105 to N108 and edges connecting these nodes. Network creation unit 222 creates edges directed from node N104 to nodes N105 and N106.

In accordance with the conversion rule of Conditional Branch, network creation unit 222 converts "if(i<9)" on the sixth line of GIMPLE to nodes N109 to N111 and edges connecting these nodes. Network creation unit 222 creates edges directed from node N108 to nodes N109 and N110.

In accordance with the conversion rule of Branch, network creation unit 222 converts "goto<D1283>" on the eighth line of GIMPLE, which is executed if the result of judging of conditional branch is True, to an edge connected from the 0 side output of node N111 to node N104.

In accordance with the conversion rule of Branch, network creation unit 222 converts "goto<D1283>" on the twelfth line of GIMPLE, which is executed if the result of judging of conditional branch is False (that is, included in the else statement) to an edge connected from the 1 side output of node N111 to node N112.

In accordance with the conversion rule of Label, network creation unit 222 converts "<D1285>:;" on the fourteenth line of GIMPLE to a node N112.

Finally, network creation unit 222 creates an ans node N113, and creates an edge directed from node N112 to ans node 113.

Embodiment 2

In Embodiment 1, execution of a program converted to a network and modification/learning of the network have been described as executed by a single computer such as shown in FIG. 2.

It is noted, however, that if the above-described "distributed computing technique" or, more specifically, the "Peer-to-Peer technique" is used, execution of a program converted to a network and modification/learning of the network can be executed as distributed processing by a plurality of computers.

In Embodiment 2 described in the following, a network resulting from program conversion will be simply referred to as a "network", and distinguished from a network of a plurality of computers connected by communication, which will be referred to as a "communication network." Further, a virtual network formed on the communication network will be referred to as an "overlay network."

Specifically, in the calculation in accordance with Embodiment 2, calculation can be executed using a plurality of computers, and ultimately, it is possible to execute the calculation of network in ATN format on a communication network of a plurality of computers distributed worldwide.

FIG. 75 shows a concept of such a calculation system 1000 in accordance with Embodiment 2, using Peer-to-Peer technique.

It is assumed that peers (node computers) 1010.1 to 1010.*n* joining the calculation processing system 1000 in accordance with Embodiment 2 have a tool (application software) installed, for executing the calculation of a network in ATN format. Such a tool operates on the background, using surplus resources of each of the computers 1010.1 to 1010.*n*.

In executing such a calculation, the network in ATN format corresponds to a virtual communication network (overlay network) formed on the communication network of computers. In a most typical example, a node of the network in ATN format is realized as one peer (node computer), an edge of the network in ATN format is realized as a virtual link provided between peers, and an agent of the network in ATN format is realized as a packet communicated among the peers (or as a dataflow).

Here, the peers include an input peer that functions as an input node of the network in ATN format and an output peer that functions as an output node.

The peers joining calculation processing system 1000 are classified to "real nodes (real peers)" having nodes of the network in ATN format actually allocated at present and taking part in calculation/learning, and "hidden nodes (hidden peers)" not having nodes of the network in ATN format allocated at present. A virtual link connecting real peers will be referred to as a "real edge", and a link connecting a real peer with a hidden peer or connecting hidden peers to each other will be referred to as a "hidden edge."

Further, the agents are classified to "data transfer agents" transferring data related to Forward Propagation and back propagation shown in FIGS. 7, 53 and 54, "topology learning agents" related to topology revision shown in FIGS. 55 to 68, and "mutual surveillance" agents for surveillance among peers.

A data transfer agent exchanges agent information 134$c$ and deleted label list 134$d$ among the pieces of information shown in FIG. 9 between real peers, and thereby realizes data transfer related to Forward Propagation and back propagation, correction of constant values for constant learning and other processes.

The topology learning agent intercommunicates with real and hidden peers, and stops at a peer from time to time to execute a function program it has, to perform a process for revising the topology. Here, if it becomes necessary to generate a new node, a special topology learning agent is multicast from a real peer for searching/identifying a peer, and it is relayed and transferred through real/hidden peers. The searched out hidden peer is newly allocated as a real peer.

The mutual surveillance agent performs mutual surveillance of neighboring peers, to ensure fault tolerance and open-endedness. This agent constantly intercommunicates with neighboring peers, and if a real peer stops its operation, it searches and identifies an alternative hidden peer, and allocates the searched out hidden peer to the real peer.

In calculation processing system 1000, a control node (hidden node) 1010.$c$, a user node (hidden node) 1010.$u$, an input node (real node) 1010.$i$ and an output node (real node) 1010.$o$ are set as special nodes.

Control node 1010.$c$ receives a problem posed by user node 1010.0 and allocates input/output nodes, and instructs start of execution of the network in ATN format. Further, based on the result of learning, it instructs end of execution of the calculation of network in ATN format and, at the same time, it takes up the finished algorithm (network topology) and transfers it to user node 1010.$u$. Though not shown here, each agent has address information of control node 1010.$c$, and notifies the course of calculation to control node 1010.$c$.

Input node 1010.$i$ holds input data for learning received from control node 1010.$c$. Output node 1010.$o$ holds teaching data for learning, and calculates differential coefficient based on error.

By the arrangement described above, as regards the process that has been executed by one computer in Embodiment 1, the "calculation of network in ATN format" comes to be executed in a distributed manner by a plurality of computers in Embodiment 2.

It is noted that as long as the overlay network such as described above is realized, one-to-one correspondence between the nodes of the virtual network and the physical computers is not always necessary. By way of example, a plurality of nodes of the virtual network may be realized by one physical computer.

By such an arrangement of calculation, ultimately it becomes possible to realize calculation/learning of the network in ATN format using huge computing resources of a plurality of computers distributed worldwide, and the efficiency of algorithm search can dramatically be improved.

Here, regarding the method of distributed computing, calculation system 1000 in accordance with Embodiment 2 is implemented not as a server-client type (centralized) application such as grid computing, but rather as a Peer-to-Peer (autonomous-decentralized) application mainly utilizing Peer-to-Peer communication.

As a result, the calculation processing system in accordance with Embodiment 2 comes to have the following advantages: 1) fault-tolerance, meaning that even if some peers fail, other peers can take over; 2) open-endedness, meaning that each node can join and leave at any time; and 3) resource dispersibility, meaning that it is unnecessary to collect huge amount of data at one location.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

Exemplary application of the calculation processing apparatus in accordance with the present invention includes the following.

(1) A compile/execution system (for example, personal computer embedded software) of self-repairing any defect of the program based on ideal data given by the user.

(2) A system (for example, next generation network communication) of acquiring through learning an algorithm of finding necessary information by searching from vague information.

(3) A robust knowledge succession system (for example, factory, hospital etc.) of learning algorithm by itself based on the teaching data given by an expert.

The user applies a roughly coded program as the initial program and applies control output data by a skilled person as teaching data, to the calculation processing apparatus. It is possible for the calculation processing apparatus to repeat program updating and thereby to create a program representing the knowledge of the skilled person, which is so wide, complicated and difficult to be clearly stated that succession has been impossible. The user can build a mechanical system that operates stably, using the thus created program.

(4) A robot program (for example, nursing-care, exploration, disaster, aerospace) that adapts to environment to make optimal decision/control/planning based on the teaching data.

(5) A system biological model (for example, metabolism map, signaling pathway) having the capability of estimating algorithm in a biological body based on biological measurement data.

DESCRIPTION OF THE REFERENCE SIGNS

100 calculation processing apparatus, 102 computer body, 104 monitor, 105 bus, 106 FD drive, 108 optical disk drive, 110 keyboard, 112 mouse, 122 memory, 124 hard disk, 128 communication interface, 131 initial program, 132 network forming program, 133 network modifying program, 134 network information, 134$a$ node information, 134$b$ connection information, 134$c$ agent information, 134$d$ deleted label list, 135 node operation definition, 136 learning variables, 210 input unit, 220 operation unit, 222 network creation unit, 224 format converting unit, 226 calculation executing unit, 228 network updating unit, 230 output unit, 240 storage unit, 1000 calculation processing system, 1010.1~1010.n node computers.

The invention claimed is:

1. A calculation processing system, comprising:
an input unit receiving, from outside of the calculation processing system, programming code for a program including an algorithm;
a network creation unit creating, based on the programming code for the program received by the input unit, a network to have a topology representing an algorithm structure of the algorithm of the program,
wherein the network created by the network creation unit includes a plurality of operation nodes and a plurality of edges each connecting two of said operation nodes according to the topology of the network, and
wherein said plurality of operation nodes include operation nodes corresponding to various operations of the program and an operation node performing calculation on a regulating value representing an algorithm flow;
a calculation executing unit executing a calculation using the network representing the algorithm structure of the algorithm of the program; and
a network updating unit for changing, using a result of calculation by said calculation executing unit and a learning algorithm, the topology of the network without changing said result of calculation,
wherein the network creation unit determines the topology representing the algorithm structure of the algorithm of the program received by the input unit, and creates the network to have the determined topology by adding or deleting an operation node and configuring edges connecting the operation node, and
wherein the network creation unit converts the program to a network in ATN (Algorithmically Transitive Network) format.

2. The calculation processing system according to claim 1, wherein
said plurality of operation nodes include an operation node having a node variable; and
said network updating unit calculates an error of said result of calculation from a teaching value, calculates contribution of said node variable to said error, and modifies said node variable based on said contribution.

3. The calculation processing system according to claim 1, wherein
said plurality of operation nodes include operation nodes corresponding to four arithmetic operations.

4. The calculation processing system according to claim 2, wherein
said network updating unit performs a process of changing, adding or deleting said operation node, on said network.

5. The calculation processing system according to claim 4, wherein
said network updating unit changes said operation node, of which output value is kept unchanged for a prescribed number of times continuously, to a constant node outputting a constant value.

6. The calculation processing system according to claim 4, wherein
said network updating unit selects at random two or more of said operation nodes from said plurality of operation nodes, from nearby nodes, and creates a new said operation node to be connected to said selected operation nodes.

7. The calculation processing system according to claim 4, wherein
said network updating unit selects at random a first operation node and a second operation node from said plurality of operation nodes, from nearby nodes, and creates a bridge from said second operation node to said first operation node.

8. The calculation processing system according to claim 4, wherein
said network updating unit selects at random said operation node from said plurality of operation nodes, from nearby nodes, and creates a branch of said selected node.

9. The calculation processing system according to claim 4, wherein
said network updating unit rewrites a plurality of constant nodes each outputting a constant value, to one said constant node in accordance with coupling rule.

10. The calculation processing system according to claim 4, wherein
said network updating unit divides said operation node having said node variable modified successively for a prescribed number of times or more.

11. The calculation processing system according to claim 2, wherein
said network updating unit calculates an energy error based on said error, calculates differential coefficient of said energy error with respect to said node variable as said contribution, and updates said variable by subtracting a product of said differential coefficient and a learning coefficient, from said variable.

12. The calculation processing system according to claim 11, wherein said learning coefficient is a value determined such that said energy error is multiplied $(1-\eta_{1p})$ times (where $\eta_{1p}$ is a real number larger than 0 and smaller than 1), by the update of said variable.

13. The calculation processing system according to claim 1, wherein
said program received by said input unit is source code described in a high level language; and
said network creation unit converts said source code to a language-independent intermediate code, and creates said network based on said intermediate code.

14. The calculation processing system according to claim 1, comprising
a plurality of calculation processing apparatuses operating in a distributed type calculation processing environment; wherein
each of said calculation processing apparatuses processes the process executed by said calculation executing unit and the process performed by said network updating unit, in a distributed manner.

15. A method of creating a program using a calculation processing system, comprising steps of:
receiving, in said calculation processing system from outside of the calculation processing system, programming code for a program including an algorithm;
creating, in said calculation processing system, based on the received programming code for the program, a network to have a topology representing an algorithm structure of the algorithm of the program,
wherein the created network includes a plurality of operation nodes and a plurality of edges each connecting said operation nodes according to the topology of the network, and wherein said plurality of operation nodes include operation nodes corresponding to various operations of the program and an operation node performing calculation on a regulating value representing an algorithm flow;

executing, in said calculation processing system, a calculation using the created network representing the algorithm structure of the algorithm of the program; and modifying, in said calculation processing system, using a result of said calculation and a learning algorithm, the topology of the network while maintaining said result of calculation, wherein the step for creating the network includes adding or deleting an operation node and configuring edges connecting the operation node to create the network to have the topology representing the algorithm structure of the received program, and wherein the creating the network comprises converting the program to a network in ATN (Algorithmically Transitive Network) format.

16. A non-transitory computer readable recording medium storing a program creation program causing a calculation processing system to create a program, wherein
said program creation program causes the computer to execute a program creation program including steps of:
causing said calculation processing system to create, based on programming code received from outside of the calculating processing system for a program including an algorithm, a network to have a topology representing an algorithm structure of the algorithm of the program,
wherein the created network includes a plurality of operation nodes and a plurality of edges each connecting said operation nodes according to the topology of the network, and
wherein said plurality of operation nodes include operation nodes corresponding to various operations of the program and an operation node performing calculation on a regulating value representing an algorithm flow;
causing said calculation processing system to execute a calculation using the network representing the algorithm structure of the algorithm of the program; and
causing said calculation processing system to modify, using a result of said calculation and a learning algorithm, the topology of said network while maintaining said result of calculation,
wherein the calculation processing system determines the topology representing the algorithm structure of the algorithm of the received program, and creates the network to have the determined topology by adding or deleting an operation node and configuring edges connecting the operation node, and
wherein the creating the network comprises converting the program to a network in ATN (Algorithmically Transitive Network) format.

17. A non-transitory computer readable recording medium storing a program creation program causing a calculation processing system to create a program, the program creation program comprising steps of:
causing said calculation processing system to create, based on programming code received from outside of the calculating processing system for a program including an algorithm, a network to have a topology representing an algorithm structure of the algorithm of the program,
wherein the created network includes a plurality of operation nodes and a plurality of edges each connecting said operation nodes according to the topology of the network, and
wherein said plurality of operation nodes include operation nodes corresponding to various operations of the program and an operation node performing calculation on a regulating value representing an algorithm flow;
causing said calculation processing system to execute a calculation using the network representing the algorithm structure of the algorithm of the program; and
causing said calculation processing system to modify, using a result of said calculation and a learning algorithm, the topology of said network while maintaining said result of calculation,
wherein the calculation processing system determines the topology representing the algorithm structure of the algorithm of the received program, and creates the network to have the determined topology by adding or deleting an operation node and configuring edges connecting the operation node, and
wherein the creating the network comprises converting the program to a network in ATN (Algorithmically Transitive Network) format.

18. The calculation processing system according to claim 1, wherein the network creation unit associates with operation nodes of the plurality of operation nodes respective computational operations to be performed by the operation nodes on inputs to the operation nodes to compute an output of each respective operation node according to the computation operation associated with the operation node for transfer along an edge to another operation node.

* * * * *